(12) United States Patent
Collier-Hallman et al.

(10) Patent No.: US 7,075,290 B2
(45) Date of Patent: *Jul. 11, 2006

(54) TACHOMETER APPARATUS AND METHOD FOR MOTOR VELOCITY MEASUREMENT

(75) Inventors: Steven James Collier-Hallman, Frankenmuth, MI (US); Philip G. Bright, Bay City, MI (US); Clane J. Cammin, Midland, MI (US); Hentianarisoa Ratouth, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 277 days.

This patent is subject to a terminal disclaimer.

(21) Appl. No.: 10/205,848

(22) Filed: Jul. 26, 2002

(65) Prior Publication Data
US 2003/0057941 A1 Mar. 27, 2003

Related U.S. Application Data

(60) Provisional application No. 60/308,427, filed on Jul. 27, 2001.

(51) Int. Cl.
*G01P 3/44* (2006.01)

(52) U.S. Cl. .................. 324/163; 324/166; 324/174; 324/225; 318/463; 310/68 B; 702/96; 702/145

(58) Field of Classification Search .......... 324/163, 324/166, 173, 174, 160–162, 164–165, 167–172, 324/207.12, 225; 310/68 B; 318/463; 702/96, 702/147, 145

See application file for complete search history.

(56) References Cited

U.S. PATENT DOCUMENTS

| | | | |
|---|---|---|---|
| 3,731,533 A | 5/1973 | Geery ............... | 73/231 R |
| 4,008,378 A | 2/1977 | Nance et al. ......... | 179/15 A |
| 4,305,025 A | 12/1981 | Arnold ............... | 318/327 |
| 4,396,884 A | 8/1983 | Toalson .............. | 324/163 |
| 4,437,061 A | 3/1984 | Shinozaki et al. ..... | 324/166 |
| 4,512,367 A | 4/1985 | Abe et al. | |
| 4,562,399 A | 12/1985 | Fisher ............... | 322/94 |
| 4,710,683 A | 12/1987 | Bahn et al. .......... | 318/254 |
| RE32,857 E | 2/1989 | Luneau .............. | 322/61 |
| 4,803,425 A | 2/1989 | Swanberg ............ | 324/207 |
| 4,836,319 A | 6/1989 | Haseda et al. ........ | 180/142 |
| 4,838,074 A | 6/1989 | Morishita et al. ..... | 73/118.1 |
| 4,853,604 A * | 8/1989 | McMullin et al. ..... | 318/653 |

(Continued)

FOREIGN PATENT DOCUMENTS

DE    1 484 796    2/1975

(Continued)

OTHER PUBLICATIONS

Paul Horowitz & Winfield Hill, The Art of Electronics Cambridge University Press, 1989, pp. 222-224.*

(Continued)

*Primary Examiner*—Jay M. Patidar
(74) *Attorney, Agent, or Firm*—Michael D. Smith

(57) ABSTRACT

A method and apparatus for determining the velocity of a rotating device is described herein. The apparatus includes a magnet assembly affixed to a rotating shaft of a rotating device and a circuit assembly. The circuit assembly includes a circuit interconnection having a sense coil and sensors affixed thereto. The circuit assembly is adapted to be in proximity to the magnet assembly, wherein the magnet assembly combines with the circuit assembly to form an air core electric machine such that voltages generated from the sense coil exhibits an amplitude proportional to the velocity.

160 Claims, 32 Drawing Sheets

U.S. PATENT DOCUMENTS

| | | | | |
|---|---|---|---|---|
| 4,868,497 A | * | 9/1989 | Wallrafen | 324/160 |
| 4,897,603 A | | 1/1990 | Bieber et al. | 324/208 |
| 4,901,015 A | * | 2/1990 | Pospischil et al. | 324/207.17 |
| 4,922,197 A | | 5/1990 | Juds et al. | 324/207.21 |
| 4,924,161 A | | 5/1990 | Ueki et al. | 318/567 |
| 4,924,696 A | | 5/1990 | Schroeder et al. | 73/118.1 |
| 4,955,228 A | | 9/1990 | Hirose et al. | 73/118.1 |
| 4,961,017 A | | 10/1990 | Kakinoki et al. | 310/71 |
| 4,983,915 A | | 1/1991 | Rossi | 324/207.17 |
| 5,027,648 A | | 7/1991 | Filleau | 73/118.1 |
| 5,029,466 A | | 7/1991 | Nishihara et al. | 73/118.1 |
| 5,045,784 A | | 9/1991 | Pizzarello et al. | 324/163 |
| 5,062,064 A | | 10/1991 | Sagues et al. | 364/565 |
| 5,088,319 A | | 2/1992 | Hirose et al. | 73/118.1 |
| 5,218,279 A | | 6/1993 | Takahashi et al. | 318/560 |
| 5,223,760 A | | 6/1993 | Peck et al. | 310/168 |
| 5,260,650 A | | 11/1993 | Schwesig et al. | 324/163 |
| 5,293,125 A | | 3/1994 | Griffen et al. | 324/173 |
| 5,298,841 A | | 3/1994 | Katayama et al. | 318/268 |
| 5,309,758 A | | 5/1994 | Kubota et al. | 73/118.1 |
| 5,329,195 A | | 7/1994 | Horber et al. | 310/68 B |
| 5,406,267 A | | 4/1995 | Curtis | 340/653 |
| 5,408,153 A | | 4/1995 | Imai et al. | 310/68 B |
| 5,422,570 A | | 6/1995 | Moreira | 324/177 |
| 5,498,072 A | | 3/1996 | Shimizu | 303/191 |
| 5,503,421 A | | 4/1996 | DeLisser et al. | 280/441.1 |
| 5,541,488 A | * | 7/1996 | Bansal et al. | 318/801 |
| 5,717,268 A | | 2/1998 | Carrier et al. | 310/156 |
| 5,736,852 A | | 4/1998 | Pattantyus | 324/166 |
| 5,828,973 A | | 10/1998 | Takeuchi et al. | 701/41 |
| 5,902,342 A | | 5/1999 | Mishra | 701/22 |
| 6,002,234 A | | 12/1999 | Ohm et al. | 318/729 |
| 6,051,951 A | | 4/2000 | Arai et al. | 318/700 |
| 6,101,879 A | * | 8/2000 | Shirai et al. | 73/514.39 |
| 6,155,106 A | | 12/2000 | Sano | 73/118.1 |
| 6,230,110 B1 | | 5/2001 | Iwazaki | 702/148 |
| 6,244,372 B1 | | 6/2001 | Sakamaki et al. | 180/422 |
| 6,244,373 B1 | | 6/2001 | Kojo et al. | 180/443 |
| 6,246,197 B1 | | 6/2001 | Kurishige et al. | 318/432 |
| 6,250,417 B1 | | 6/2001 | Kaji et al. | 180/421 |
| 6,286,621 B1 | | 9/2001 | Mukai et al. | 180/446 |
| 6,310,458 B1 | | 10/2001 | Fenstermacher | |
| 6,470,994 B1 | | 10/2002 | Shimizu et al. | |
| 6,483,293 B1 | * | 11/2002 | Chen et al. | 324/207.12 |
| 6,498,409 B1 | * | 12/2002 | Collier-Hallman et al. | 310/68 B |
| 6,530,269 B1 | | 3/2003 | Colosky | |
| 6,534,970 B1 | * | 3/2003 | Ely et al. | 324/207.17 |
| 6,541,959 B1 | * | 4/2003 | Gudgeon et al. | 324/207.15 |
| 6,624,608 B1 | * | 9/2003 | Komura | 318/696 |

FOREIGN PATENT DOCUMENTS

| | | | |
|---|---|---|---|
| JP | 358215560 A | | 12/1983 |
| JP | 8-211081 | | 8/1996 |
| SU | 974273 A | * | 11/1982 |
| WO | 99/61866 | | 2/1999 |
| WO | WO 01/20342 A2 | | 3/2001 |

OTHER PUBLICATIONS

PCT—Notification Of Transmittal Of The International Search Report Or The Declaration for International application No. PCT/US02/23719—International filing date Jul. 26, 2002.

PCT Written Opinion of International Application No.: PCT/US02/23719 Filed Jul. 26, 2002.

"Motor Tachometer Circuit" IBM Technical Disclosure Bulletin vol. 14, Issue No. 7, pp. 1986-1987; Dec. 1, 1971.

"Forms Motor Control System" IBM Technicla Disclosure Bulletin vol. 21, Issue No. 4, pp. 1333-1334; Sep. 1, 1978.

"DC Motor Acceleration Control" IBM Technical Disclosure Bulletin vol. 18, Issue No. 4, pp. 1561-1562; Sep. 1, 1985.

* cited by examiner

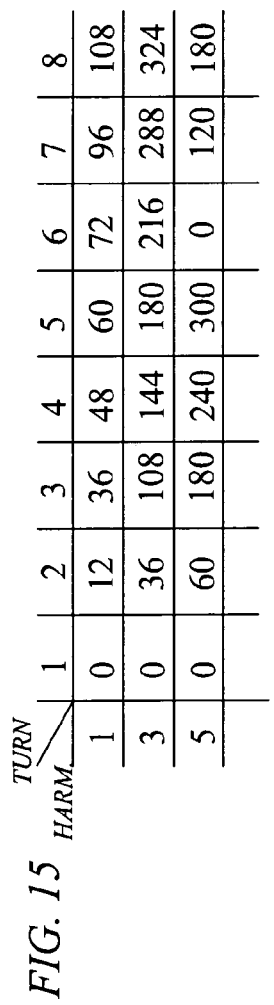
FIG. 15
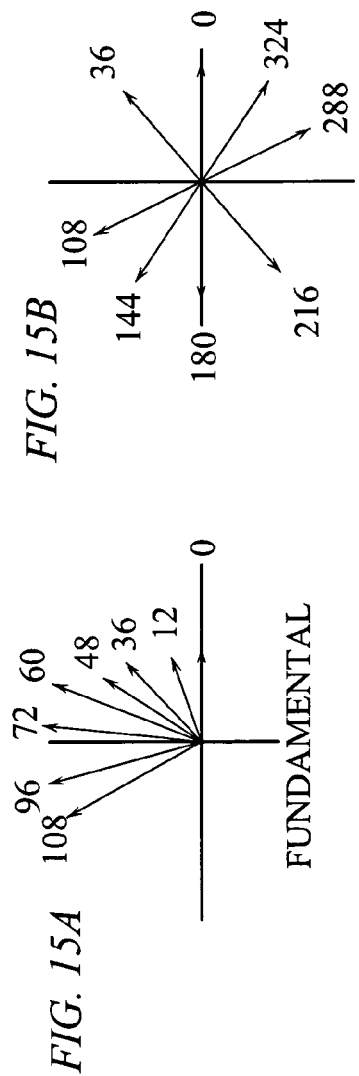
FIG. 15A
FIG. 15B
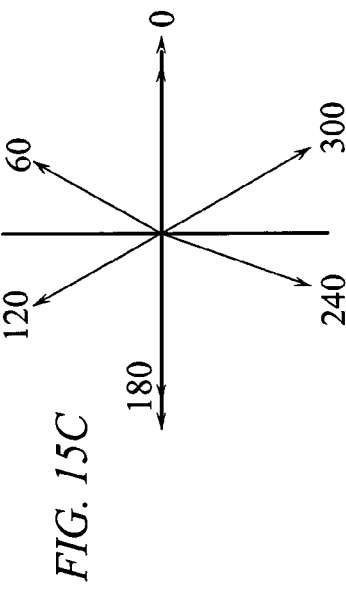
FIG. 15C

TACHOMETER APPARATUS AND METHOD FOR MOTOR VELOCITY MEASUREMENT

CROSS-REFERENCE TO RELATED APPLICATIONS

This application claims the benefit of U.S. provisional application No. 60/308,427, filed Jul. 27, 2001 the contents of which are incorporated by reference herein in their entirety.

BACKGROUND

Speed sensors, or detectors of various types are well known in the art. In recent years the application of speed detection to motor control functions has stimulated demands on the sophistication of those sensors. Rotational speed sensors are commonly configured in the same manner as an electric machine, for example, a coil is placed in proximity to rotating magnets whereby the magnetic field induces a voltage on the passing coil in accordance with Faraday's Law. The rotating permanent magnets induce a voltage on the coil and ultimately a voltage whose frequency and magnitude are proportional to the rotational speed of the passing magnets.

Many of the tachometers that are currently available in the art exhibit a trade off between capabilities and cost. Those with sufficient resolution and accuracy are often very expensive and perhaps cost prohibitive for mass production applications. Those that are inexpensive enough to be considered for such applications are commonly inaccurate or provide insufficient resolution or bandwidth for the application. Thus, there is a need, in the art for a low cost robust tachometer that provides sufficient accuracy and resolution for motor control applications and yet is inexpensive enough to be cost effective in mass production.

SUMMARY

Disclosed herein is an apparatus for determining the velocity of a rotating device comprising: a rotational part having a set of magnet assemblies affixed to a rotating shaft of the rotating device configured to rotate about a rotation axis; and a circuit assembly including, a circuit interconnection having a sense coil, a sensor affixed to the circuit assembly, mounted in close proximity to the rotating part, the circuit assembly adapted to place components thereon in proximity to the set of magnet assemblies; wherein the set of magnet assemblies combine with said circuit assembly to form an air core electric machine Also disclosed herein is a system and method for determining a velocity of a rotating device, comprising the abovementioned apparatus and circuit assembly as well as a controller operatively coupled to the circuit assembly. The controller is configured to execute an adaptive algorithm including: receiving a position signal related to rotational position transmitted to the controller; determining a derived velocity signal utilizing the position signal; receiving a tachometer velocity signal; determining a compensated velocity signal in response to the tachometer velocity signal; and blending the compensated velocity signal with the derived velocity signal under selective conditions to generate a blended velocity output indicative of the velocity of the rotating device. The system is configured so that the compensated velocity signal is the resultant of an adaptive gain control loop configured to control magnitude of the velocity under selected conditions.

The system further includes another sense coil to form a plurality of sense coils, wherein the controller further receives another tachometer velocity signal to form a plurality of tachometer velocity signals.

A feature of the system is that the plurality of tachometer velocity signals is in quadrature.

Another feature of the system is that the plurality of tachometer velocity signals is substantially sinusoidal.

Also disclosed herein is a storage medium encoded with a machine-readable computer program code, the storage medium including instructions for causing a controller to implement a method for determining a velocity of a rotating device.

Yet another disclosure herein is a computer data signal embodied in a carrier wave, the data signal comprising code configured to cause a controller to implement a method for determining a velocity of a rotating device.

BRIEF DESCRIPTION OF THE DRAWINGS

Referring now to the drawings wherein like elements are numbered alike in the several FIGURES:

FIG. 15 depicts a table and a vector diagram illustrating the vector contributions and combinations to the tachometer voltage;

FIG. 15A depicts the vector contributions to the fundamental frequency of the tachometer response;

FIG. 15B depicts the vector contribution and cancellation of the third harmonic of the tachometer response;

FIG. 15C depicts the vector contribution and cancellation of the fifth harmonic of the tachometer response;

DETAILED DESCRIPTION OF AN EXEMPLARY EMBODIMENT

Disclosed herein is a speed-sensing device hereinafter termed a tachometer apparatus and methodology for determining the velocity of a motor as applied to a vehicle steering system. Such a tachometer may be utilized in various types of motors and other rotational devices such as, for example, motors employed in a vehicle steering system. A preferred embodiment, by way of illustration is described herein as it may be applied to a motor tachometer in an electronic steering system. While a preferred embodiment is shown and described, it will be appreciated by those skilled in the art that the disclosure is not limited to the motor speed and rotation in and electric power steering system, but also to any device where rotational motion and velocity are to be detected.

Tachometers of various types are well known in the art. In recent years the application of speed detection to motor control functions has stimulated demands on the sophistication of those sensors. Many of the tachometers that are currently available in the art exhibit a trade off between capabilities and cost. Those with sufficient resolution and accuracy are often very expensive and perhaps cost prohibitive for mass production applications. Those that are inexpensive enough to be considered for such applications are commonly inaccurate or provide insufficient resolution or bandwidth for the application. A tachometer which addresses both constraints is disclosed in copending commonly assigned U.S. patent application Ser. No. 09/661,651 filed Sep. 14, 2000. The referenced tachometer provides a structure and method by which a velocity is determined. In that disclosure, an apparatus that generates, and processes for computing, a velocity of a rotating device, therein an electric machine. Moreover, the apparatus disclosed therein generates and processes essentially trapezoidal velocity signals. Disclosed herein, are enhancements to that apparatus as well as additional processes and embodiments, which generate and process essentially sinusoidal velocity signals.

Apparatus and Structure: Trapezoidal Response

Figure 1:
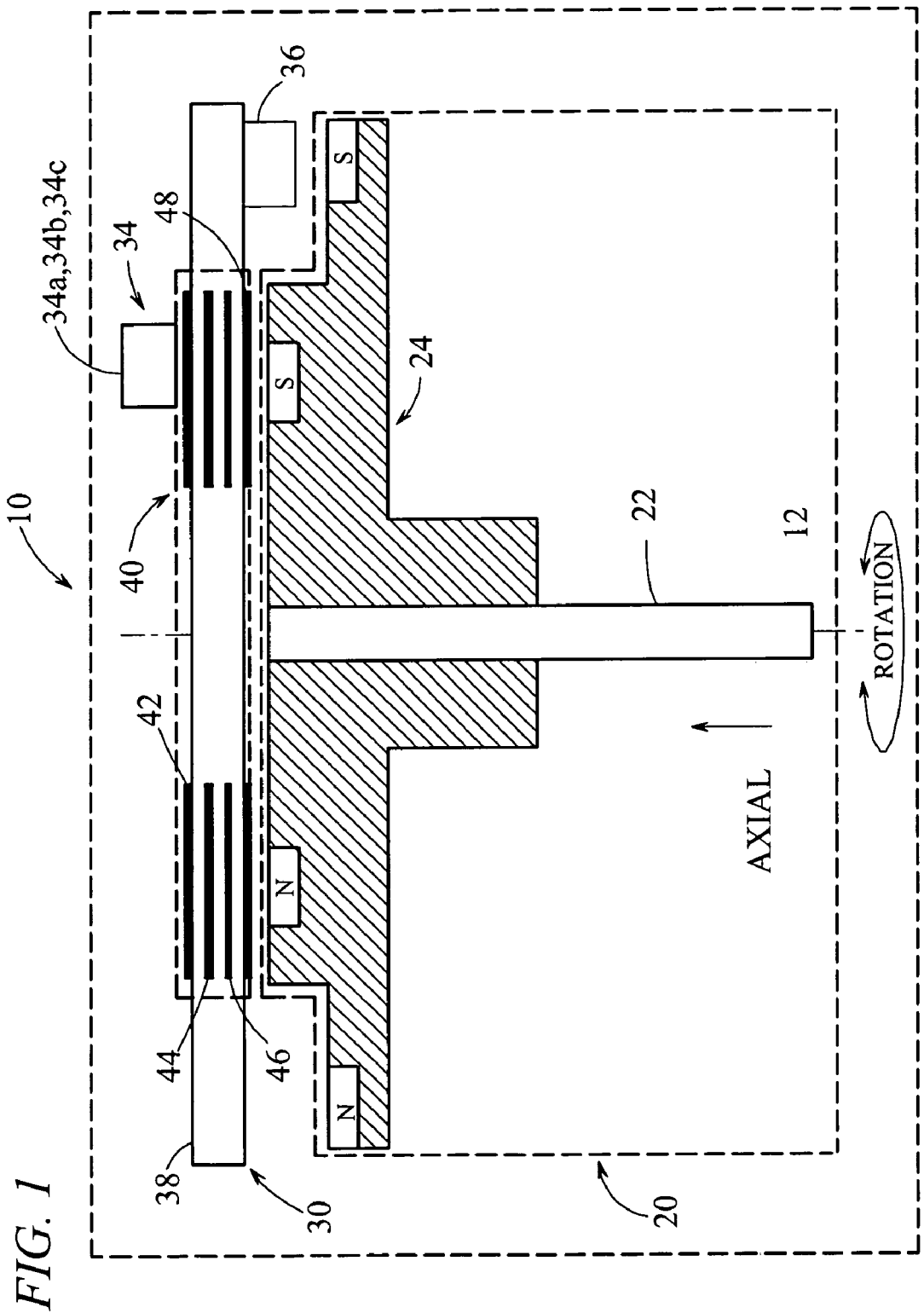
FIG. 1 depicts the cross-section of the fixed and rotating parts of a tachometer.
Figure 2:
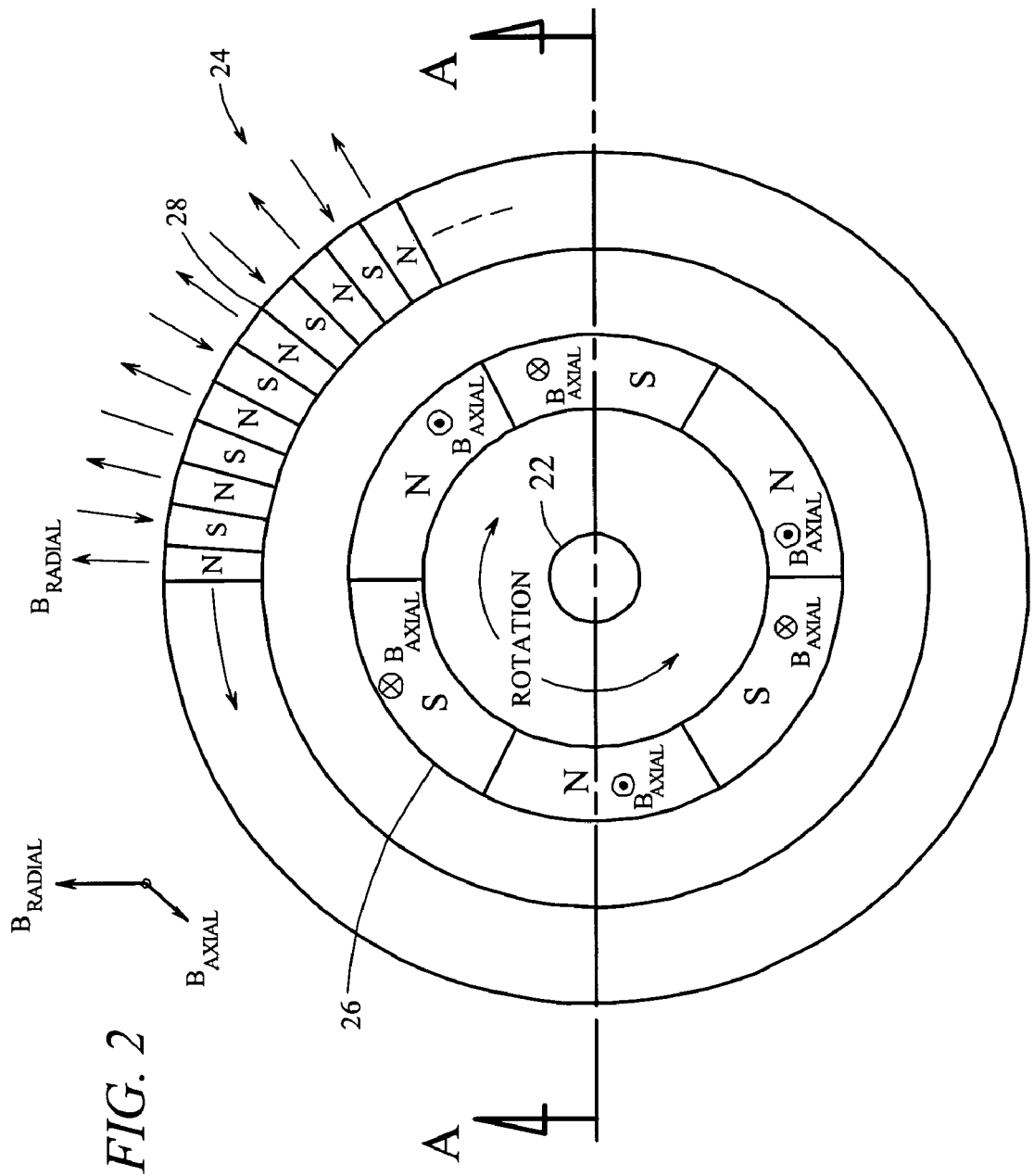
FIG. 2 depicts a magnet assembly end-view illustrating the low-resolution and high-resolution poles.

Referring to FIG. 1, an existing tachometer structure 10 comprising a rotational part 20 and a fixed part, a circuit assembly 30 is depicted. The rotational part, 20 includes, but is not limited to, a rotating shaft 22 and a magnet assembly 24. The rotating shaft 22 is connected to, or an element of the device, (not shown) whose rotational speed is to be determined. Referring to FIG. 2, an axial (end) view of the magnet assembly 24 is depicted. The magnet assembly 24 is attached to the rotating shaft 22 which rotates about a rotation axis 12 and includes without limit, two concentric, annular magnets sets, a first low-resolution magnet set 26 of smaller radius surrounded by the second high-resolution magnet set of larger radius. The concentric, annular configurations may be coplanar, but need not be. The low-resolution magnet set 26 comprises an inner annulus of the magnet assembly 24 is constructed and configured as a six-pole alternating polarity permanent magnet, with each pole comprising a 60 degree annular sector. The high-resolution magnet set 28 comprises an outer annulus of the magnet assembly 24 is configured as a 72-pole alternating polarity permanent magnet, with each pole comprising a 5 degree annular sector. While the preferred embodiment utilizes the stated configuration, other configurations are reasonable. The magnet structure need only be configured to allow adequate detection in light of the sensing elements utilized, processing employed, and operational constraints. The low-resolution magnet set 26 and high-resolution magnet set 28 each comprise alternating north and south poles substantially equally distributed around each respective annulus. One skilled in the art would appreciate that the magnets when rotated generate an alternating magnetic field, which when passed in proximity to a conductor (coil) will induce a voltage on the conductor. Further, using well-understood principles the magnitude of the induced voltage is proportional to the velocity of the passing magnetic field, the spacing and orientation of the coil from the magnets.

Figure 3:
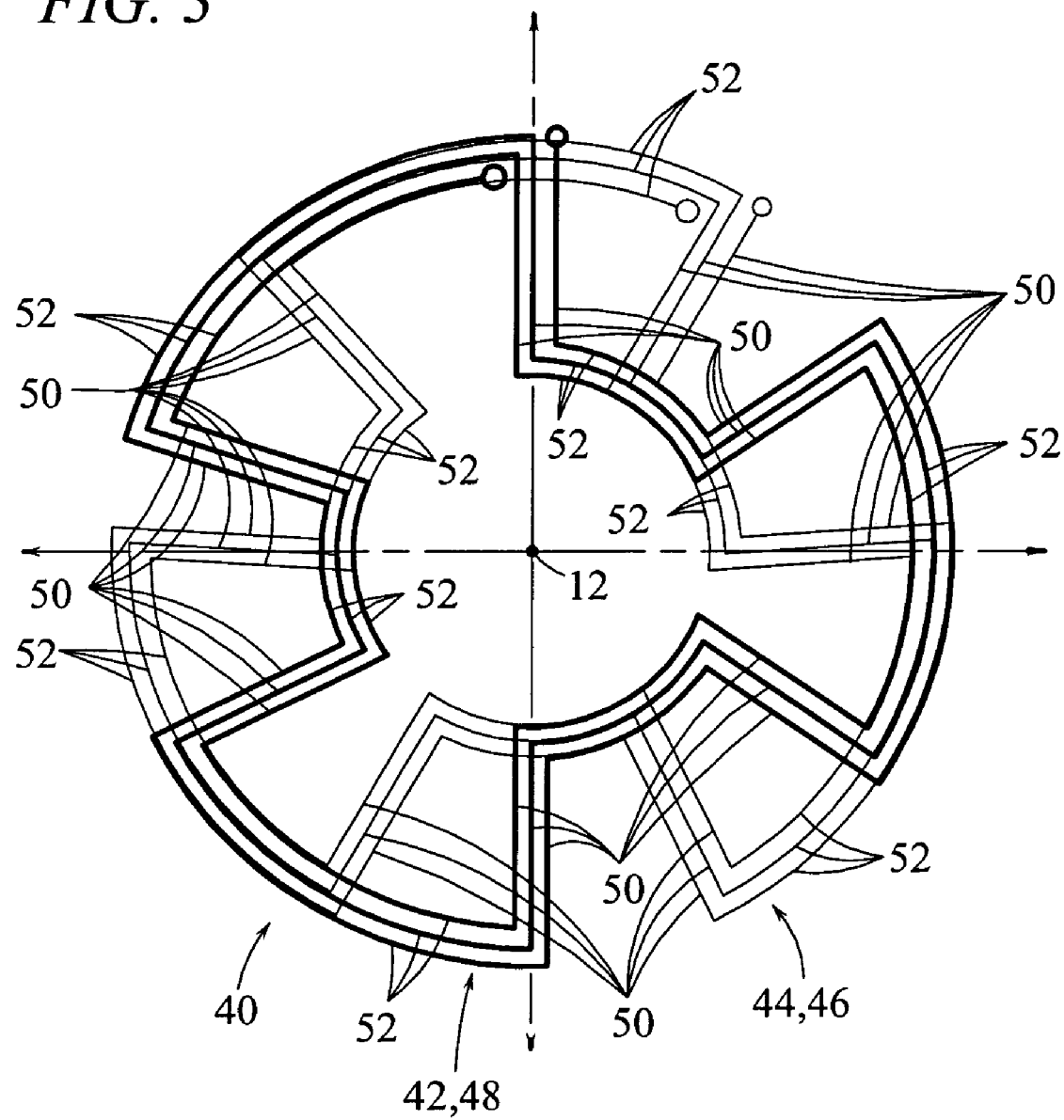
FIG. 3 depicts a partial view of a tachometer coil arrangement in the circuit interconnection.

FIGS. 1 and 3 depict the circuit assembly 30. The circuit assembly 30 includes, but is not limited to; a plurality of sense coils 40, a low-resolution Hall sensor set 34, and a high-resolution position sensor 36. The circuit assembly 30 is placed parallel to and in close proximity to the axial end of the rotating magnet assembly 24. A circuit interconnection 38 provides electrical interconnection of the circuit assembly 30 components and may be characterized by various technologies such as hand wiring, a printed card, flexible circuit, lead frame, ceramic substrate, or other circuit connection fabrication or methodology. A preferred embodiment for the circuit assembly 30 comprises the abovementioned elements affixed to a printed circuit board circuit interconnection 38 of multiple layers.

The sense coils 40 are located on the circuit assembly 30 in such an orientation as to be concentric with the magnet assembly 24 about the rotation axis 12 in close proximity to the inner annulus low-resolution magnet set 26. In a preferred embodiment, the sense coils 40 are conductive and an integral part of the circuit interconnection 38. The sense coils 40 include, but are not limited to, two or more spiraling conductor coils concentrically wound in a serpentine fashion about the rotation axis 12 such that each coil includes 24 turns comprising two twelve turn windings on separate layers. Coil A is comprised of windings 42 and 48 and coil B is comprised of windings 44 and 46. Each of the windings is configured such that it spirals inward toward the rotation axis 12 on one layer and outward from the rotation axis 12 on the second layer. Thereby, the effects of the windings' physical construction variances on the induced voltages are minimized. Further, the sense coils 40 are physically arranged such that each has an equivalent effective depth on the circuit assembly 30. That is, the windings are stacked within the circuit assembly 30 such that the average axial distance from the magnets is maintained constant. For example, the first layer of coil A, winding 42 may be the most distant from the magnets, and the second layer of coil A, winding 48 the closest to the magnets, while the two layers of coil B winding 44 and winding 46 could be sandwiched between the two layered windings of coil A. The exact configuration of the coil and winding arrangement stated is illustrative only, many configurations are possible and within the scope of the invention. The key operative function is to minimize the effects of multiple winding effective distances (gaps) on the induced voltages. While two twelve turn windings are described, the coils need only be configured to allow adequate detection in light of the magnetic field strength, processing employed, physical and operational constraints.

FIG. 3 depicts a partial view of a preferred embodiment. Three turns of the first layer of coil A, winding 42 are shown. Each winding is comprised of six active segments 50 and six inactive segments 52 per turn. The active segments 50 are oriented approximately on radials from the center of the spiral while the inactive segments 52 are oriented as arcs of constant radius. The active segments 50 are strategically positioned equidistant about the circumference of the spiral and directly cutting the flux lines of the field generated by the low-resolution magnet set 26. The inactive segments 52 are positioned at equal radial distances and are strategically placed to be outside the magnetic flux lines from the low-resolution magnet set 26. One skilled in the art will appreciate that the winding is uniquely configured as described to provide maximum voltage generation with each passing pole of the low-resolution magnet set 26 in the active segments 50 and minimal or no voltage generation with each passing pole of the low-resolution magnet 26 in the inactive segments 52. The abovementioned configuration results in predictable voltage outputs on the sense coils 40 for each rotation of the low-resolution magnet set 26. A preferred embodiment employs two coils, on two layers each with 144 active segments and 144 inactive segments. However, it will be understood that only the quantity of active segments 50 not the inactive segments 52 is relevant. Any number of inactive segments 52 is feasible, only dictated by the physical constraints of interconnecting the active segments 50.

Figure 4:
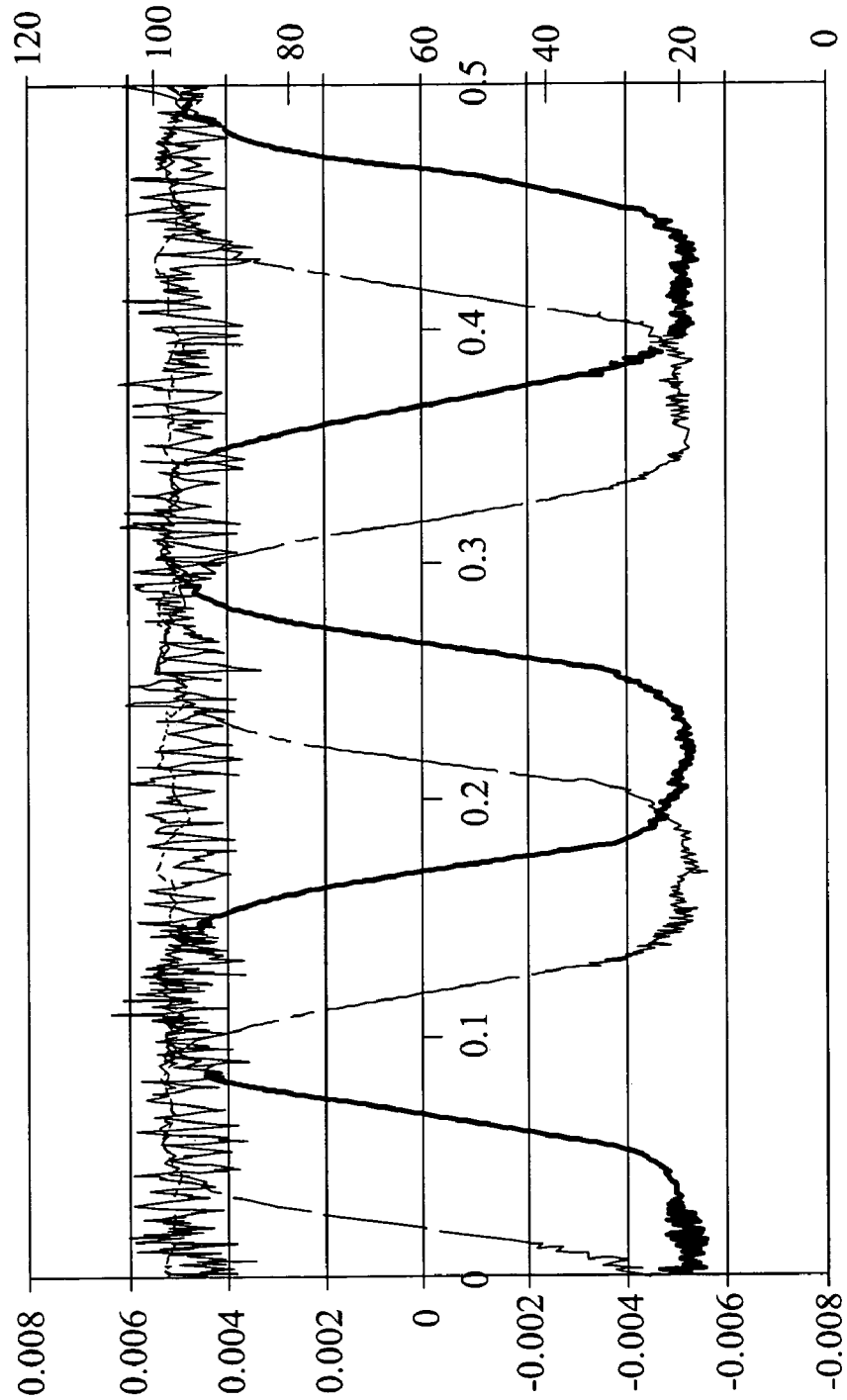
FIG. 4 depicts the expected output waveform from the low-resolution sense coils.
Figure 6:
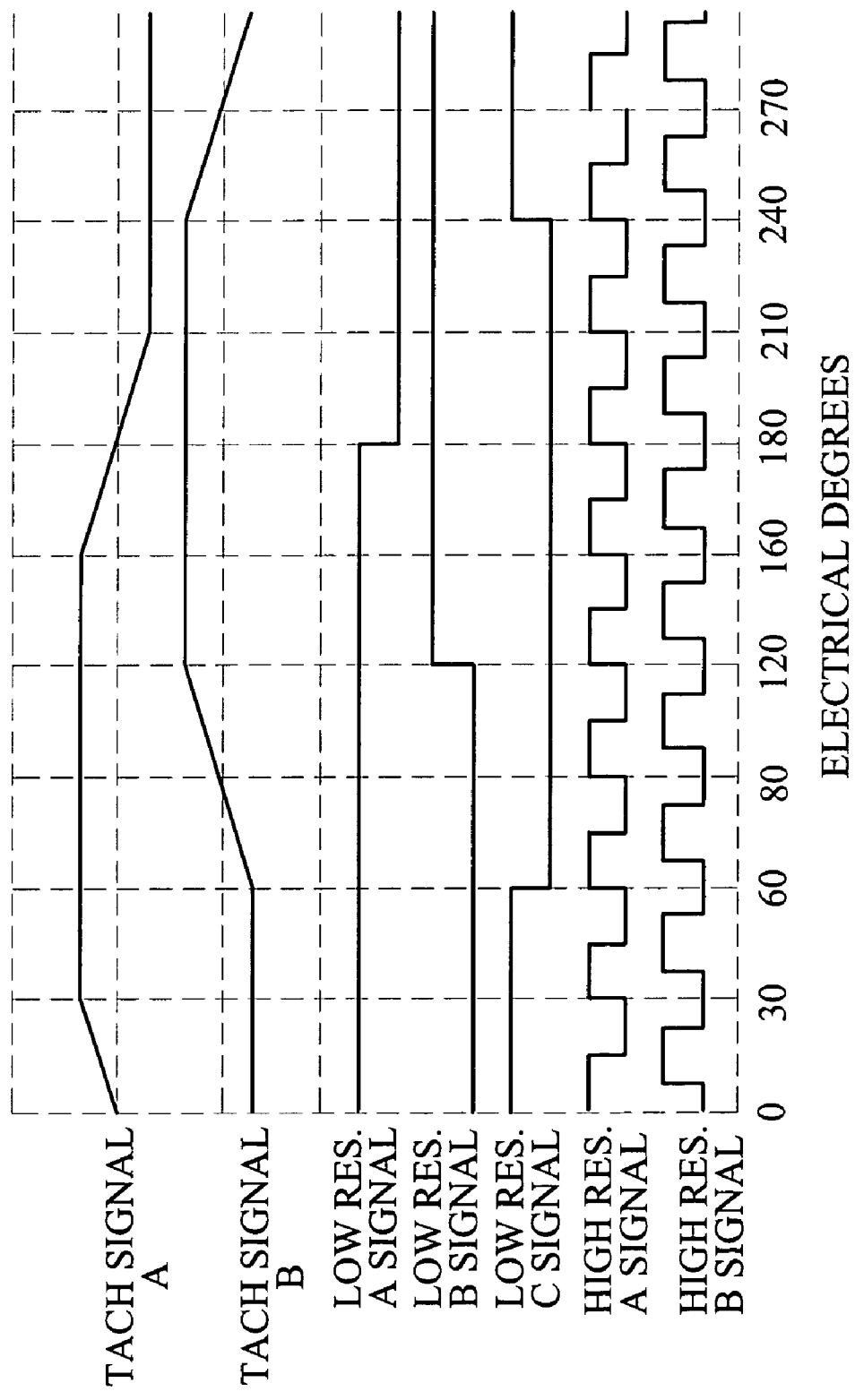
FIG. 6 depicts the expected output waveform from the high-resolution position sensor.

Additionally, the sense coils 40 comprised two (or more) complete spiral serpentine windings 42–48, 44–46. The sets of windings 42–48 and 44–46 may be oriented relative to one another in such a way that the voltages generated by the two sense coils 40 would possess differing phase relationships. For example by rotation of the sense coils 40 relative to one another about the rotation axis 12. Further, it will be appreciated that, the orientation may be configured in such a way as to cause the generated voltages to be in quadrature. In a preferred embodiment where the low-resolution magnet set 26 comprises six magnets of sixty degree segments, the two coils are rotated about the rotation axis 12 concentrically relative to one another by thirty degrees. This rotation results in a phase difference of 90 degrees between the two generated voltages generated on each coil. In an exemplary embodiment, the two generated voltages are ideally configured such that the voltage amplitude is discernable for all positions and velocities. In an exemplary embodiment, the two generated voltages are substantially trapezoidal. FIG. 4 and FIG. 6 depicts the output voltage generated on the two sense coils 40 as a function of rotation angle of the rotating shaft 22 for a given speed.

Figure 5:
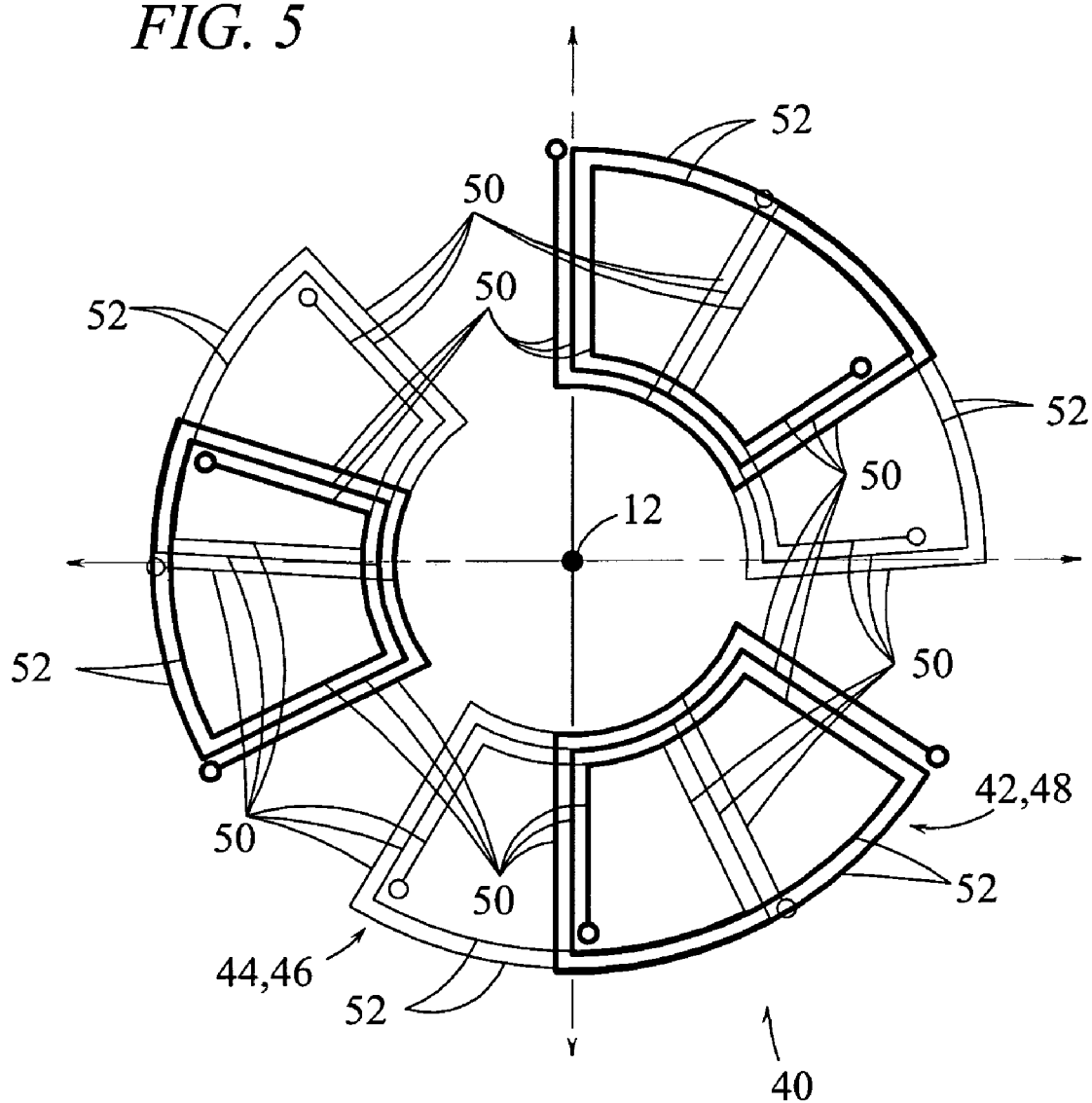
FIG. 5 depicts a partial view of an alternative embodiment of the tachometer coil arrangement in the circuit interconnection board.

In another embodiment of the invention, the windings may be individually serpentine but not necessarily concentric. Again, the sense coils 40 need only be configured to allow adequate detection in light of the magnetic field strength, processing employed, physical and operational constraints. One skilled in the art would recognize that the coil could be comprised of many other configurations of windings. FIG. 5 depicts one such a possible embodiment.

Referring again to FIG. 1, in a preferred embodiment, the Hall sensor set 34 is located on the circuit assembly 30 in an orientation concentric with the sense coils 40 and concentric with the rotating part 20. Additionally, the Hall sensor set is placed at the same radius as the active segments 50 of the sense coils 40 to be directly in line axially with the low-resolution magnet set 26 of the magnet assembly 24. The Hall sensor set 34 comprises multiple sensors equidistantly separated along an arc length where two such sensors are spaced equidistant from the sensor between them. In an exemplary embodiment, the Hall sensor set 34 includes, but is not limited to, three Hall effect sensors, 34*a*, 34*b*, and 34*c*, separated by 40 degrees and oriented along the described circumference relative to a predetermined reference position so that absolute rotational position of the rotating part 20 may be determined. Further, the Hall sensor set 34 is positioned to insure that the active segments 50 of the sense coils 40 do not interfere with any of the Hall sensors 34*a*, 34*b*, and 34*c* or vice versa. It is also noteworthy to consider that in FIG. 1, the Hall sensor set 34 is depicted on the distant side of the circuit assembly 30 relative to the low-resolution magnet 26. This configuration represents a balancing trade between placing the Hall sensor set 34 or the sense coils 40 closest to the low-resolution magnet set 26. In a preferred embodiment, such a configuration is selected because the signals from the Hall sensor set 34 are more readily compensated for the additional displacement when compared to the voltages generated on the sense coils 40. Conversely, in another embodiment, it may be desired to alter the depicted configuration of the magnet assembly 24 and place the Hall sensor set 34 on the near side of the circuit assembly 30 in more direct proximity to the sense coils 40 (as is depicted for the position sensor 36). Such a configuration simplifies the depth of the apparatus and at the same time facilitates placing other components on the distant side of the circuit assembly 30 for example other circuit components, shielding, a flux concentrator and the like, including combinations thereof. It will be appreciated by those skilled in the art that numerous variations on the described arrangement may be contemplated and within the scope of this invention. The Hall sensor set 34 detects the passing of the low-resolution magnet set 26 and provides a signal voltage corresponding to the passing of each pole. This provides a position sensing functionality with the signal voltage accurately defining the absolute position of the rotational part 20. Again, in the preferred embodiment, the three signals generated by the Hall sensor set 34 with the six-pole low-resolution magnet facilitate processing by ensuring that certain states of the three signals are never possible. One skilled in the art will appreciate that such a configuration facilitates error and failure detection and ensures that the trio of signals always represents a deterministic solution for all possible rotational positions.

The position sensor 36 is located on the circuit assembly 30 in such an orientation as to be directly in line, axially with the magnets of the outer annulus of the magnet assembly 24, yet outside the effect of the field of the low-resolution magnet set 26. The position sensor 36 detects the passing of the high-resolution magnet set 28 and provides a signal voltage corresponding to the passing of each pole. To facilitate detection at all instances and enhance detectability, the position sensor 36 includes, but is not limited to, two Hall effect sensors in a single package separated by a distance equivalent to one half the width of the poles on the high-resolution magnet set 28. Thus, with such a configuration the position signals generated by the position sensor 36 are in quadrature. One skilled in the art will appreciate that the quadrature signal facilitates processing by ensuring that one of the two signals is always deterministic for all possible positions. Further, such a signal configuration allows secondary processing to assess signal validity. FIG. 6 depicts the output voltage as a function of rotational angle of the position sensor 36 for a given speed. It is noteworthy to point out that the processing of the high-resolution position allows only a relative determination of rotational position. It is however, acting in conjunction with the information provided by the low-resolution position signals from the Hall sensor set 34 that a determination of the absolute position of the rotating part 20 is achieved. Other applications of the low-resolution position sensor are possible.

In another embodiment of the invention, the structure described above is constructed in such a fashion that the active segments of the sense coils 40 are at a radial proximity to the magnet assemblies instead of axial. In such an embodiment, the prior description is applicable except the rotational part 20 includes magnets that are coaxial but not coplanar and are oriented such that their magnetic fields radiate in the radial direction rather than the axial direction. Further, the circuit assembly 30 may be formed cylindrically rather than planar and coaxial with the rotational part 20. Finally, the sense coils 40, Hall sensor set 34, and position sensor 36, are oriented such that the active segments 50 are oriented in the axial direction in order to detect the passing magnetic field of the low-resolution magnet set 26.

Apparatus and Structure: Sinusoidal Response

In yet another embodiment, a modification to the abovementioned sense coils 40 is disclosed. This alternative embodiment provides a tachometer coil 40 configuration that yields a sinusoidal induced voltage and output response. A sinusoidal response characteristic includes the inherent benefit of facilitating accurate processing of the induced voltages.

Figure 14:
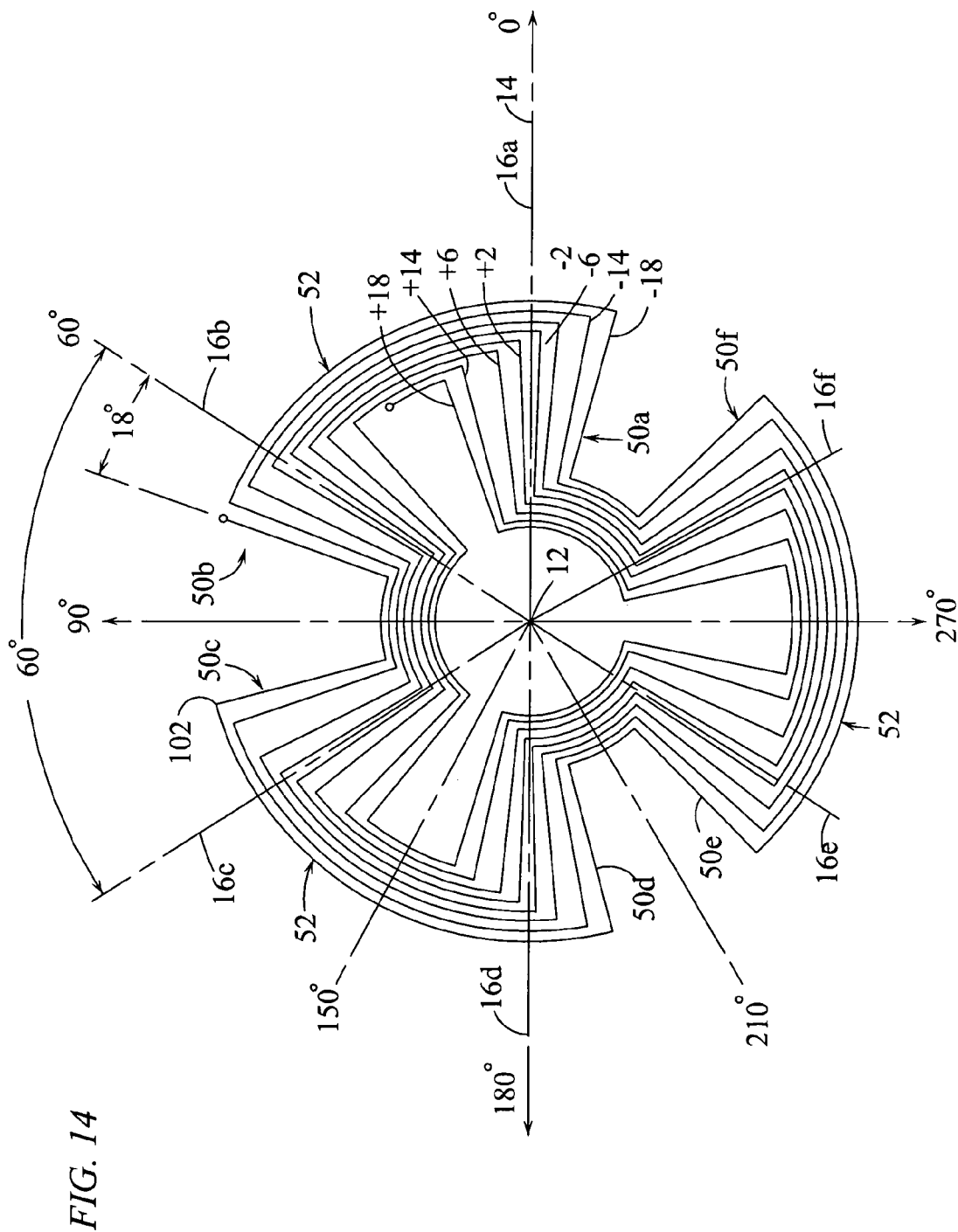
FIG. 14 depicts a partial view of another alternative embodiment of the tachometer coil arrangement in the circuit interconnection board for sinusoidal output response.
Figure 31:
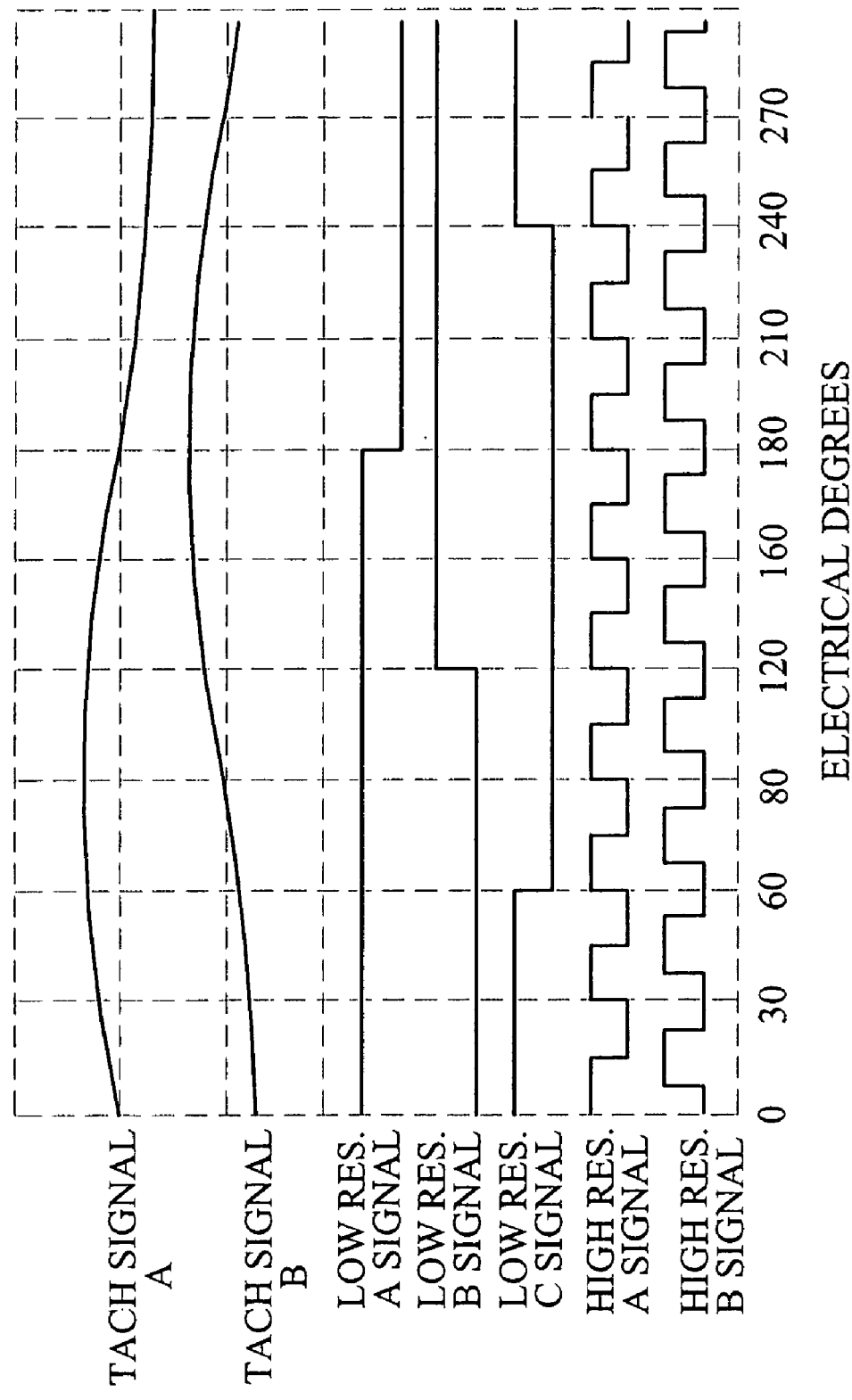
FIG. 31 depicts the tachometer coil output voltages and output waveform from the high-resolution position sensor of an exemplary embodiment.

Referring once again to FIGS. 1 and 2, and now referring as well to FIGS. 14 and 31, the sense coils 40 may once again be located on the circuit assembly 30 in such an orientation as to be concentric with the magnet assembly 24 in close proximity to the inner annulus low-resolution magnet set 26. Also in this embodiment, the sense coils 40 are conductive and an integral part of the circuit interconnection 38. Furthemore, in this embodiment, the sense coils 40 include two or more spiraling conductor coils 42–48 concentrically wound about the rotation axis 12 in a serpentine fashion such that each conductor includes, but is not limited to, a 16 turn winding comprised of 8 turns on each of two layers. Coil A is comprised of windings 42 and 48 and coil B is comprised of windings 44 and 46. Each of the windings is configured such that it spirals inward toward the rotation axis 12 on one layer and outward from the rotation axis 12 on the second layer. Thereby, the effects of the windings' physical construction variances on the induced voltages are minimized. Further, the sense coils 40 are physically arranged such that each has an equivalent effective depth on the circuit assembly 30. That is, the windings are stacked within the circuit assembly 30 such that the average axial distance from the magnets is maintained constant. For example, the first layer of coil A, winding 42 could be the most distant from the magnets, and the second layer of coil A, winding 48 the closest to the magnets, while the two layers of coil B 44 and 46 could be sandwiched between the two layered windings of coil A. Finally, in distinction to the abovementioned embodiments, the sense coils 40 are arranged on the circuit assembly 30 with a configuration to ensure that substantially a fundamental frequency of a sinusoid is produced and the harmonics of that fundamental frequency are cancelled. In particular, for each winding 42, 48 of coil A and 44, 46 of coil B, particular conductors are pivoted about the rotation axis 12 of the poles by a selected angular displacement. Once again, the exact configuration of the coil and winding arrangement stated is illustrative only, many configurations are possible and within the scope of the invention. The operative functionality being minimizing the effects of multiple winding effective distances (gaps) on the induced voltages. While two sixteen turn coils are described, the sense coils 40 need only be configured to allow adequate detection in light of the magnetic field strength, processing employed, physical and operational constraints.

FIG. 14 depicts a view of this alternative embodiment. In an embodiment, eight turns of the first layer of coil A, winding 42 are shown. Each winding is comprised of six active segments 50 and six inactive segments 52 per turn. The active segments 50 are oriented approximately on radials from the center of the spiral while the inactive segments 52 are orientated as arcs of constant radius. The active segments 50 are strategically positioned about the circumference of the spiral and directly cutting the flux lines of the field generated by the low-resolution magnet set 26. The inactive segments 52 are positioned at substantially equal radial distances and are strategically placed to be outside the magnetic flux lines from the low-resolution magnet set 26, thereby ensuring that no voltage is induced in the inactive segments 52. Also unique to this alternative embodiment, is that each conductor of the active segments 52 for a respective turn of the eight turns is pivoted concentrically about the rotation axis 12 by a selected number of degrees. More specifically, in an exemplary embodiment including two sense coils 40, each comprising two windings, one on each of two layers. Considering each turn of a respective winding (e.g. 42, 44, 46, 48), each of the active segments 50 of the eight turns is pivoted concentrically about the rotation axis 12 by a selected number of degrees of angular displacement from a center of a pole 16. The center of the pole being an arbitrarily selected reference point for measurement and alignment between the sense coils 40 and the low-resolution magnet set 26 generally characterized as the center of a pole of the low-resolution magnet set 26 placed at a particular rotational orientation. In an embodiment, six pole centers corresponding to the six poles of the low-resolution magnet set 26 are utilized for descriptive references of the layout of the sense coils 40. It is evident that other referencing entities and methods are possible. Referring to FIG. 14, the horizontal axis 14 indicates the pole center 16 for a first pole the remaining poles and respective pole centers 16 are spaced equidistant at 60-degree intervals counterclockwise about the rotation axis 12.

Figure 16:
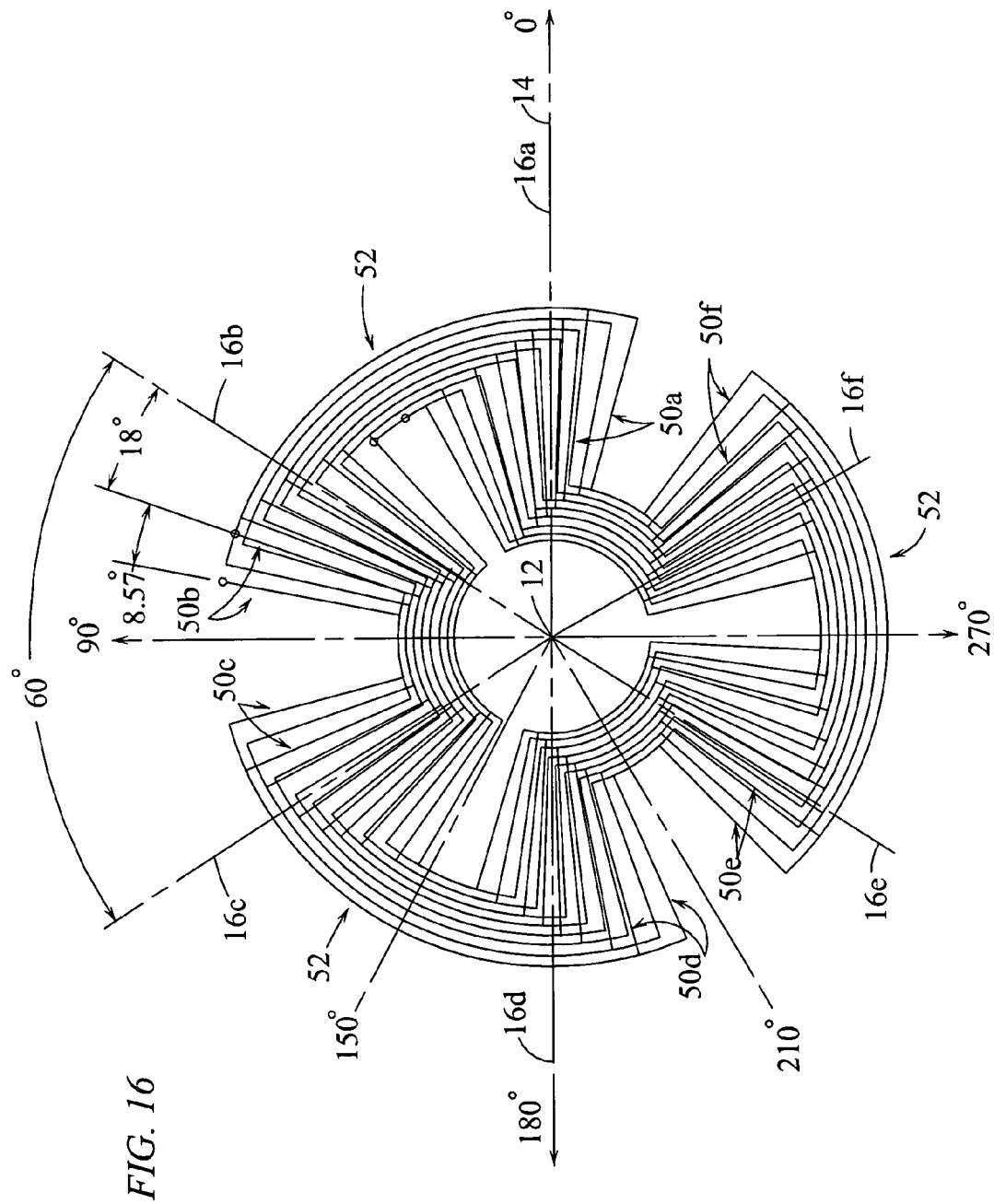
FIG. 16 depicts two windings of one tachometer coil with rotation for seventh harmonic cancellation.

The rotation described above results in a winding configuration that facilitates maximum fundamental voltage generation and yet cancellation of the third, fifth, and seventh harmonics. FIG. 15 depicts a table and a vector diagram that illustrates the addition of the individual contributions from the active segments 50 to the overall voltage generated. FIG. 15A depicts the vector diagram for the fundamental frequency. FIG. 15B depicts the vector diagram for the third harmonic. Finally, FIG. 15C depicts the vector diagram for the fifth harmonic. It will be evident that the contributions to the fundamental frequency are additive, while in the case of the third and fifth harmonic, the contributions from the individual active segments 50 are oriented such that they cancel one another. To effect the cancellation of the seventh harmonic, it is desirable to orient the windings such that the contributions for the seventh harmonic cancel. To effect such a cancellation, one winding of each of the winding pairs that comprise the sense coils is rotated relative to the other winding. In an exemplary embodiment, the rotation is by 8.57 degrees from one winding on one layer to the other winding on another layer. For example, for coil A of the sense coils 40, winding 48 may be rotated in its entirety about the rotation axis 12 relative to winding 42. Likewise for coil B and winding 44 and winding 46. FIG. 16 depicts two windings (e.g. 42 and 48) of one tachometer coil 40 with rotation for seventh harmonic cancellation. It is noteworthy to recognize that this rotation of 8.57 degrees corresponds to half the wavelength of the frequency that is to be eliminated. In an exemplary embodiment, the seventh harmonic corresponds a wavelength of 51.4 electrical degrees, half of which would be 25.7 degrees. It should be noted that the 25.7 electrical degrees corresponds to 8.57 mechanical degrees for a three-pole pair electric machine. Therefore, with the rotation of one of the two windings for each tachometer coil 40 the seventh harmonic components induced on one winding are out of phase with the same components induced on the other winding and thus cancel when summed.

To illustrate further, an exemplary embodiment is depicted in FIG. 14 for one winding (e.g. 42, 44, 46, 48) of one of the sense coils 40. In the figure, the horizontal axis 14 indicates the pole center 16 for a first pole, the remaining poles and respective pole centers 16 are spaced equidistant at 60-degree intervals counterclockwise about the rotation axis 12. The active segment 50 for a particular turn of the winding (e.g. 42, 44, 46, 48) will be oriented as defined in Table 1 and alternating for each subsequent pole. For example, for the outermost turn (conductor 1) the first active segment 50a will be located −18 degrees (clockwise) from the pole center 16a at the horizontal axis 14 and the second active segment 50b will be at +18 degrees from the second pole center 16b at 60 degrees or 78 degrees counter clockwise from the horizontal axis. Moreover, the third active segment 50c will be at −18 degrees from the third pole center 16c another 60 degrees counterclockwise or 102 degrees from the horizontal axis 14. In addition, the fourth active segment 50d will be +18 degrees from the fourth pole center 16d or 198 degrees counterclockwise from the horizontal axis. Likewise, the fifth active segment 50e will be −18 degrees from the fifth pole center 16e or 228 degrees counterclockwise from the horizontal axis. Finally, to complete the turn, the sixth active segment 50f will be +18 degrees from the sixth pole center 16f or 318 degrees counterclockwise from the horizontal axis.

| Active Segment Conductor # | Degrees Offset (at Horizontal Axis) | Degrees Offset (Subsequent Pole) |
|---|---|---|
| 1 | −18 | +18 |
| 2 | −14 | +14 |
| 3 | −6 | +6 |
| 4 | −2 | +2 |
| 5 | +2 | −2 |
| 6 | +6 | −6 |
| 7 | +14 | −14 |
| 8 | +18 | −18 |

Continuing along the same concept for the second to outermost turn (conductor 2), the active segments 50 will be at −14 and +14 degrees from the respective pole centers 16a, 16b, 16c, 16d, 16e, and 16f. Ultimately concluding with the innermost turn (conductor 8) with the active segments placed at −18 degrees from each of the pole centers 16a, 16b, 16c, 16d, 16e, and 16f respectively. It is noteworthy to appreciate at this time that the inactive segments 52 are configured and arranged as described earlier and merely provided the electrical interconnection among the active segments 50.

Once again it will appreciated that each winding is uniquely configured as described to provide maximum voltage generation with each passing pole of the low-resolution magnet set 26 in the active segments 50 and minimal or no voltage generation with each passing pole of the low-resolution magnet set 26 in the inactive segments 52. This results in predictable voltage outputs on the sense coils 40 for each rotation of the low-resolution magnet set 26. A exemplary embodiment employs two coils, on two layers each with 96 active segments 50 and 96 inactive segments 52. However, it will be understood that only the quantity of active segments 50 not the inactive segments 52 is relevant. Any number of inactive segments 52 is feasible, only dictated by the physical constraints of interconnecting the active segments 50.

Figure 17:
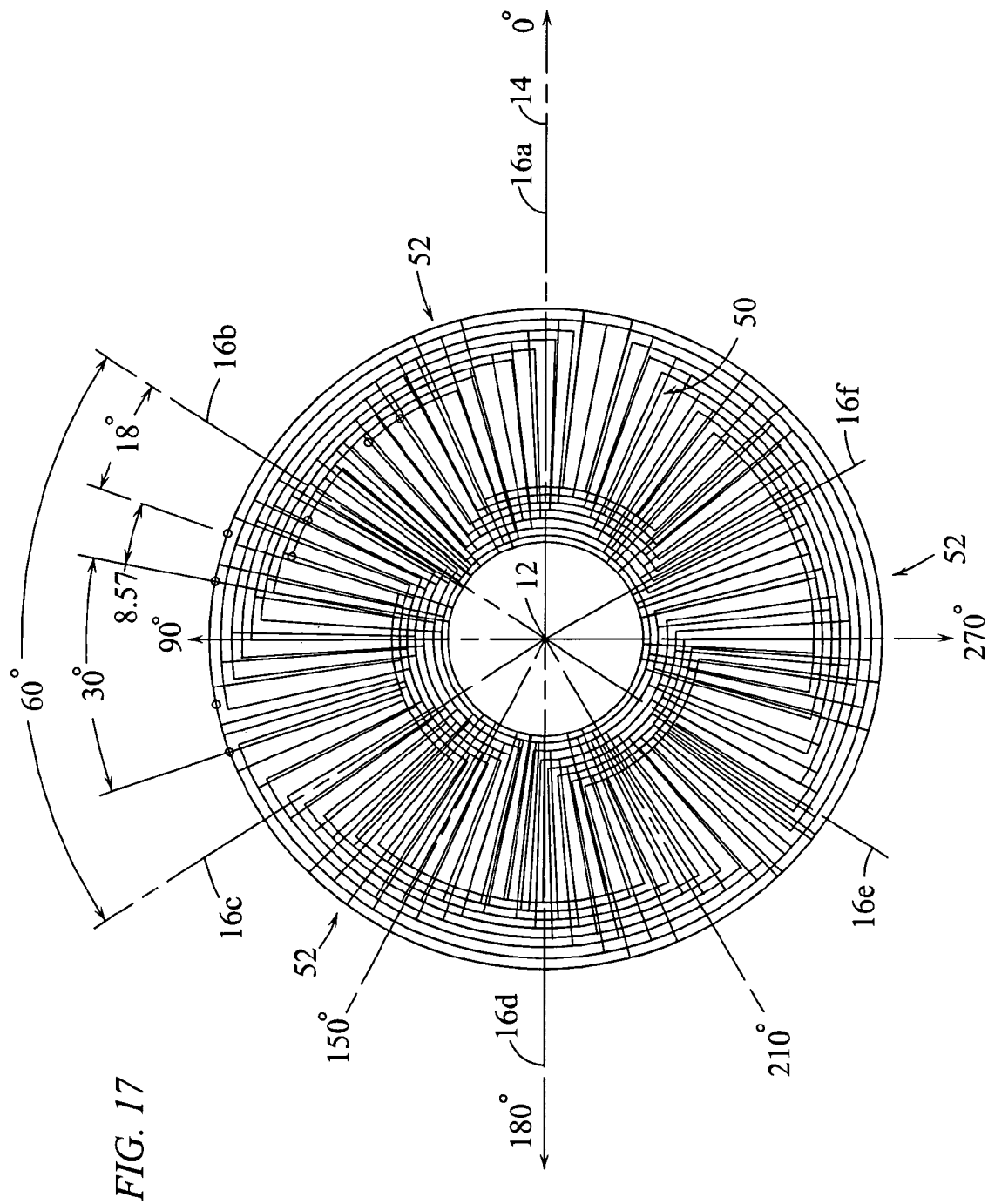
FIG. 17 depicts four windings of two sense coils overlaid.
Figure 18:
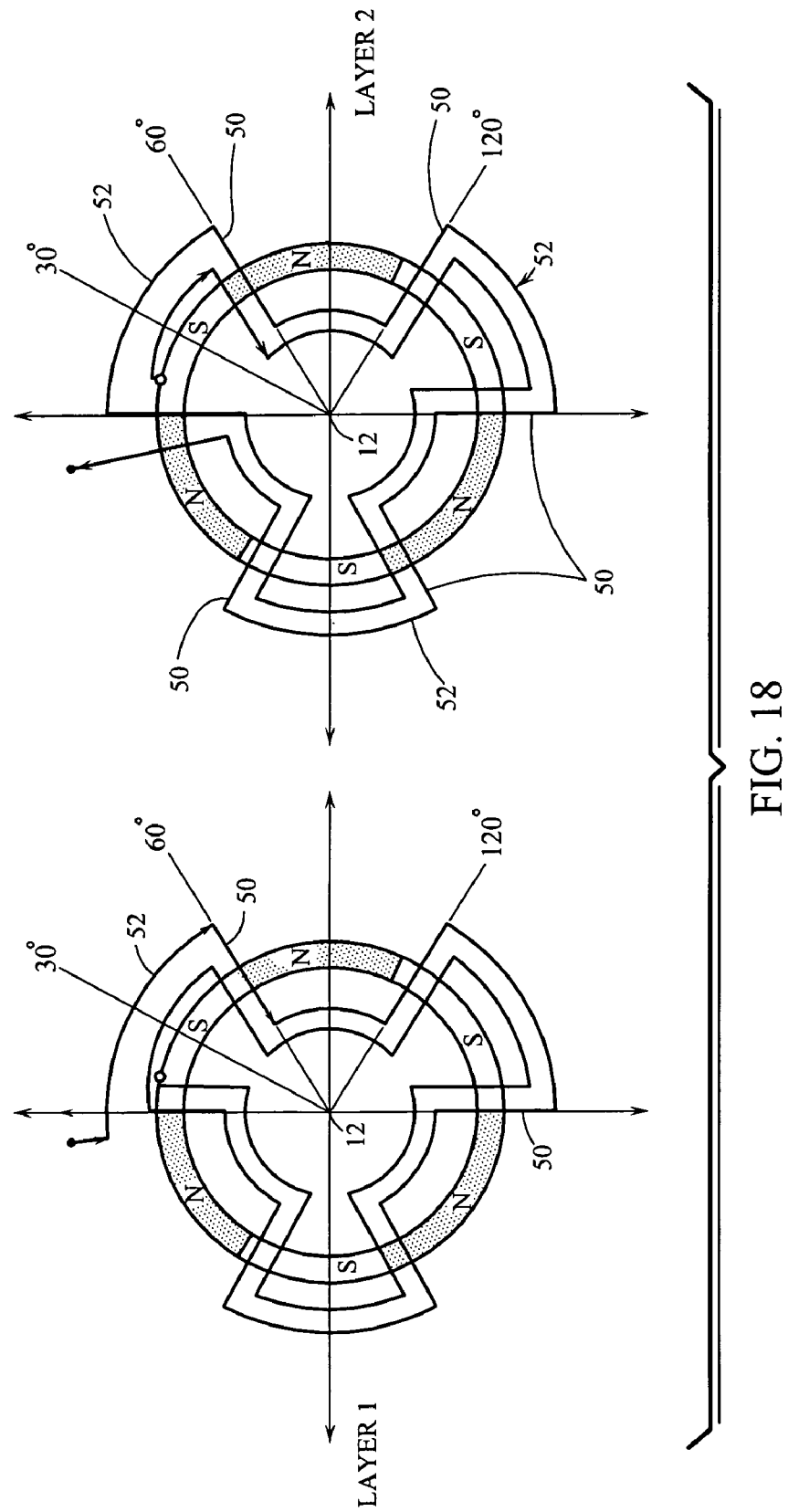
FIG. 18 depicts simplified view of two windings that comprise a tachometer coil in an exemplary embodiment.

Similarly, the sense coils 40 are once again comprised of two (or more) complete spiral serpentine windings 42–44, 46–48. The windings 42–48 and 44–46 may be oriented relative to one another in such a way that the voltages generated by the two sense coils 40 would possess differing phase relationships. Further, it will be appreciated that the orientation may be configured in such a way as to cause the generated voltages to be in quadrature. In a preferred embodiment where the low-resolution magnet set 26 includes, but is not limited to, six magnets of sixty degree segments, the two sense coils 40 are rotated concentrically relative to one another by thirty degrees. This rotation results in a phase difference of 90 degrees between the two generated voltages generated on each coil. In an exemplary embodiment, the two generated voltages are ideally configured such that the voltage amplitude is discernable for all positions and velocities. Moreover, in an exemplary embodiment by way of the configuration of the sense coils 40 the voltages generated are essentially sinusoidal. FIG. 17 depicts the four windings 42, 48, and 44, 46 of the two sense coils 40 overlaid for completeness. It should be appreciated once again, that the exact configuration of the coil and winding arrangement stated is illustrative only, many configurations are possible and within the scope of the invention. The operative functions need only be addressed in light of the configuration selected. For example, to minimize the effects of multiple winding effective distances (gaps) on the induced voltages, or to cancel induce harmonics. While two eight turn windings on two layers are described, other configurations may be possible, the coils need only be configured to allow adequate detection and harmonic can- Apparatus and Structure: Interference Cancellation Turning now to yet another alternative embodiment, disclosed herein is an enhancement to the tachometers identified in the abovementioned embodiments. In this embodiment, the orientation of the sense coils 40 is configured to avoid susceptibility to external magnetic field disturbances. Referring to FIG. 18 a simplified view of just two turns of two windings e.g., 42 and 48 or 44 and 46 that comprise a tachometer coil 40 (FIG. 3) are depicted. In the abovementioned embodiments the two windings that comprise coil A and the two windings e.g., 44 and 46 that comprise coil B of the sense coils 40 are substantially in phase combining their respective induced components. The resultant of which, is that the voltages induced in each of the windings (e.g., 42 and 48 or 44 and 46) are directly summed and additive. Therefore, in the presence of an external magnetic field, each winding is substantially equally affected resulting in the additive combination of any induced voltage resultant from an external magnetic field. To avoid this effect an alternative embodiment is disclosed, which reconfigures the sense coils 40 to minimize and cancel such an undesirable effect.

Figure 13:
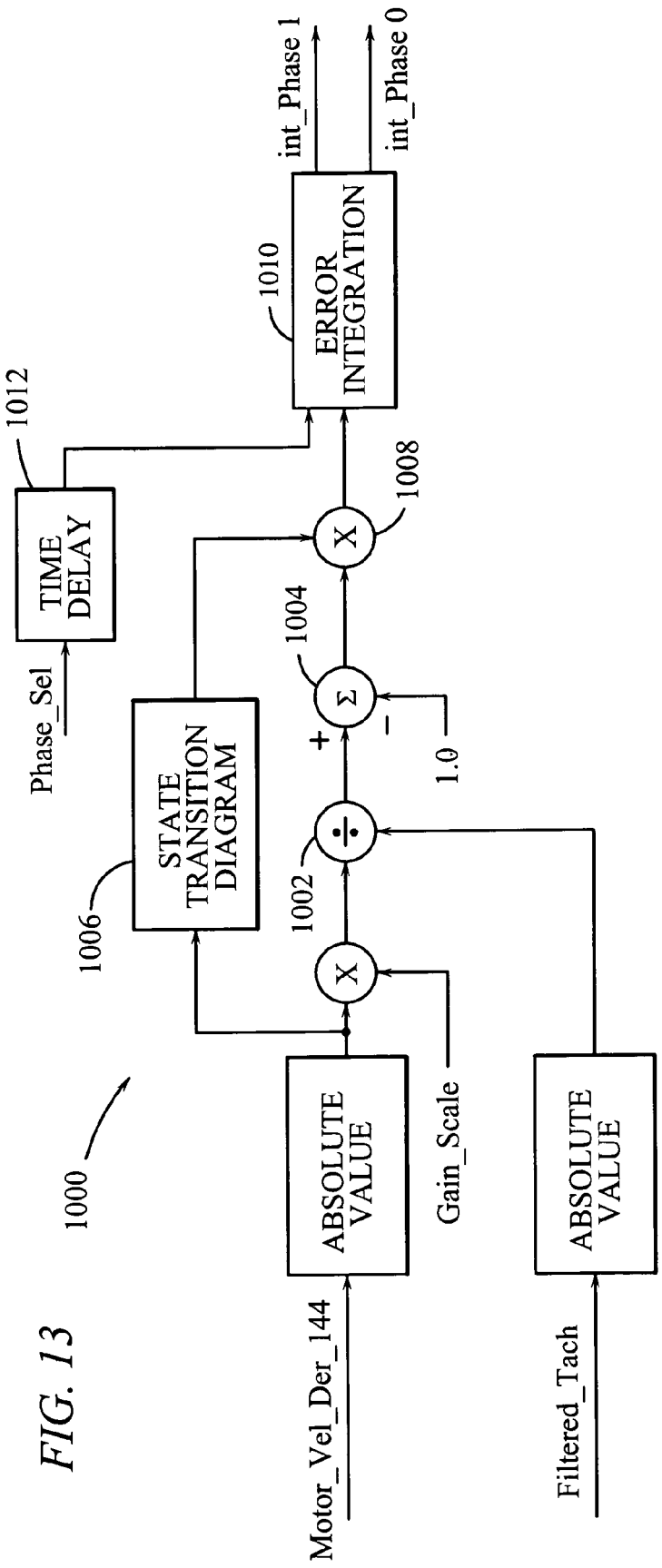
FIG. 13 depicts the Gain process.
Figure 19:
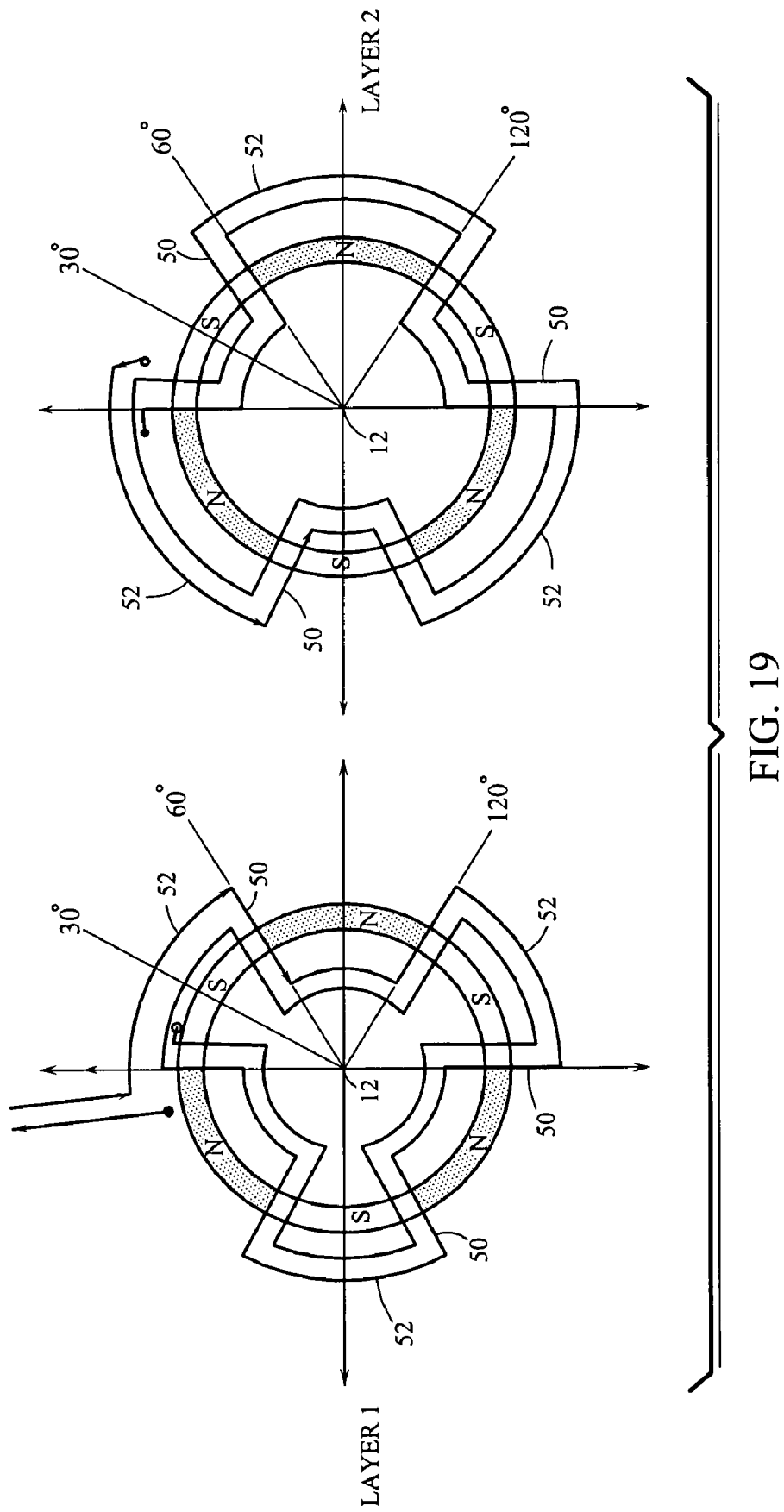
FIG. 19 depicts an alternative embodiment of a tachometer coil for magnetic field cancellation.

Referring to FIG. 19, the same two windings (e.g., 42 and 48 or 44 and 46) are shown, however, in this embodiment, the windings are pivoted about the rotation axis 12 relative to one another in a manner that results in common mode cancellation when the voltages induced on each of the windings are summed. In an exemplary embodiment, the windings are arranged such that they are 60 degrees rotated from one another. More particularly, as is shown in FIG. 13, a winding (e.g., 48) on one layer is pivoted about the rotation axis 12 relative to the other winding (e.g., 42) on another layer. Such a configuration permits at particular instances, one winding (e.g., 42) to be aligned with one polarity magnet (e.g., a north pole) of the low-resolution magnet set 26 while the other winding (e.g., 48) of the pair comprising a tachometer coil 40 is aligned with the opposite polarity magnet (e.g., a south pole) of the low-resolution magnet set 26. Moreover, the pivoted winding (e.g., 48), in this exemplary embodiment, is wound in the opposite direction than the direction that the winding 42 is wound. That is, one winding is wound clockwise while the other is wound and counterclockwise. Also unique to this embodiment, and unlike the abovementioned embodiments is that here the windings (e.g., 42, and 48) may be wound spiraling in the same direction. For example, one winding e.g., 42 is wound spiraling inward clockwise on one layer while the other winding e.g., 48, is wound spiraling inward and counterclockwise on another layer. Such a configuration causes the combined contributions to the induced voltages from the coils to accumulate the contributions from the active segments 50 as they pass the low-resolution magnet set 26, while simultaneously canceling the contributions from the inactive segments 52. This effect on the induced voltage is accomplished because, in this embodiment, the low-resolution magnet set 26 and active segments 50 are at 60 mechanical degree intervals. The 60-degree rotation of one winding e.g., 48, results in an effective phase reversal (180 degrees electrical) of the two windings (e.g., 42, and 48), or more particularly the voltage induced on the two windings (e.g., 42, and 48) from the active segments 50. That is the voltages induced by the active segments 50 on the windings 42, and 48 respectively substantially cancel. However, the change in the direction of winding for one winding e.g., 48 versus the other e.g., 42 imparts an additional phase reversal for the active segments 50 and a phase reversal for the inactive segments 52. Thereby causing the active segments 50 to once again, all exhibit in phase voltages, while the inactive segments 52 contributions remain out of phase. Thus, causing the resultant voltage output of the windings 42 and 48 to yield an induced voltage, including the cumulative contributions of the active segments, and yet cancel the contributions of voltages induced on the inactive segments 52 due to external fields. It should be evident that a particular direction of winding and spiral are not essential for one winding e.g., 48 versus the other e.g., 42. The windings (e.g., 42, and 48) need only be wound such that, the contribution to the induced voltage is cumulative for the active segments 50 and canceling for the inactive segments 52.

Figure 20:
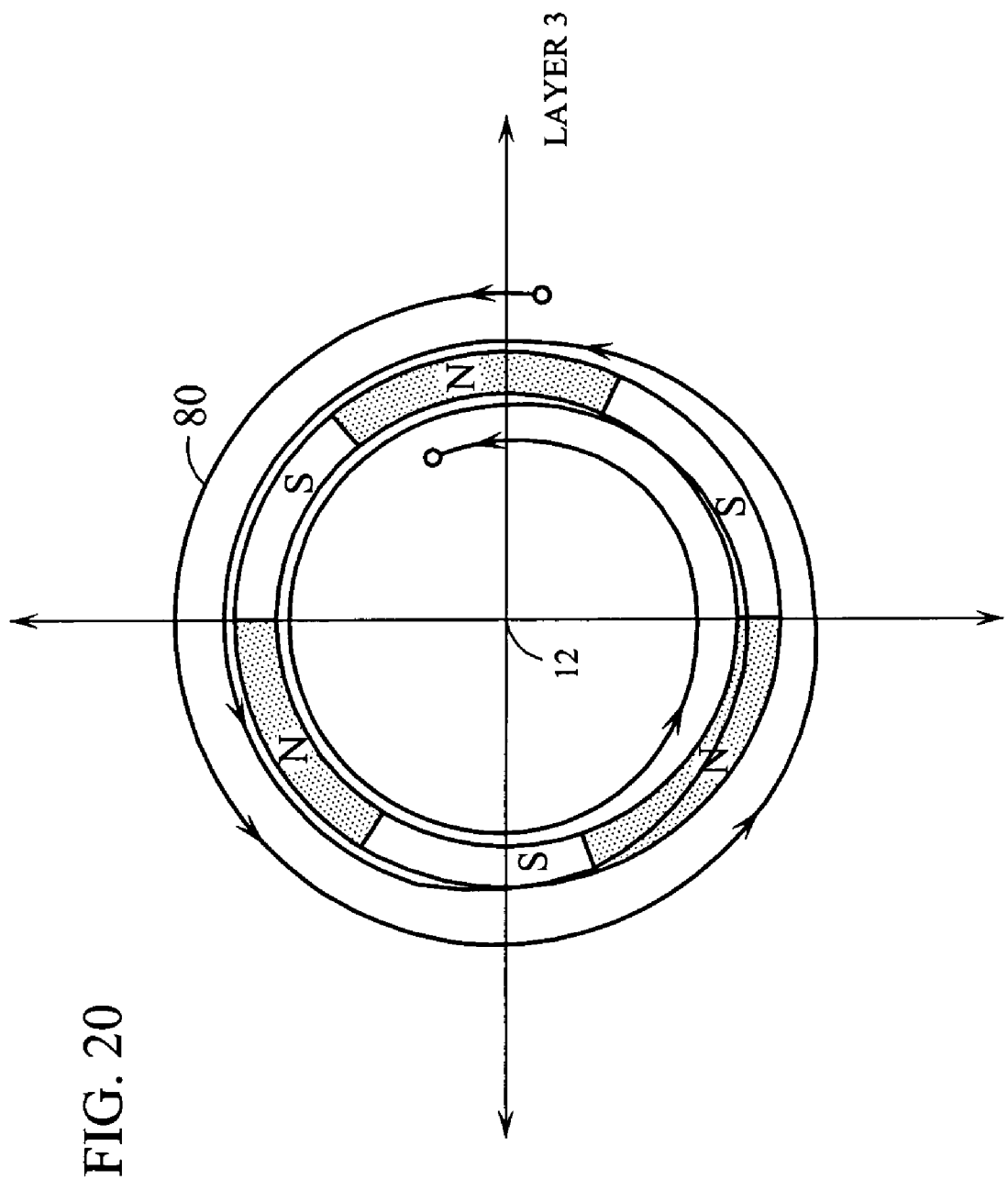
FIG. 20 depicts an exemplary cancellation coil for magnetic field cancellation.
Figure 21:
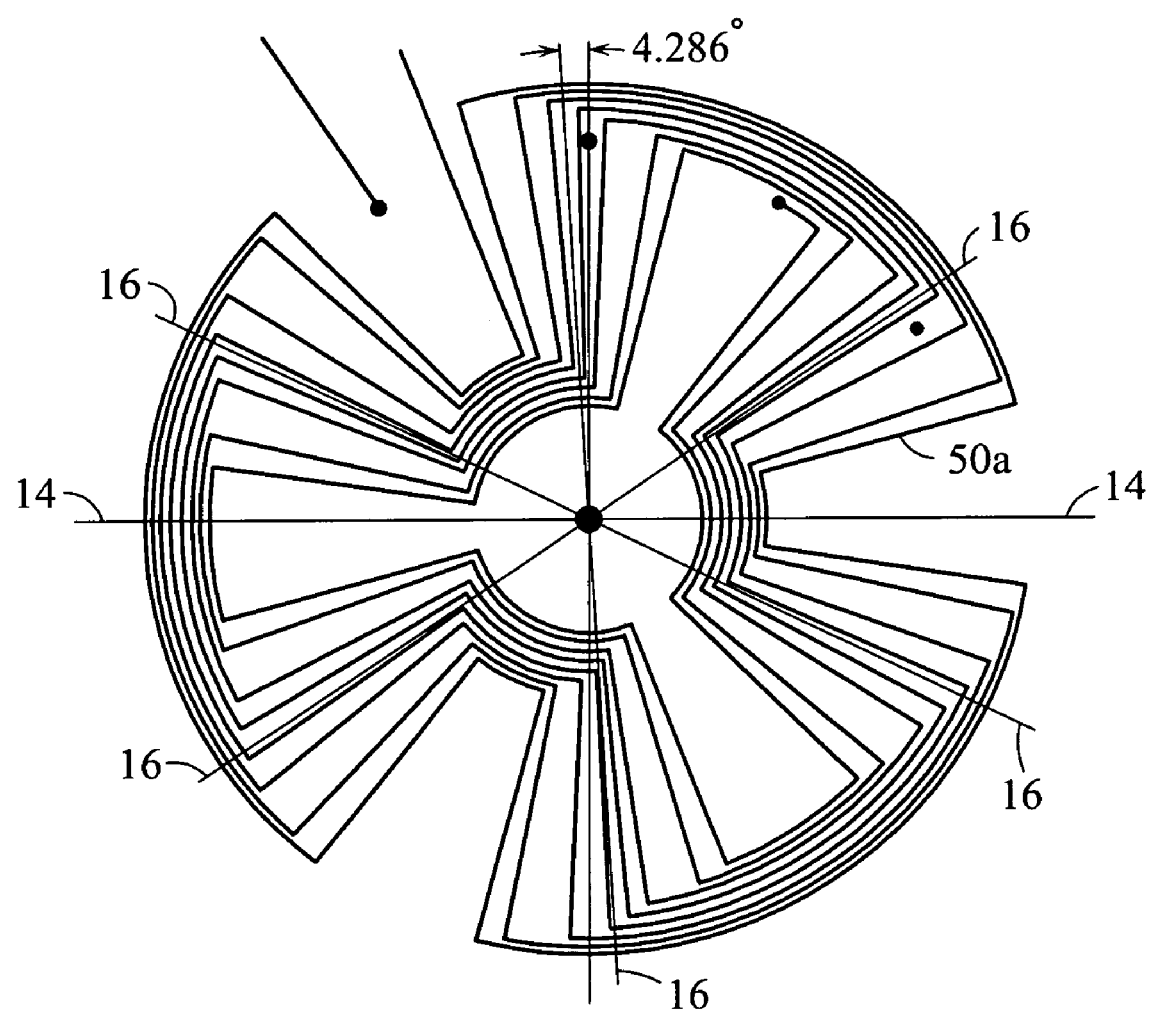
FIG. 21 depicts a first tachometer coil, first winding of the combined sinusoidal and interference cancellation configuration.
Figure 22:
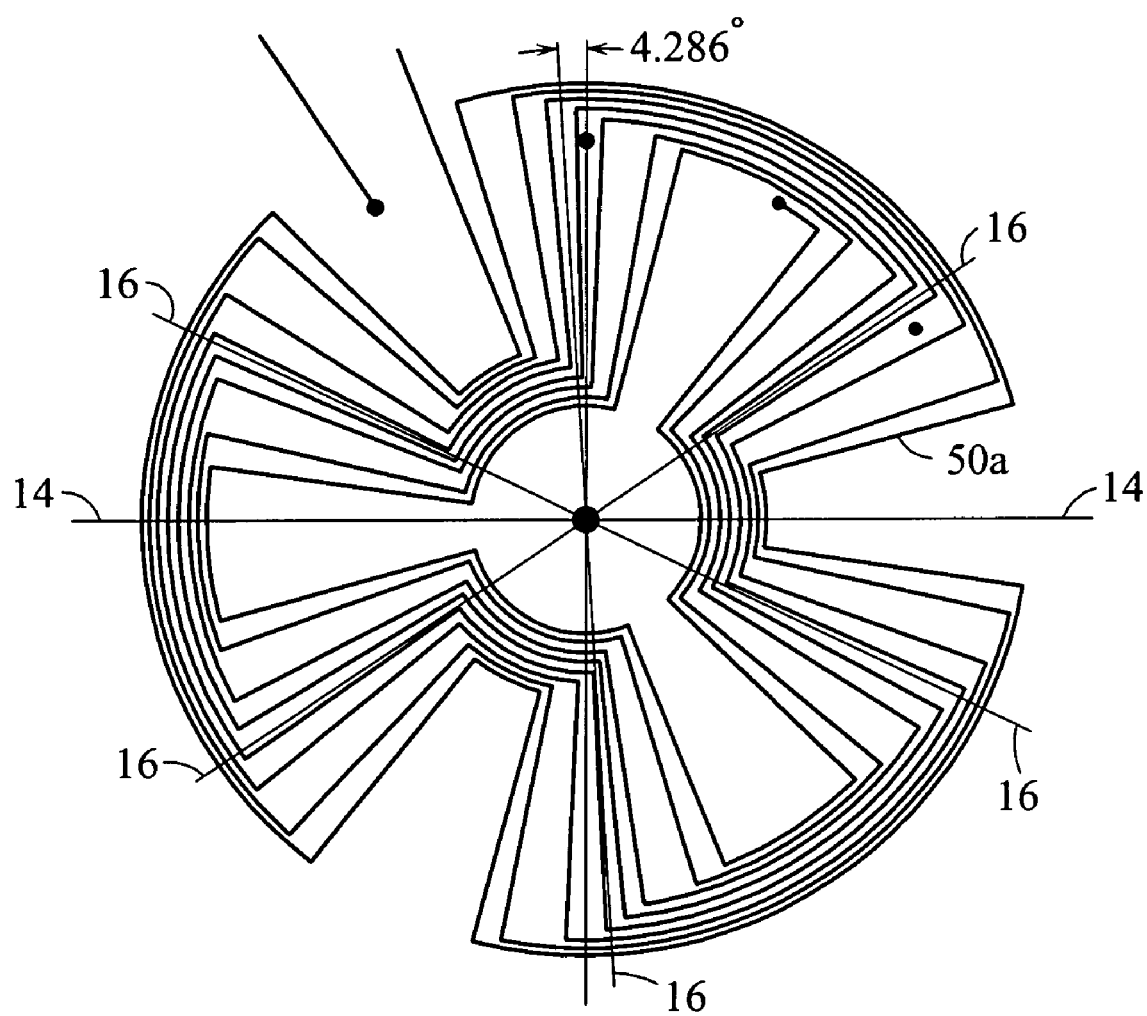
FIG. 22 depicts a first tachometer coil second winding of the combined sinusoidal and interference cancellation configuration.
Figure 23:
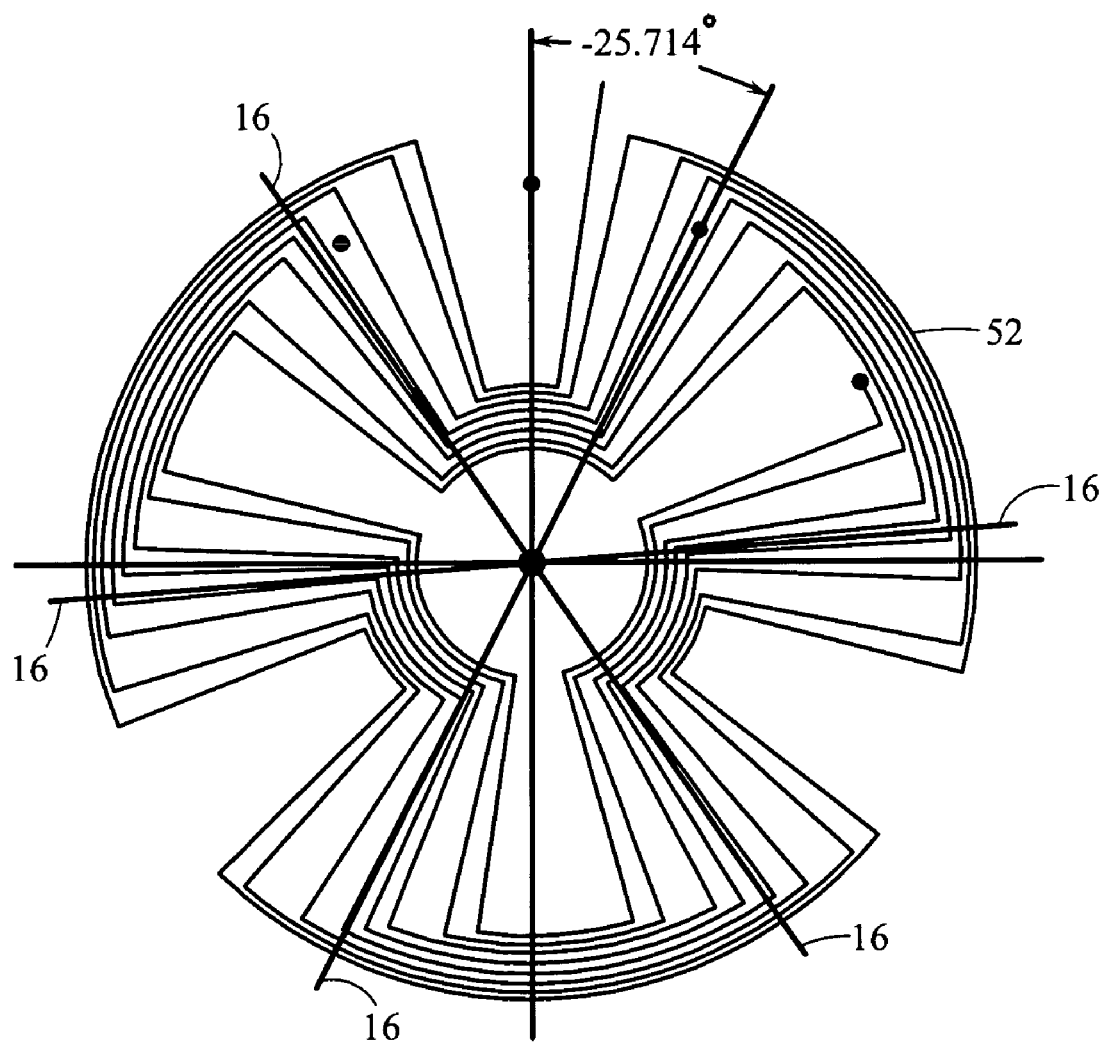
FIG. 23 depicts a second tachometer coil, first winding of the combined sinusoidal and interference cancellation configuration.
Figure 24:
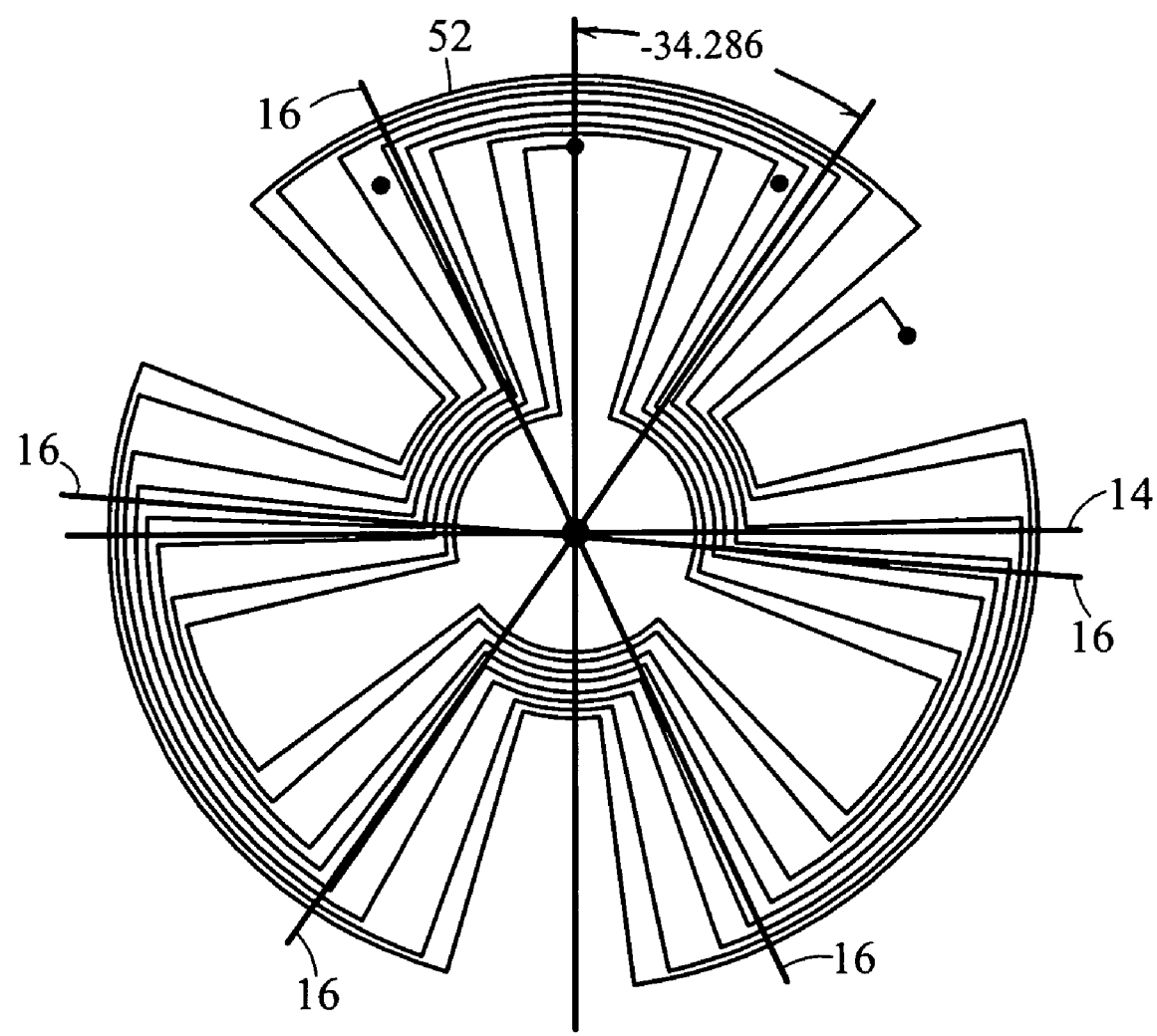
FIG. 24 depicts a second tachometer coil second winding of the combined sinusoidal and interference cancellation configuration.

In yet another variation to the above alternative embodiment, referring to FIG. 20, the implementation of the interference cancellation techniques disclosed may be implemented in a more evident approach. Another coil denoted a cancellation coil 80, substantially circular and coaxial with the sense coils 40, and more particularly, the inactive segments 52, may be employed. A cancellation coil 80 may comprise substantially the same number of turns as the sense coils 40 wound in the opposite direction of the sense coils 40 with an average diameter substantially equivalent to the average diameter of the sense coils 40. Such a cancellation coil 80, like the inactive segments 52 is configured to be insensitive to the magnetic flux from the low-resolution magnet set 26, and yet responsive to the flux from external magnetic fields. When a cancellation coil 80 is placed in combination, (in an embodiment, in series) with the sense coils 40 the voltages induced on the combination of coils will include the contributions from the active segments 50, in response to the magnetic flux from the low-resolution magnet set 26, yet not include the effects of external magnetic fields on the inactive segments 52. The effects of external magnetic fields on the inactive segments 52 will be cancelled by the voltage induced upon the cancellation coil 80.

Once again it should be noted, that the exact configuration of the coil and winding arrangement stated is illustrative only, many configurations are possible and within the scope of the invention. The operative functions need only be addressed in light of the configuration selected. For example, in the abovementioned embodiment, to minimize the effects external magnetic fields on the induced voltages, or to cancel induce harmonics. While two eight turn windings (e.g., 42 and 48) on two layers are described, other configurations may be possible, the coils (40) need only be configured to allow adequate detection, harmonic cancellation and external field cancellation in light of the magnetic field strength, number of pole pairs, processing employed, physical and operational constraints. Moreover, it is noteworthy to recognize that the cancellation coils 80 may be configured as additional circuit traces on the circuit interconnection 38 of the circuit assembly 30 or as independent coils of another discrete component.

Apparatus and Structure—Combined Sinusoidal and Interference Cancellation

It is evident that the apparatus disclosed earlier for the interference cancellation configuration of the sense coils 40 may be utilized with the configuration of sense coils 40 providing a trapezoidal response or a sinusoidal response. FIGS. 18–20 illustrate tachometer coil 40 comprising windings (e.g., 42, 48, and 44, 46) for the combination with a trapezoidal response, while FIGS. 21–24 depict the tachometer coil 40 comprising windings (e.g., 42, 48, and 44, 46) with sinusoidal response combined with the interference cancellation. It is noteworthy to appreciate that these configurations are illustrative, and that there may be other combinations of configurations possible and within the scope of this disclosure and yet not specifically enumerated here.

Signal Processing; Trapezoidal

Figure 7:
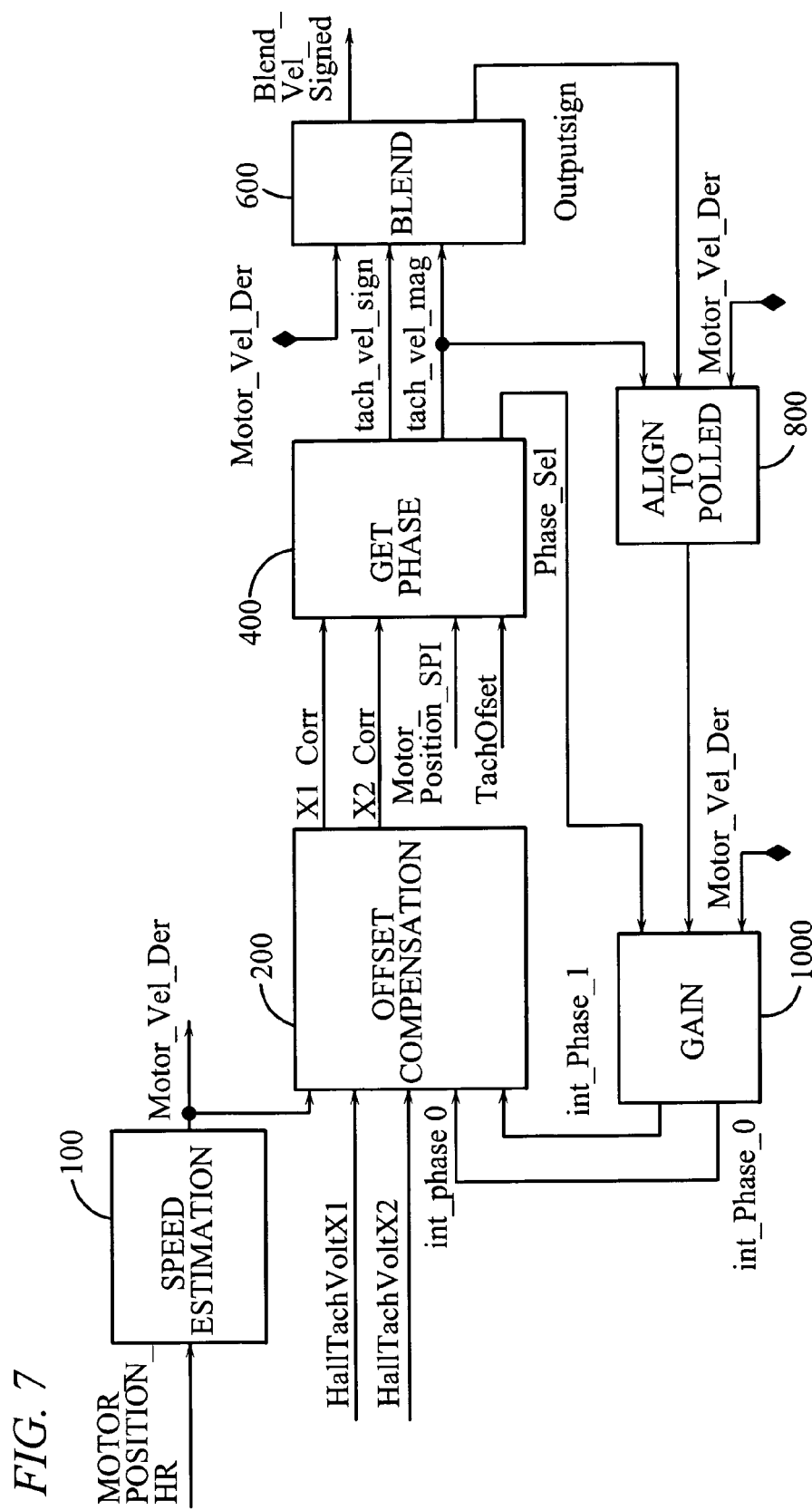
FIG. 7 depicts a top-level functional block diagram of a method for determination of the rotational speed.

FIG. 7 depicts the top-level block diagram of the processing functions employed on the various signals sensed to determine the rotational speed of a rotating device. The processing defined would be typical of what may be performed in a controller 90. Such a controller 90 may include, without limitation, a processor, logic, memory, storage, registers, timing, interrupts, and the input/output signal interfaces as required to perform the processing prescribed by the invention. The controller 90 receives as input signals two signals indicative of the velocity rotating device from the tachometer structure 10 and a position signal generated by the high resolution position sensor 36. Referring again to FIG. 7, where the blocks 100–1000 depict the adaptive algorithm executed by the abovementioned controller 90 in order to generate the tachometer output. The first four blocks 100, 200, 400, 600 perform the "forward" processing of the tachometer coil signals to arrive at the final blended output. While, the last two 800, 1000 comprise a "feedback" path thereby constructing the adaptive nature of the algorithm.

In FIG. 7, the function labeled Speed Estimation 100 generates a digital, derived velocity signal. The process utilizes Motor_Position_HR the high-resolution position sensed by the high resolution position sensor 36, and a processor clock signal for timing. The process outputs a signal Motor_Vel_Der_144, which is proportional to the velocity of the motor over the sample period of the controller. Continuing to Offset Compensation 200 where processing is performed to generate filtered tachometer signals to remove offsets and bias. The process utilizes the two tachometer coil signals HallTachVoltX1, HallTachVoltX2, the derived velocity Motor_Vel_Der_144 and two phase related feedback signals int_Phase0 and int_Phase1 as inputs and generates corrected velocity outputs X1_Corr and X2_Corr. Continuing to Get Phase 400 where processing is performed to ascertain magnitude and phase relationships of the two corrected velocities. Inputs processed include the corrected velocities X1_Corr, X2_Corr, and the motor position Motor_Position_SPI as derived from the high-resolution position detected by sensor 36. The process generates two primary outputs, the selected tachometer magnitude tach_vel_mag and the selected tachometer phase tach_vel_sign. Moving to the Blend 600 process, predetermined algorithms determine a blended velocity output. The process utilizes the selected tachometer magnitude tach_vel_mag and the selected tachometer phase tach_vel_sign to generate two outputs; the blended velocity Blend_Vel_Signed and the velocity sign OutputSign. Considering now the Align to Polled 800 process wherein the tachometer magnitude tach_vel_mag is time shifted based upon the magnitude of the derived velocity Motor_Vel_Der_144. The selected signal is filtered and supplied as an output as Filtered_Tach. Finally, looking to Gain 1000 where the process generates an error command resultant from the difference between the derived velocity and filtered tachometer under predetermined conditions. The error signal is integrated and utilized as an error command signal for gain adjustment feedback The process utilizes the derived velocity Motor_Vel_Der_144 and the Filtered_Tach signal as inputs to generate two outputs int_Phase0 and int_Phase1. These two signals form the gain adjustment feedback that is then utilized as an input in the abovementioned Offset Compensation 200.

Figure 8A:
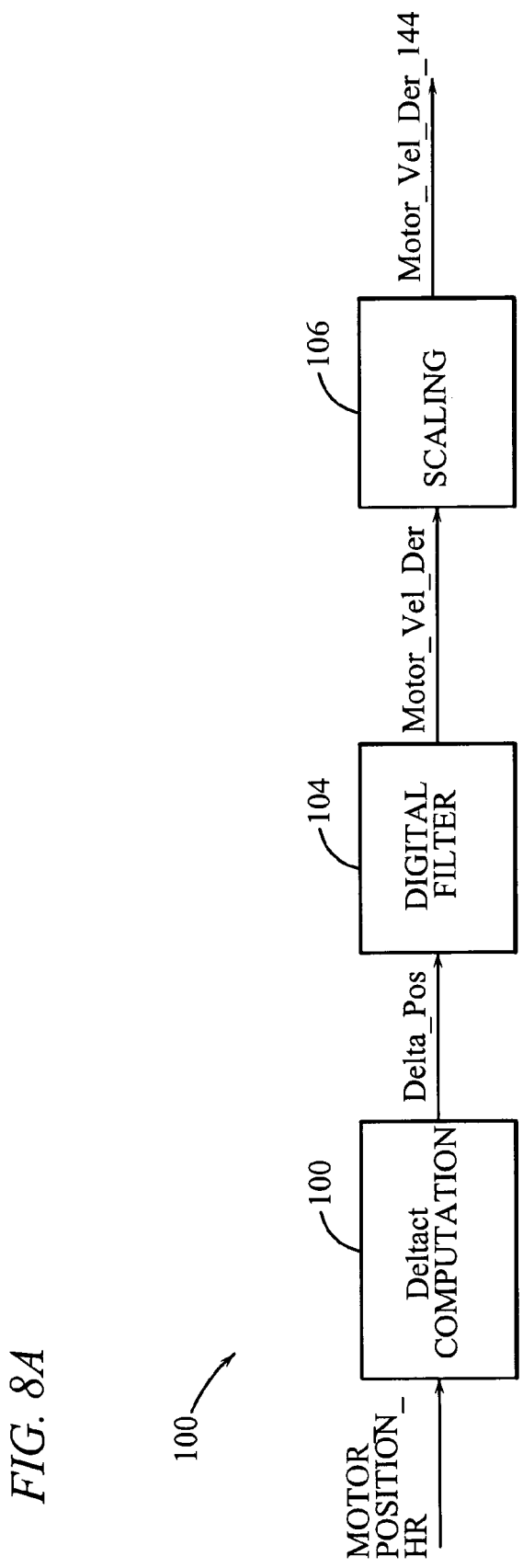
FIG. 8A depicts the Speed Estimation process.
Figure 8B:
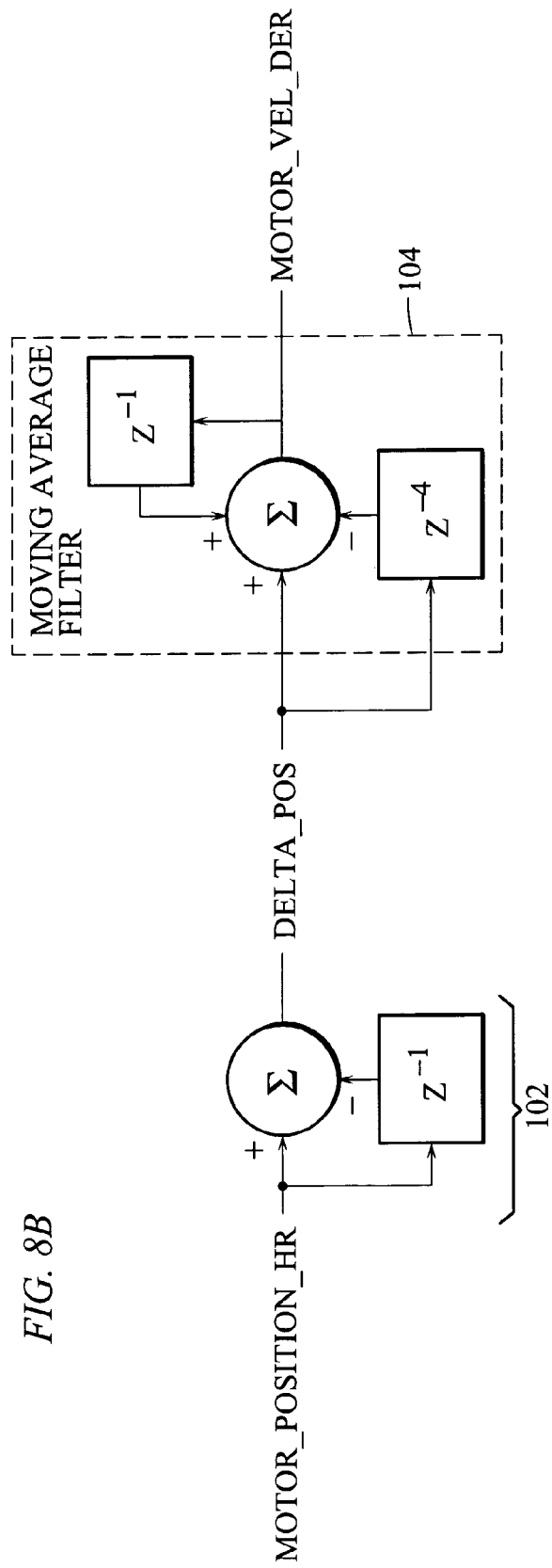
FIG. 8B provides a more detailed partial depiction of an exemplary embodiment of the Speed Estimation process.

Referring now to FIG. 7 and FIGS. 8A and 8B for a more detailed description of the functional operation of each of the processes identified above. FIG. 8A depicts the functions that comprise the Speed Estimation 100 process block. FIG. 8B provides a more detailed depiction of an exemplary embodiment for the Deltact Calculation process 102 and a Digital Filter 104. This process is a method of extracting a digital, derived velocity based on the per sample period of change of the position signal. The process utilizes as an input Motor_Position_HR the high-resolution position detected by sensor 36, and outputs a signal Motor_Vel_Der_144, which is proportional to the derived velocity of the motor. The process computes the velocity by employing two main functions. The first is the Deltact calculation process 102 where a position change DELTA_POS is computed by subtracting the high-resolution position Motor_Position_HR delayed by one sample from the current high-resolution position Motor_Position_HR. That is, subtracting the last position from the current position. The position difference is then divided by the difference in time between the two samples. An equation illustrating the computation is as follows:

$$Deltact = \frac{P_0 - P_{-1}}{T_0 - T_{-1}}$$

A preferred embodiment of the above equation evaluates a changing measured position over a fixed interval of time to perform the computation. It will be appreciated by those skilled in the art, that the computation may be performed with several variations. An alternative embodiment, evaluates a changing measured time interval for a fixed position change to perform the computation. Further, in yet another embodiment, both the interval of time and interval position could be measured and compared with neither of the parameters occurring at a fixed interval.

A filter 104 further processes the calculated Deltact value. Where the filtering characteristics are selected and determined such that the filter yields a response sufficiently representative of the true velocity of the motor without adding excessive delay. One skilled in the art will appreciate and understand that there can be numerous combinations, configurations, and topologies of filters that can satisfy such requirements. A preferred embodiment employed a four-state moving average filter. The signal is labeled Motor_Vel_Der, which is then scaled at gain 106 and output from the process as the value labeled Motor_Vel_Der_144. This parameter is utilized throughout the invention as a highly accurate representation of the velocity.

Figure 9:
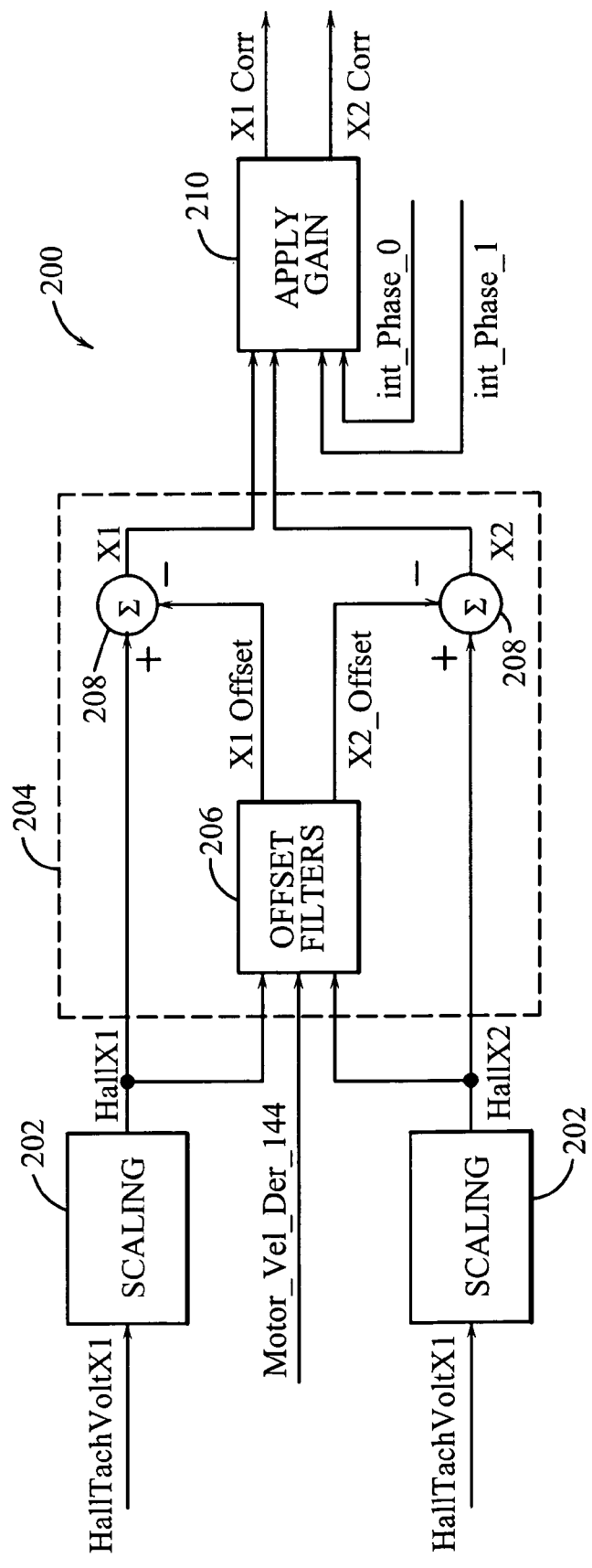
FIG. 9 depicts the Offset Compensation process.

FIG. 9 depicts the functions that comprise the Offset Compensation process 200. The process extracts the respective offset and bias from each of the two tachometer coil signals HallTachVoltX1 and HallTachVoltX2 resulting in corrected velocity outputs X1_Corr and X2_Corr. The extraction is accomplished by an algorithm that under predetermined conditions subtracts from each of the tachometer signals its low frequency spectral components. The algorithm is characterized by scaling 202; a selective, adaptive, filter 204; and a gain schedule/modulator Apply Gain 210. Where, the scaling 202 provides gain and signal level shifting resultant from the embodiment with an analog to digital conversion; the adaptive filter 204 comprises dual selective low pass filters 206 and summers 208 enabled only when the tachometer signals' levels are valid; and gain scheduling, which is responsive to feedback signals int_Phase0 and int_Phase1 from the Gain process 1000.

The adaptive filter 204 is characterized by conditionally enabled low pass filters 206, and summers 208. The low pass filters 206 under established conditions are activated and deactivated. When activated, the filter's 206 results are the low frequency spectral content of the tachometer signals to a predetermined bandwidth. When deactivated, the filter 206 yields the last known filter value of the low frequency spectral content of the tachometer signals. It is important to consider that the filter 206 is activated when the tachometer signals are valid and deactivated when they are not. In a preferred embodiment, this occurs when the tachometer signals saturate at a high velocity. Various conditions may dictate the validity of the tachometer signals. In a preferred embodiment, within certain hardware constraints, to satisfy low speed resolution and bandwidth requirements, high speed sensing capability with the tachometer signals is purposefully ignored. This results in the tachometer signals saturating under high speed operating conditions. As such, it is desirable to deactivate the filters 206 under such a condition to avoid filtering erroneous information. A summer 208 subtracts the low pass filter 206 outputs to the original tachometer signals thereby yielding corrected tachometer signals with the steady state components eliminated. The filter 206 characteristics are established to ensure that the filter response when added to the original signals sufficiently attenuates the offsets and biases in the tachometer signals. One skilled in the art will appreciate that there can be numerous combinations, configurations, and topologies of filters that can satisfy such requirements. A preferred embodiment employs an integrating loop low pass filter.

The gain scheduling function Apply Gain 210 is responsive to feedback signals int_Phase0 and int_Phase1 from the Gain process 1000 (discussed below). The Apply Gain 210 process scales the corrected velocity outputs X1_Corr and X2_Corr as a function of the feedback signals int_Phase0 and int_Phase1. Thereby providing a feedback controlled correction of the velocity signal for accuracy and speed correction.

Figure 10:
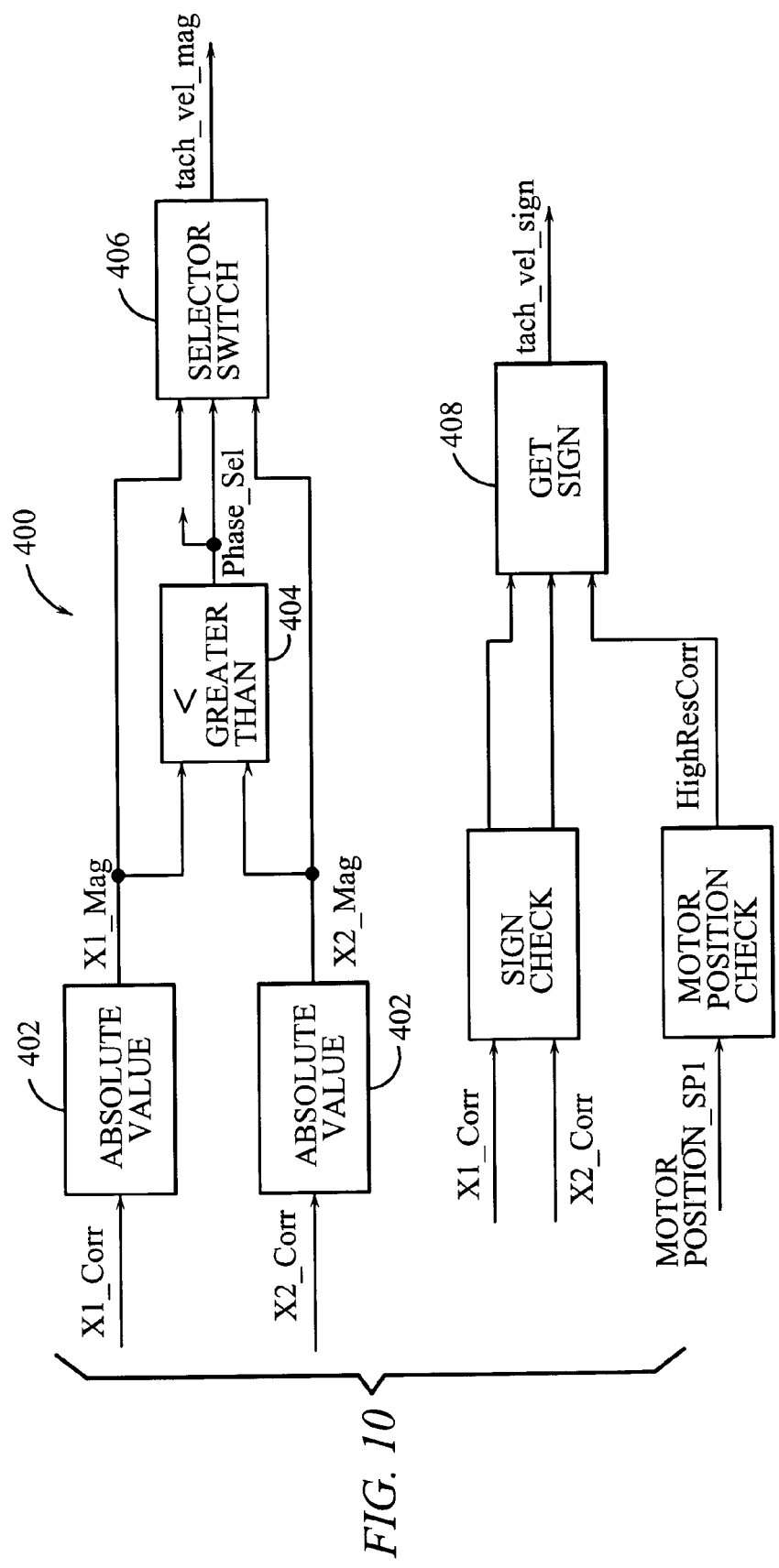
FIG. 10 depicts the Get Phase process.

FIG. 10 depicts the internal process of Get Phase 400 where processing is performed to ascertain magnitude and phase relationships of the two corrected velocities. Inputs processed include the offset corrected velocities X1_Corr, X2_Corr, the motor position Motor_Position_SPI, and a calibration adjustment signal TachOffset. The motor position signal Motor_Position_SPI derived from the high-resolution position as detected by sensor 36 and indexed to the absolute position as described earlier. The TachOffset input allows for an initial fabrication based adjustment to address differences or variations in the orientation of the sense coils 40 (FIGS. 1 and 3) and the low-resolution Hall sensor set 34 (FIG. 1). The process generates two primary outputs, the selected tachometer magnitude tach_vel_mag and the selected tachometer phase tach_vel_sign. The process independently determines which tachometer signal magnitude and phase to select by making a comparison with the high-resolution position Motor_Position_SPI. The process determines the magnitude of the two velocities X1_Corr and X2_Corr at 402. Then at comparator 404 determines the larger of the two and then generates a discrete, Phase_Sel, indicative of which velocity has the larger magnitude. The larger magnitude velocity is selected because by the nature of the two trapezoidal signals, one is guaranteed to be at its maximum.

The discrete Phase_Sel controls a switch 406, which in turn passes the selected tachometer velocity magnitude termed tach_vel_mag. The discrete Phase_Sel is also utilized in later processes. A second and separate comparison at Get Sign process 408 with the high-resolution position Motor_Position_SPI, extracts the respective sign associated with the velocity. Again, it will be understood that those skilled in the art may conceive of variations and modifications to the preferred embodiment shown above. For example, one skilled in the art would recognize that the phase information could have also been acquired merely by utilizing the position information alone. Such an approach however, suffers in that it would be highly sensitive to the precise positioning and timing on the trapezoidal waveforms to insure an accurate measurement. Such a restriction is avoided in the preferred embodiment, thereby simplifying the processing necessary.

Figure 11:
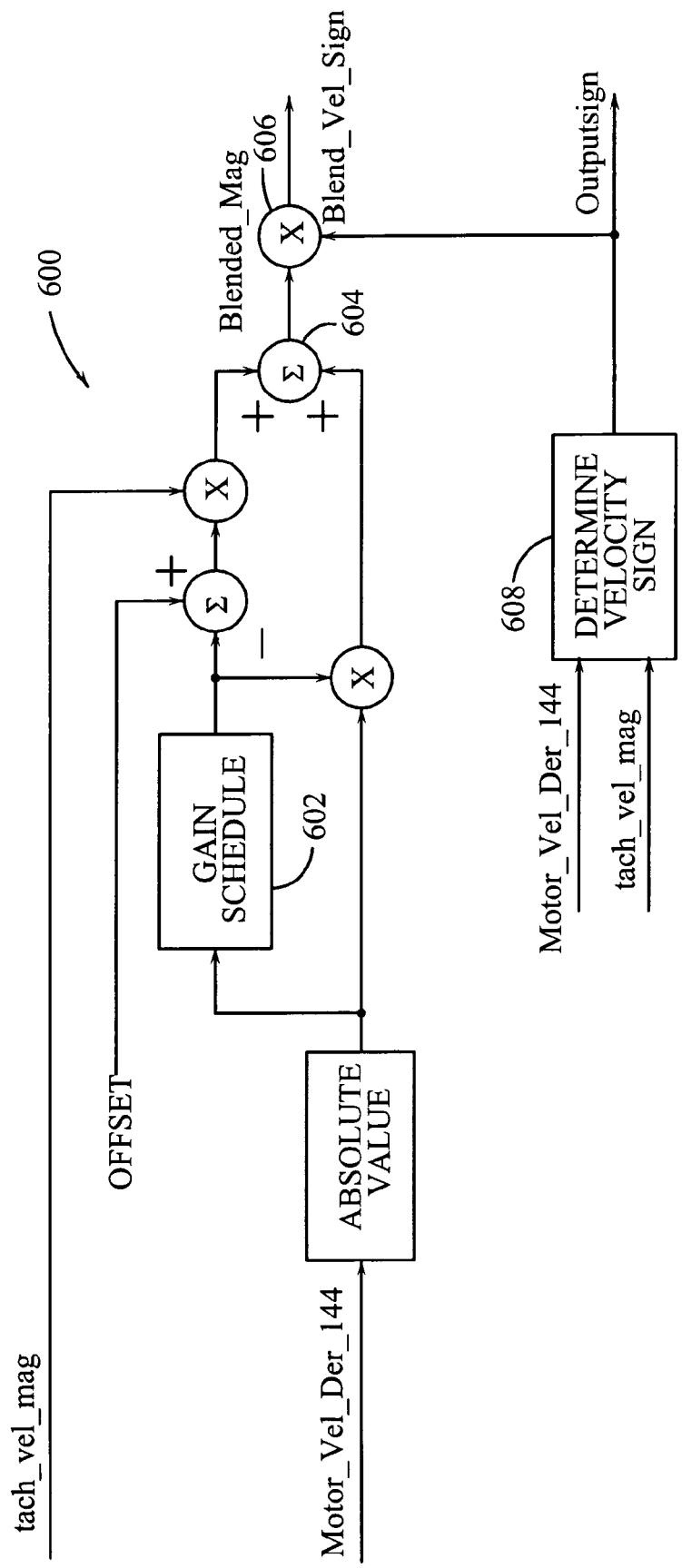
FIG. 11 depicts the Blend process.

FIG. 11 depicts the Blend 600 process function where predetermined algorithms determine a blended velocity output. The process utilizes the selected tachometer magnitude tach_vel_mag, the derived velocity Motor_Vel_Der_144 and the selected tachometer phase tach_vel_sign to generate two outputs; the blended velocity Blend_Vel_Signed and the velocity sign OutputSign. A blended velocity solution is utilized to avoid the potential undesirable effects of transients resultant from rapid transitions between the derived velocity and the tachometer-measured velocity. The process selects based upon the magnitude of the derived velocity Motor_Vel_Der_144 a level of scheduling at gain scheduler 602 of the derived velocity with the compensated, measured, and selected velocity, tach_vel_mag. Summer 604 adds the scheduled velocities, which are then multiplied at multiplier 606 by the appropriate sign as determined from the tachometer phase tach_vel_sign to generate the blended composite signal. The blended composite signal comprises a combination of the tachometer measured velocity and the derived velocity yet without the negative effects of saturation or excessive tine delays.

Figure 12:
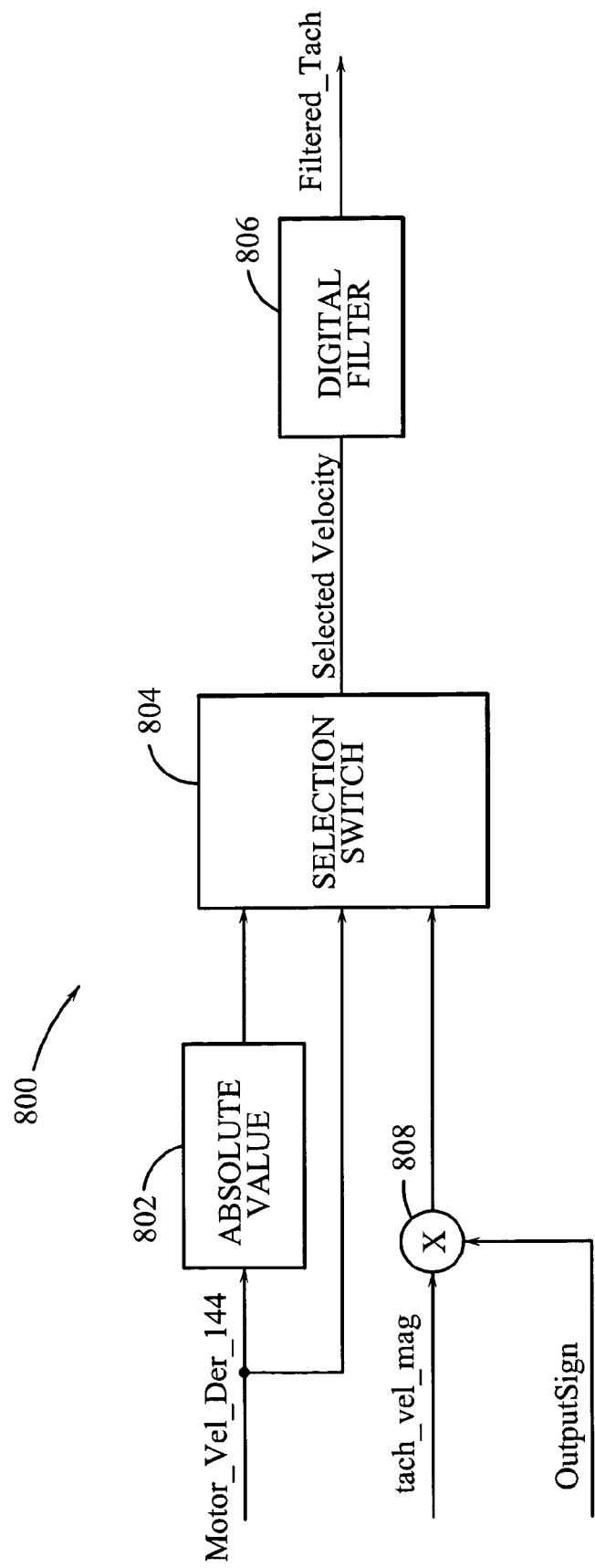
FIG. 12 depicts the Align To Polled process.

FIG. 12 depicts the Align to Polled 800 process, which time shifts (delays) the tachometer magnitude tach_vel_mag to facilitate a coherent comparison with the derived velocity Motor_Vel_Der_144. The filtering is only employed when the tachometer magnitude tach_vel_mag is within a valid range as determined in processes 802 and 804. The valid range is determined based upon the magnitude of the derived velocity Motor_Vel_Der_144. As stated earlier, the validity of the tachometer signals is related to high speed saturation, while for the derived velocity it is a function of filtering latency at very low speed. A selection switch 804 responsive to the magnitude of the derived velocity Motor_Vel_Der_144 controls the application of the tach_vel_mag signal to the filter. The multiplication at 808 multiplier applies the appropriate sign to the tach_vel_mag signal. A filter 806 is employed to facilitate generation of the time delay. The appropriate time delay is determined based upon the total time delay that the derived velocity signals experience relative to the tachometer signals. The time shift accounts for the various signal and filtering effects on the analog signals and the larger time delay associated with filtering the derived velocity signal. As stated earlier, the derived velocity signal experiences a significant filtering lag, especially at lower speeds. Introducing this shift yields a result that makes the tachometer signals readily comparable to the derived velocity. The selected signal is delivered as an output as Filtered_Tach.

In a preferred embodiment, the resultant filter 806 is a four state moving average filter similar to the filter 104 (FIG.

8) implemented in the Speed Estimation process. One skilled in the art will recognize that there can be numerous combinations, configurations, and topologies of filters that can satisfy such requirements.

Referring now to FIG. 13, the Gain 1000 process block where an error command is generated and subsequently utilized as a gain correction in the adaptive algorithm of the present invention. In a preferred embodiment, the error command is resultant from a ratiometric comparison 1002 of the magnitudes of the derived velocity to the filtered tachometer velocity. The ratio is then utilized to generate an error signal at summer 1004. Under predetermined conditions, controlled by state controller 1006, error modulator 1008 enables or disables the error signal. That is, modulator 1008 acts as a gate whereby the error signal is either passed or not. The state controller 1006 allows the error signal to be passed only when the error signal is valid. For example, when both the filtered tachometer velocity and the derived velocity are within a valid range. In a preferred embodiment, the error signal is passed when the magnitude of the Motor_Vel_Der_144 signal is between 16 and 66.4 radians per second. However, the modulator is disabled and the error signal does not pass if the magnitude of the Motor_Vel_Der_144 signal exceeds 72 or is less than 10.4 radians per second. Under these later conditions, the ratiometric comparison of the two velocities and the generation of an error signal is not valid. At very small velocities, the signal Motor_Vel_Der_144 exhibits excessive delay, while at larger velocities, that is in excess of 72 radians per second, the tachometer signals are saturated. The error signal when enabled is passed to the error integrator 1010, is integrated, and is utilized as an error command signal for gain adjustment feedback. The error integrators 1010 selectively integrate the error passed by the modulator 1008. The selection of which integrator to pass the error signal to is controlled by the time shifted Phase_Sel signal at delay 1012. These two correction signals; int_Phase0 and int_Phase1, form the gain adjustment feedback that is then utilized as an input in the abovementioned Offset Compensation 200 process.

Signal Processing; Sinusoidal

Figure 25:
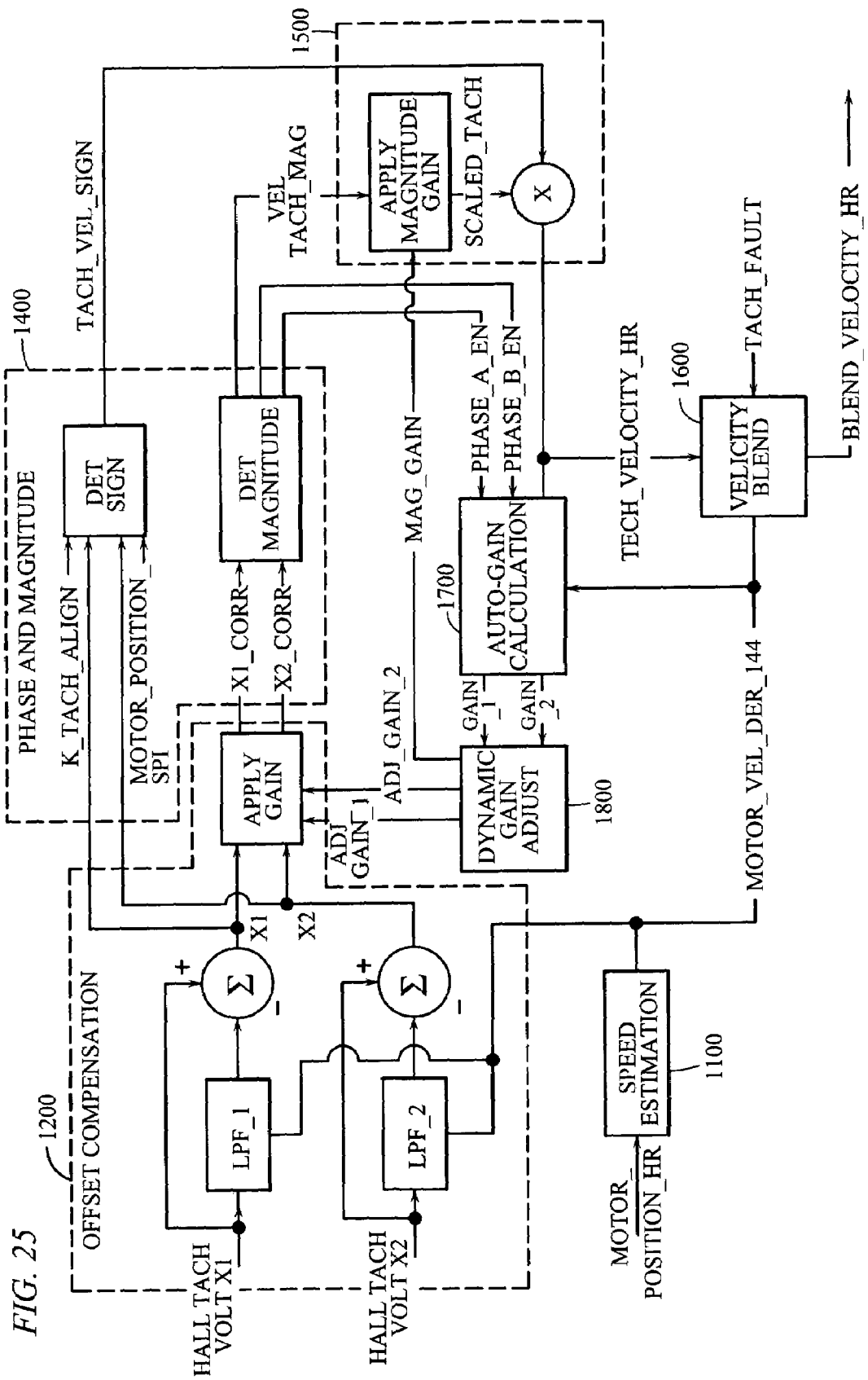
FIG. 25 depicts a block diagram of the processing employed for the sinusoidal tachometer.

FIG. 25 depicts the top-level block diagram of the processing functions employed on the various signals sensed to determine the rotational speed of a rotating device. The processing defined would be typical of what may be performed in a controller. Such a controller may include, without limitation, a processor, logic, memory, storage, registers, timing, interrupts, and the input/output signal interfaces as required to perform the processing prescribed by the invention. Referring again to FIG. 25, where the blocks 1100–1900 depict an adaptive algorithm executed by the abovementioned controller in order to generate the tachometer output. The four blocks 1100, 1200, 1400, 1500 and 1600 perform "forward" processing of the tachometer coil signals to arrive at a final blended output. While, the last two 1700, and 1800 comprise a "feedback" path thereby constructing the adaptive nature of the algorithm.

Figure 26:
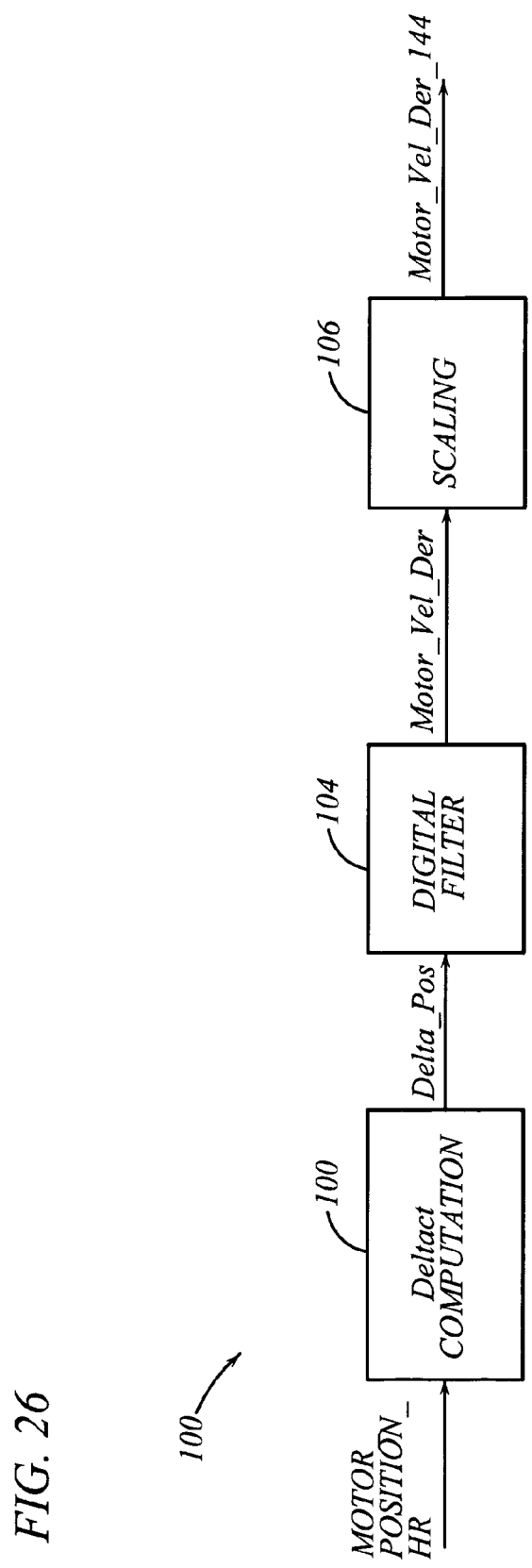
FIG. 26 depicts a speed estimation function.

In FIG. 26, the function labeled Speed Estimation 1100 generates a digital, derived velocity signal. Similar to earlier disclosed embodiments (see FIGS. 7, 8A and 8B), the process utilizes Motor_Position_HR, the high-resolution position from sensor 36, and a processor clock signal for timing. The process outputs a signal Motor_Vel_Der_144, which is proportional to the velocity of the motor over the sample period of the controller. Continuing to Offset Compensation process 1200 where processing is performed to generate filtered tachometer signals to remove offsets and bias. The Offset Compensation process 1200 utilizes the two tachometer coil signals HallTachVoltX1, HallTachVoltX2, the derived velocity Motor_Vel_Der_144 and two phase related feedback signals ADJ_GAIN_1 and ADJ_GAIN_2 as inputs and generates corrected velocity outputs X1_Corr and X2_Corr. Also output from the Offset Compensation process 1200 are two uncorrected velocity outputs X1 and X2. Continuing to Phase and Magnitude process 1400, the magnitude and phase relationships of the two corrected velocities are determined. Inputs processed include the two uncorrected velocity outputs X1 and X2, the corrected velocities X1_Corr, X2_Corr, the motor position Motor_Position_SPI as derived from the high-resolution position detected by sensor 36, and an alignment or offset constant denoted in the figure as k_tach_align. The process generates four primary outputs, the selected tachometer magnitude tach_vel_mag; the selected tachometer phase tach_vel_sign; and two phase enable discretes Phase_A_En; and Phase_B_En. Moving to the Apply Gain Function 1500 where gain scaling sign are applied to the selected tachometer magnitude, tach_vel_mag. Inputs to the Apply Gain process 1500 include: the selected tachometer magnitude tach_vel_mag; the selected tachometer phase tach_vel_sign; a magnitude gain utilized to schedule the tachometer magnitude tach_vel_mag, MAG_GAIN. Output from the Apply Gain process 1500 is the scaled and signed tachometer velocity denoted TACH_VELOCITY_HR. Finally, the Velocity Blend process 1600 where selected algorithms determine a blended velocity output denoted as BLEND_VELOCITY_HR. The process utilizes the scaled and signed tachometer velocity TACH_VEL_HR and the derived tachometer velocity Motor_Vel_Der_144, to generate the blended velocity BLEND_VEL_HR. Moving to the "feedback" portion of the algorithm, the Auto-Gain Calculation process 1700 wherein two gain corrections are computed for later scheduling and application as gain adjustments to the two uncorrected velocity outputs X1 and X2. The process utilizes the derived velocity Motor_Vel_Der 144, the TACH_VELOCITY_HR signal, the Phase_A_En and Phase_B_En to generate two gain correction factors GAIN_1 and GAIN_2.

Moving now to a Dynamic Gain Adjust process, 1800 to formulate two gain adjustment outputs ADJ_GAIN_1; ADJ_GAIN_2; and a magnitude gain command MAG_GAIN which, are resultant of scheduling of the two gain correction factors GAIN_1 and GAIN_2. The two signals form the gain adjustment feedback that is utilized as an input in the abovementioned Offset Compensation 200.

Referring now to FIG. 25 and specified figures for a detailed description of the functional operation of each of the processes identified above. FIG. 26 depicts the functions that comprise the Speed Estimation 1100 process block. This process is a method of extracting a digital, derived velocity based on the per sample period of change of the position signal. The Speed Estimation 1100 process calculates motor velocity based on differentiating changes in motor position. The processing employed herein is similar to that discussed in the embodiments disclosed above, and specifically at the Speed Estimation 100 process as depicted in FIGS. 8A and 8B. Therefore, for simplicity, the disclosure is not reiterated here.

Figure 27:
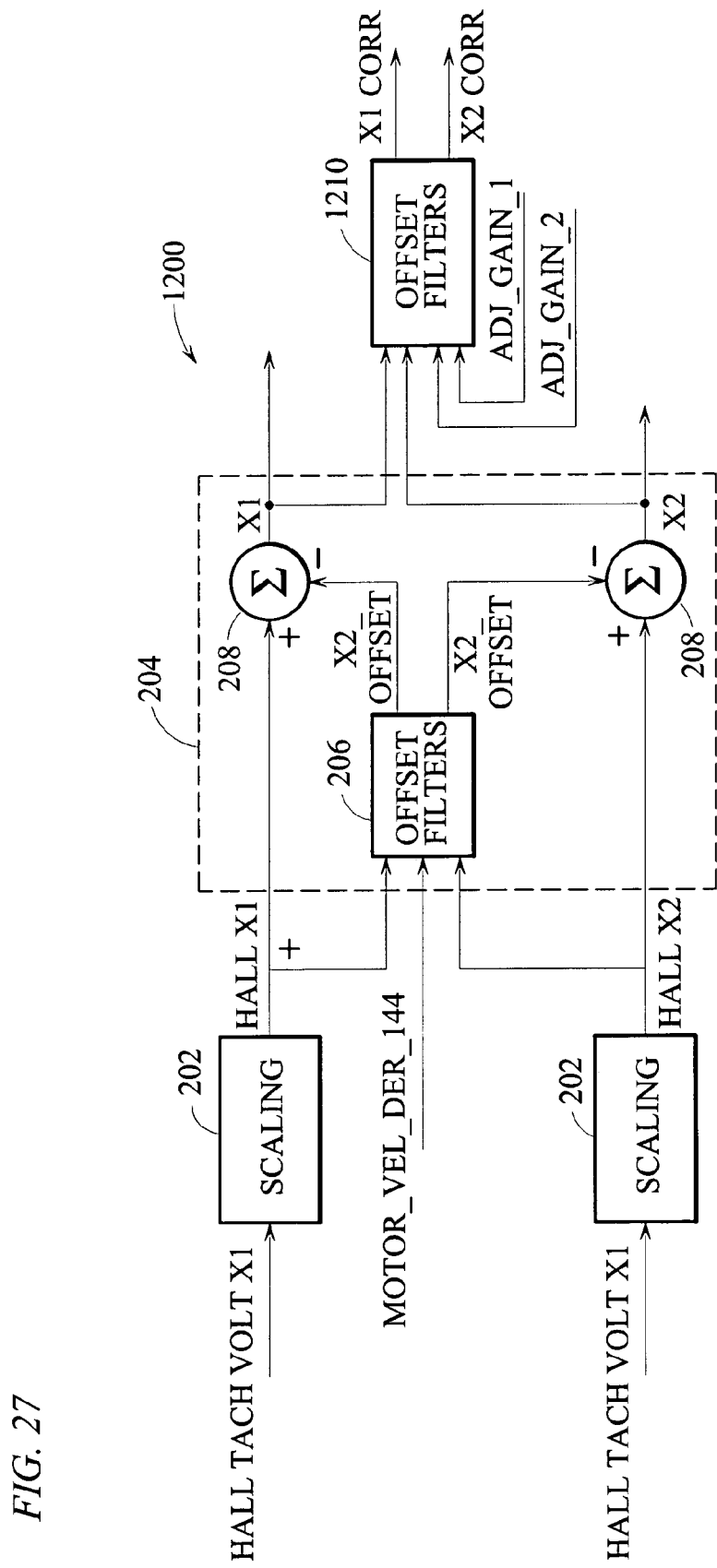
FIG. 27 depicts an Offset Compensation process.

FIG. 27 depicts the functions that comprise the Offset Compensation process 1200. The process extracts the respective offset and bias from each of the two tachometer coil signals HallTachVoltX1 and HallTachVoltX2 resulting in two uncorrected velocity outputs X1 and X2. The Offset Compensation process 1200 also includes, but is not limited to, an Apply Gain process 1210 configured to receive the gain adjustments ADJ_GAIN_1 and ADJ_GAIN_2 and therefrom generate corrected velocity outputs X1_Corr and X2_Corr. It is noteworthy to appreciate that the Offset Compensation process 1200 is very similar to the Offset Compensation process 200 disclosed in earlier embodiments. Reference may be made to that disclosure above herein for additional details.

The extraction of offsets and biases from each of the two tachometer coil signals HallTachVoltX1 and HallTachVoltX2 is accomplished by an algorithm that under selected conditions subtracts from each of the tachometer signals its low frequency spectral components. The algorithm and processing employed shown in FIG. 27 is characterized by scaling 202; a selective, adaptive, filter 204; and a gain schedule/modulator Apply Gain process 1210. Where, the scaling 202 provides gain and signal level shifting resultant from the embodiment with an analog to digital conversion; the adaptive filter 204 comprises dual selective low pass filters 206 and summers 208 enabled only when the tachometer signals levels are valid; and gain scheduling, which is responsive to feedback signals ADJ_GAIN_1 and ADJ_GAIN_2 from the Dynamic Gain Adjust process 1800.

The magnitude of Motor_Vel_Der_144 is utilized to enable/disable this function. For values less than or equal to a selected upper bound denoted k_BLEND_UPPER_BOUND (see Velocity Blend Process below), the Offset Compensation process 1200 is enabled. For values greater than the selected upper bound, k_BLEND_UPPER_BOUND, the Offset Compensation process 1200 is disabled. In addition, if the HallTachVoltX1 and input signal is found to be outside of expected operational limits or if the TACH_FAULT diagnostic is true, Offset Compensation process 1200 may, but need not be disabled. It is also noteworthy to appreciate that the Offset Compensation process 1200 may be configured to ensure that the offset filters 206 hold their value when disabled.

One skilled in the art will appreciate that there can be numerous combinations, configurations, and topologies of filters that can be employed to perform the various outlined functionality. An exemplary embodiment employs an integrating loop low pass filter, scaling, scheduling and summations.

The Apply Gain process 1210 is configured to receive the gain adjustments ADJ_GAIN_1 and ADJ_GAIN_2 and therefrom generate corrected velocity outputs X1_Corr and X2_Corr. The ADJ_GAIN_1 term, from the Dynamic Gain Adjust process, is applied to the uncorrected velocity output X1 of adaptive filter 204 to compensate for temperature and build tolerances yielding a resultant corrected velocity is denoted X1_CORR. Likewise, the ADJ_GAIN_2 term, from the Dynamic Gain Adjust process, is applied to the uncorrected velocity output X2 of adaptive filter 204 to compensate for temperature and build tolerances yielding a resultant corrected velocity denoted X2_CORR.

Figure 28:
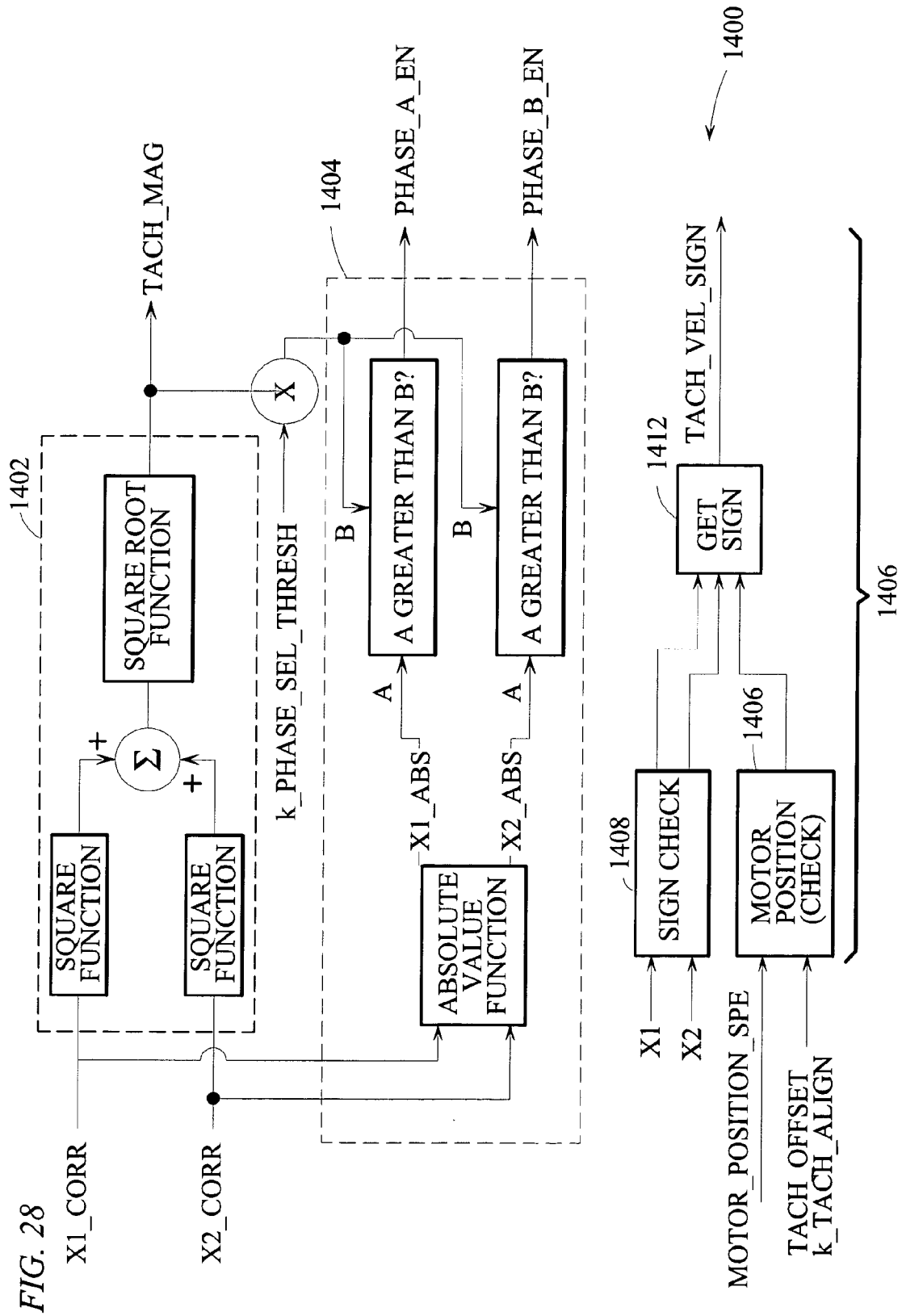
FIG. 28 depicts a Phase and Magnitude process.

FIG. 28 depicts the internal process of a Phase and Magnitude process 1400 where processing of algorithms is performed to ascertain magnitude and phase relationships of the two corrected velocities X1_Corr, and X2_Corr. Additionally, based on a calibration threshold, it is determined which of X1_Corr, and X2_Corr is contributing the most to the combined magnitude.

Once again, the functionality of the processes utilized in Phase and Magnitude process 1400 is similar or at least analogous to that disclosed in the Get Phase process 400 as disclosed herein above. Therefore, again, reference should be made thereto for additional understanding of the embodiments disclosed herein.

Inputs processed by the Phase and Magnitude process 1400 include the uncorrected velocities X1, and X2, the corrected velocities X1_Corr, X2_Corr, a motor position denoted Motor_Position_SPI, and a calibration adjustment signal k_Tach_Align. The motor position signal Motor_Position_SPI as detected by sensor 36 and indexed to the absolute position as described earlier. The calibration adjustment k_Tach_Align allows for an initial fabrication based adjustment to address differences or variations in the orientation of the sense coils 40 (FIGS. 1 and 3) and the low-resolution Hall sensor set 34 (FIG. 1). The process generates two primary outputs, the selected tachometer magnitude tach_vel_mag and the selected tachometer phase tach_vel_sign.

The Phase and Magnitude process 1400 independently determines which tachometer signal magnitude and phase to select by making a comparison with the high-resolution position Motor_Position_SPI. The magnitude of the two corrected velocities X1_Corr and X2_Corr is determined at magnitude process 1402. In an exemplary embodiment, magnitude process 1402 is a square root of the sum of the squares algorithm 1402 is employed to determine the magnitude of the corrected velocities X1_Corr and X2_Corr. Moreover, rounding operations and other arithmetic numerical methods may be applied. The resultant yields a value for TACH_VEL_MAG, which exhibits about zero dead band and is symmetrical about zero.

At comparator 1404, a determination is made to ascertain whether one or both of the two corrected velocities X1_Corr and X2_Corr is contributing significantly to the resultant magnitude. In response, two discretes, Phase_A_En, and Phase_B_En, are generated, that when set, are indicative of whether either velocity has a magnitude, which exceeds a selected threshold. In an exemplary embodiment, absolute values of the corrected velocities X1_Corr and X2_Corr are compared with the selected threshold established by scheduling the tachometer magnitude tach_vel_mag with a calibration value denoted k_PHASE_SEL_THRESH. The threshold comparison assures that a gain correction is determined and applied to the appropriate velocity signal in the Auto Gain Calculation process 1700 and Apply Gain process 1210 of the Offset Compensation 1200. Here, the processing is once again analogous to that for the trapezoidal signals in the Get Phase process 400 disclosed in the embodiments above. In an exemplary embodiment, employing sinusoidal signals, any combination of the uncorrected velocity signals X1 and X2 is possible for correction if they exceed a selected threshold. Conversely, with the trapezoidal signals of the abovementioned embodiments, one velocity signal is selected because by the nature of the two trapezoidal signals, one trapezoidal signal is expected to be larger than the other is. In an exemplary embodiment, the calibration value k_PHASE_SEL_THRESH is selected so that the sinusoidal signal contributing the most to the tachometer magnitude is corrected.

A second and separate comparison is performed at the Determine Sign process at 1406 to ascertain the sign associated with the magnitude computed above. The Determine Sign process 1406 receives as inputs the uncorrected velocities X1 and X2; the high-resolution position Motor_Position_SPI, and the calibration adjustment signal k_Tach_Align. In and exemplary embodiment, the Determine Sign process 1406 includes, but is not limited to, a Sign Check process 1408, a Motor Position Check process 1410 and a Get Sign process 1412. The Sign Check process 1408 executes an evaluation of the uncorrected velocities X1 and X2 to ascertain the phase or sign of each signal. The Motor Position Check process 1410 compensates the high-resolution position Motor_Position_SPI with the calibration adjustment signal, k_Tach_Align to align it with the uncorrected velocity X1 zero crossing. Finally, the Get Sign process 1412 utilizes the compensated position to extract the respective sign associated with the uncorrected velocities X1 and X2.

It should be noted that in an exemplary embodiment, the high-resolution position Motor_Position_SPI is implemented as a counter, and therefore, considerations and precautions to address rollover and other computational conditions and limitations are important but not necessarily must be accounted for when performing this addition. It is also noteworthy to appreciate that for an exemplary embodiment, at the point where the uncorrected velocity X1 transitions from negative to positive values, the summation of Mtr_Rel_Pos and k_TACH_ALIGN equals zero. It is also noteworthy to appreciate that for two sinusoids in quadrature, one of the sinusoids may be utilized to define the sign for 180 degree increments. However, to avoid the uncertainty at or near the zero crossings it is beneficial to define and allocate a selected span for each of the two sinusoids to define the sign. Therefore, for 90 electrical degree intervals, the sign may readily be established from the sign of one of the two quadrature sinusoids over a given interval. Thus, this consideration facilitates an implementation yielding a mapping of motor relative position to Tach_Vel_Sign, for a 6-pole motor, is as follows in Table 1. Once again, it will be appreciated that there are 192 counts for a span of 360 degrees. For example, consider two sinusoids, $\sin(\theta)$ and $\cos(\theta)$ at approximately $\theta=45$ degrees to approximately $\theta=135$, $\sin(\theta)$ provides a good indication sign and avoids proximity to zero crossings. Similarly, at approximately $\theta=135$ degrees to approximately $\theta=225$, $\cos(\theta)$ provides a good indication sign and avoids proximity to zero crossings. Likewise, at approximately $\theta=225$ degrees to approximately $\theta=315$, $-\sin(\theta)$ provides a good indication sign and avoids proximity to zero crossings. Finally, at approximately $\theta=315$ degrees to approximately $\theta=45$, $-\cos(\theta)$ provides a good indication sign and avoids proximity to zero crossings.

TABLE 1

Mapping For Establishing A Sign Of The Velocity

| Motor_Position_SPI + k_TACH_ALIGN (Counts) | Tach_Vel_Sign |
| --- | --- |
| 0 to 23 | X2 |
| 24 to 71 | X1 |
| 72 to 119 | −X2 |
| 120 to 167 | −X1 |
| 168 to 191 | X2 |

Again, it will be understood that those skilled in the art may conceive of variations and modifications to the preferred embodiment shown above. For example, one skilled in the art would recognize that the phase information could have also been acquired by various mathematical methods applicable to sinusoids, including, but not limited to inverse tangent, CORDIC algorithms, or merely by utilizing the position information alone. In an exemplary embodiment, the sign determination may be resultant from comparison of the uncorrected velocities X1 and X2 with the high-resolution position Motor_Position_SPI. Contrary to the processing employed for trapezoidal signals in the embodiments disclosed above, the sign determination herein is potentially less sensitive to the precise positioning and timing on the sinusoidal waveforms. Moreover, it is also noteworthy to appreciate that an alignment of the position and velocity signals as disclosed, is not necessary for the disclosed embodiments. It merely provides a simplification in the understanding, terminology, and processing associated with the velocity and position signals in the context of a control system for an electric machine.

Turning now to the Apply Gain Function 1500 (FIG. 26), the selected tachometer magnitude, tach_vel_mag is scaled to the appropriate magnitude and thereafter combined with the tachometer phase tach_vel_sign to reformulate a vector quantity velocity denoted TACH_VELOCITY_HR. The magnitude gain termed, MAG_GAIN, from the Dynamic Gain Adjust process 1800, is applied to schedule the tachometer magnitude TACH_VEL_MAG to compensate for temperature and build variations. Inputs to the Apply Gain Function 1500 include the tachometer magnitude, tach_vel_mag, the tachometer phase, tach_vel_sign, and a MAG_GAIN term, from the Dynamic Gain Adjust process 1800. Output from the Apply Magnitude Gain Function 1500 is a vector quantity velocity denoted TACH_VELOCITY_HR. It is noteworthy to appreciate that in an exemplary embodiment, to facilitate implementation of the velocity determination processes, the gain scheduling, including the magnitude feedback, is partitioned into pre and post scheduling. Such an approach aids in addressing numerical methods implementation considerations such as overflow, word size and resolution. It should also be appreciated that the disclosed embodiment enumerates a method of performing the function but should not be taken as a limitation. Various alternatives will be apparent for implementation of the adaptive nature of the blended velocity determination and more specifically the magnitude feedback as computed by the Auto Gain Calculation 1700 and Dynamic Gain Adjust 1800 as applied to the Offset Compensation 1200.

Figure 29:
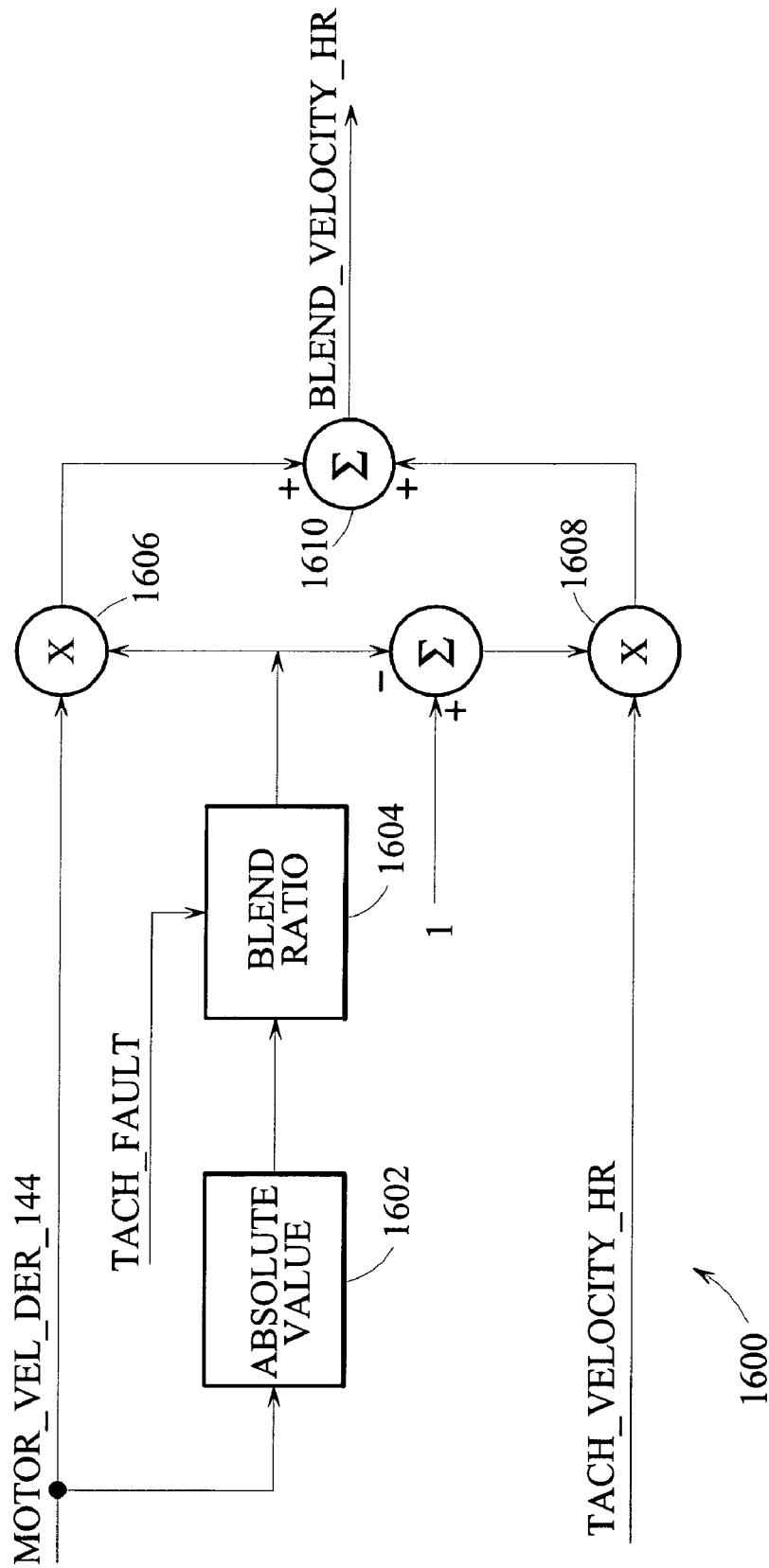
FIG. 29 depicts a Velocity Blend Process.

Turning now to the Velocity Blend process 1600 depicted in FIG. 29, predetermined algorithms determine a blended velocity output. The Velocity Blend process 1600 utilizes the vector quantity velocity denoted TACH_VELOCITY_HR, the derived velocity Motor_Vel_Der_144, its absolute value, and a tachometer fault signal denoted TACH_FAULT to generate the blended velocity Blend_Velocity_HR. In an exemplary embodiment, a blended velocity solution is utilized to avoid the potential undesirable effects of transients resultant from rapid transitions between the derived velocity Motor_Vel_Der 144 and the tachometer-measured and determined velocity TACH_VELOCITY_HR. In an exemplary embodiment, the Velocity Blend process 1600, at Blend Ratio 1604, selects based upon the magnitude of the absolute value of derived velocity Motor_Vel_Der_144 determined at block 1602, a level of scheduling/blend ratio to be utilized. The resultant of the Blend Ratio 1604 process defining a percentage or ratio to be applied at scheduler(s) 1606 and 1608 of the derived velocity Motor_Vel_Der_144 and the compensated, measured, and scheduled velocity TACH_VELOCITY_HR respectively. Summer 1610 adds the scheduled velocities to generate the blended composite velocity signal. The blended composite velocity signal comprises a combination of the tachometer measured velocity and the derived velocity yet without the negative effects of saturation or excessive time delays.

In an exemplary embodiment, the Velocity Blend Process 1600 employs two calibratable breakpoints, k_BLEND_LOWER_BOUND and k_BLEND_UPPER_BOUND to select the appropriate blend. The Velocity Blend Process 1600 linearly ramps between about 0% at the lower bound characterized by, for example, tachometer-based velocity only, to about 100% at the upper bound characterized by position-based derived velocity only. Once again, in an exemplary embodiment, the absolute value of the derived velocity Motor_Vel_Der_144 is used as the index into the ramp function between the two velocities.

When both calibration points are equal to zero, the Velocity Blend Process 1600 outputs the derived motor velocity signal Motor_Vel_Der_144, only. It will be understood that disclosed herein is an exemplary embodiment illustrative as to how the blending may be performed. It will be appreciated that many other methodologies are conceivable within the scope of the disclosure herein and of the claims.

The blending of velocities as disclosed for the Velocity Blend Process 1600, may also be limited to selected operational constraints, for example, to enhance performance, address inherent signal characteristics, or to address signal validity. Therefore, in an exemplary embodiment, a diagnostic signal TACH_FAULT applied to the Blend Ratio 1604 process is utilized to disable blends based upon the tachometer-based, measured velocity TACH_VELOCITY_HR constraining the output to that of derived velocity Motor_Vel_Der_144 only. For example, the tachometer-based velocity blend and output may be disabled during certain controller processes, which would result in inaccurate information. For example, motor position initialization, and motor position calibration walk functions.

Figure 30:
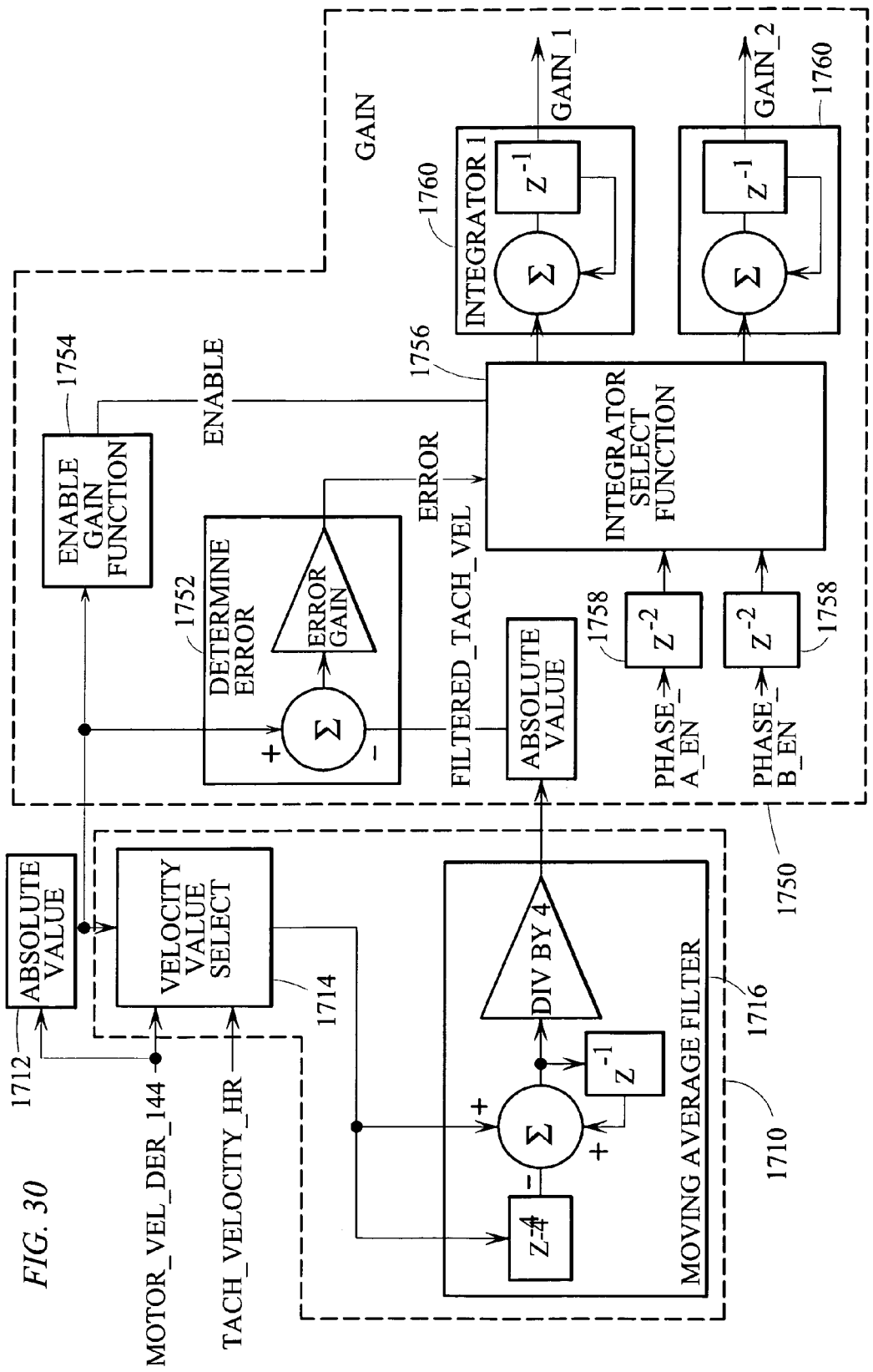
FIG. 30 depicts an auto-gain calculation function.

FIG. 30 depicts the Auto Gain Calculation process 1700, which includes, but is not limited to, processes to compare the tachometer velocity, Tach_Vel_HR with the derived velocity, Motor_Vel_Der_144 to generate a gain correction that is ultimately utilized to schedule the uncorrected velocities X1 and X2 in the Apply Gain Process 1300. In an exemplary embodiment to facilitate a particular implementation, inputs to the Auto Gain Calculation process 1700 include the derived velocity Motor_Vel_Der_144, the TACH_VELOCITY_HR signal, the Phase_A_En and Phase_B_En from the Phase and Magnitude process 1400 to generate as outputs two gain correction factors GAIN_1 and GAIN_2. The gain correction factors GAIN_1 and GAIN_2 are transmitted to the Dynamic Gain Adjust process 1800 for scaling and scheduling.

In an exemplary embodiment, the Auto Gain Calculation process 1700 includes, but is not limited to, an Align to Polled process 1710 and a Gain Process 1750. The Align to Polled process 1710, once again, is analogous to processes disclosed earlier, namely the Align to Polled process 800. Reference should also be made to that disclosure for additional information. The Align to Polled process 1710 is configured to time shift the tachometer velocity Tach_Vel_HR to facilitate a time coherent comparison with the derived velocity Motor_Vel_Der_144. The time shift may include, but not be limited to a filtering implementation. In an exemplary embodiment, a four state moving average filter is utilized. Moreover, it will be appreciated that the filtering for selected signals may be limited to selected operational ranges or the address the validity, characteristics of the signal being filtered. For example, in the disclosed embodiment, the tachometer magnitude, tach_vel_mag is filtered only when it is within a valid range. Otherwise, the derived velocity Motor_Vel_Der_144 is applied to the filter to maintain the filter state value. It will be appreciated, that such a scheme is one commonly employed to address numerical methods constraints encountered in implementing a filter, especially a digitally implemented filter.

Absolute value process 1712 and selection switch Velocity Value Select process 1714 facilitate determination of a valid range. The valid range for the tachometer magnitude tach_vel_mag is determined based upon the magnitude (absolute value) of the derived velocity Motor_Vel_Der_144. Once, again, as stated earlier, it will be appreciated that the validity of the tachometer signals and ultimately the tachometer velocity Tach_Vel_HR is related to high speed saturation, while for the derived velocity Motor_Vel_Der_144 it is a function of filtering latency at very low speed. The selection switch, Velocity Value Select 1714 is responsive to the magnitude of the derived velocity Motor_Vel_Der_144 controls the application of the tachometer velocity Tach_Vel_HR signal to the filter.

A filter 1716 is employed to facilitate generation of the time delay. The appropriate time delay is determined based upon the total time delay that the derived velocity signals experience relative to the tachometer signals. The time shift accounts for the various signal and filtering effects on the analog signals and the larger time delay associated with filtering the derived velocity signal. As stated earlier, the derived velocity signal experiences a significant filtering lag, especially at lower speeds. Introducing this shift yields a result that makes the tachometer signals readily comparable to the derived velocity. The selected signal is thereafter delivered as an output as Filtered_Tach_Vel.

In a preferred embodiment, the resultant filter 1716 is a four state moving average filter similar to the filter 104 (FIG. 8) implemented in the Speed Estimation process 1100. One skilled in the art will recognize that there can be numerous combinations, configurations, and topologies of filters that can satisfy provide similar functionality and that a particular configuration selected for an implementation should not be considered as limiting.

Continuing with FIG. 30, the Gain process 1750 executes a process where an error is generated and subsequently utilized to compute a gain correction in the adaptive feedback algorithm. The Gain process 1750 effectively forms the feedback of an adaptive servo loop to control the magnitude of the tachometer velocity signal. In an implementation of an exemplary embodiment, an integrator 1760 drives the error in the magnitude of the velocity signal to substantially zero. In an exemplary embodiment, the error is resultant from a comparison and error generation at Error Determination 1752. The comparison is of the absolute value of the derived velocity Motor_Vel_Der_144 to the absolute value of the filtered tachometer velocity Filtered_Tach_Vel. The resulting error is thereafter, applied to a Select function 1756. Under predetermined conditions, controlled by Enable Gain function 1754, which enables or disables the error signal, the Select function 1756 passes the error to the error integrator(s) 1760. The Enable Gain function 1754 allows the error to be utilized for error gain computation only when the error is valid. For example, the error is valid when both the filtered tachometer velocity and the derived velocity are within a valid range. In an exemplary embodiment, the error is utilized when the magnitude of the Motor_Vel_Der_144 signal is between 16 and 66.4 radians per second. However, the error is not utilized for error gain computation if the absolute value of the Motor_Vel_Der_144 signal is less than or exceeds a selected limits. In a particular implementation of an exemplary embodiment, limits of 72 radians per second or is less than 10.4 radians per second are employed. It should be appreciated that under some conditions, the comparison of the two velocities and the generation of an error may not be valid. For example, at very small velocities, the derived velocity, Motor_Vel_Der_144 exhibits excessive delay, while at larger velocities, that is, in excess of 72 radians per second, the tachometer signals may be saturated, and therefore an inaccurate depiction of the actual velocity.

Returning to FIG. 30, in an exemplary embodiment, the Select function 1756 transmits the error, when enabled, to an error integrator 1760, (in this instance two integrators). The integrator(s) 1760, under selected conditions, integrate(s) the error to generate a gain adjustment feedback denoted GAIN_1 and GAIN_2. The selection of which integrator 1760 operates on the error is controlled by time shifted versions of the discretes Phase_A_En and Phase_B_En resultant from delay 1758 that indicate which corrected velocity X1_CORR or X2_COOR, is contributing the majority of the tachometer magnitude, tach_vel_mag. In an exemplary embodiment, the integrator 1760 also maintains its output constant when not enabled. The two gain integrands GAIN_1 and GAIN_2 form the gain adjustment feedback that is then utilized as an input in the abovementioned Dynamic Gain Adjust process 1800 and ultimately at the Offset Compensation process 1200.

Continuing with FIG. 30, it is noteworthy to appreciate that the integration envelope boundaries may be implemented with a variety of boundary conditions. For example, "hard" boundaries, which are exemplified by the integrator(s) 1760 being either "on," and running, or "off" when on either side of the boundary respectively. Conversely, "soft" boundaries, where the integrator gain is gradually reduced when crossing the boundary from the "on" or active side to the "off" or inactive side and gradually increased back to its nominal value when crossing the boundary from the "off" side to the "on" side. A "hard" boundary may be easier to implement but a "soft" boundary may allow the integration window to grow slightly. In an embodiment as disclosed herein, a "hard" boundary may be employed to simplify implementation requirements.

Having reviewed the interfaces to, and operation of, the integrators 1760, attention may now be given to some details of operation of the remainder of the Gain process 1750 as depicted in FIG. 30. It may be noted that the parameters of interest usually vary relatively slowly over time. For example, the temperature dependent variation and the life variation of the parameters may exhibit time constants on the order of minutes, days if not even years. Therefore, the integrator(s) 1760 may be configured as desired to exhibit relatively slow response times, or low gains. Setting the gains too high or the response too fast, for example, may inadvertently cause the integrator(s) 1760 to initiate corrections during higher frequency variations in velocity as might be experienced under accelerations or rapid or aggressive inputs. Moreover, with excessively high integrator gain, the tachometer velocity may respond to high frequency noise or ultimately become unstable. Therefore, by maintaining the integrator(s) 1760 gains lower and the response characteristics of the integrator(s) 1760 slower, overall response to erroneous velocity transients, if any, are limited and adverse effects to the outputs are minimized. Thus, in an exemplary embodiment, the integrator(s) 1760 may be disabled under selected conditions to ensure that the effect on the two gain integrands GAIN_1 and GAIN_2 will be minimized.

Another important consideration for the practical implementation employing integrator(s) 1760 is initialization. It is well understood that because of the nature of an integrating function, controlling the initial conditions is very important. This is the case because any error in the initial conditions may only be eliminated via the gain and at the integrating rate specified. Therefore, for example, where the desired response is purposefully maintained slow to accommodate system characteristics, the initial error may require a significant duration of time to be completely eradicated.

To address the abovementioned initialization concerns it is appreciated that the integrator(s) 1760 may be reset to a zero value with each application of power. It is also noteworthy to appreciate that such an initialization may introduce an error into the gain adjustment feedback denoted GAIN_1 and GAIN_2, which could require a relatively long time to be significantly reduced or eliminated. As a result, an inaccurate gain feedback may be provided and thereby an erroneous velocity output provided. Such an error may be acceptable in some applications and yet be objectionable in others and therefore more sophisticated initialization schemes may prove beneficial.

In an alternative embodiment, another approach is considered where the integrator(s) 1760 is initialized to a nominal parameter value (as opposed to reset to zero) with each initialization or starting condition (e.g., with each power on cycle or ignition cycle in an automobile). However, employing this approach once again means that at initial power turn on (key on) the a gain adjustment feedback denoted GAIN_1 and GAIN_2 applied to the Dynamic Gain Adjust process 1800 and ultimately at the Offset Compensation process 1200 will now start at a nominal parameter value. Moreover, an initialization to a nominal parameter value or zero will not include any information about the gain adjustment feedback "learned" during previous operational cycles. While both the abovementioned approaches address the possibility for error accumulation in the integrator, introduction of an error on each initialization may yield less than satisfactory results. Considering that the output of the integrator(s) 1760 is effectively the errors "learned" over a period of operation, this means that for the first utilization of the tachometer velocity, a significant, error may be present. For example, with steering applications an incorrect velocity gain would result in inaccurate velocity damping, yielding undesirable steering system response.

In yet another embodiment, the output of the integrator 1760 may be saved in a storage location at the end of each ignition/operational cycle. It is noteworthy to recognize that at the end of each ignition cycle, the output of the integrator(s) 1760 represents the gain adjustment needed to overcome the build, life, and temperature errors and variations. Furthermore, it should be noted and apparent that from one operational cycle to the next, the gain adjustment dependent upon build variations will not have changed significantly and therefore, the build variation error correction required is zero. Likewise, the life variation correction from one operational cycle (e.g., each power application) to the next is minimal if not negligible. Only the variation due to temperature changes is likely to be significant. Therefore, in an embodiment, the output of the integrator(s) 1760 may be compared with values from previous operational cycles and saved as a initialization correction only if they differ from the saved values by some selected margin. If variations due to temperature changes are determined to be significant, they may be compensated by normalizing the stored values to a given reference temperature and then adjusting for the actual temperature when the stored values are retrieved. In this manner, the stored values will only change from one operational cycle to the next as a result of life variation or temperature measurement errors. As such, only significant differences in the response of the integrator(s) 1760 between operational cycles will be saved, thereby reducing processing effort and impact on storage utilization. An example of normalizing the stored values for temperature is to store the value Go in the following formula:

$$Go = G/(1+a(T-To))$$

where,
G is the current gain for the error integrator(s)
Go is the normalized gain to be stored
a is the thermal coefficient of the tachometer gain T is the current temperature of the tachometer To is the reference temperature (typically 25 degrees Celsius).

Likewise, upon the beginning of the next operational cycle, the temperature variation can be compensated by inverting the above formula as follows:

$$G=Go(1+a(T-To)).$$

It should once again be appreciated that disclosed herein is an exemplary embodiment for practicing the invention which should be considered without limitation. A particular configuration and implementation has been described to facilitate understanding. For example, it should be understood that the disclosed methods and functions for the disclosed processes such as Select function 1756 and error integrators 1760 merely operate as implementations of a particular exemplary embodiment. Numerous variations and implementations should be apparent to those skilled in the art. For example, error accumulation may be accomplished via summers, counters, integrators and the like, as well as combinations including at least one of the foregoing without limitation thereof.

Returning now to FIG. 25 and the Dynamic Gain Adjust process 1800, which includes, but is not limited to, processes to formulate the two gain adjustment outputs ADJ_GAIN_1; ADJ_GAIN_2; and a magnitude gain command MAG_GAIN which are resultant of scheduling of the two gain correction factors GAIN_1 and GAIN_2. The two gain adjustments ADJ_GAIN_1; ADJ_GAIN_2 form the gain adjustment feedback that is utilized as an input in the abovementioned Offset Compensation 200. In an exemplary embodiment, the Dynamic Gain Adjust 1800 process computes the above-mentioned corrections as combinations, scaling and scheduling of the two gain integrands GAIN_1 and GAIN_2. For example, in a simple form, the MAG_GAIN is computed as the sum of the two gain integrands GAIN_1 and GAIN_2. In addition, the gain adjustment ADJ_GAIN_1 is computed as the gain integrand GAIN_1, scaled, and then divided by the sum MAG_GAIN. Likewise, the gain adjustment ADJ_GAIN_2 is computed as the gain integrand GAIN_2, scaled, and then divided by the sum MAG_GAIN.

The system and methodology described in the numerous embodiments hereinbefore provides a robust design and methods to determine a velocity of an electric machine. In addition, the disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or as data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An apparatus for determining the velocity of a rotating device comprising:
   a rotational part having a magnet assembly affixed to a rotating shaft of said rotating device configured to rotate about a rotation axis, said magnet assembly includes a low-resolution magnet set and a high-resolution magnet set, said low-resolution magnet set forms an annulus of smaller radius than a second annulus formed from said high-resolution magnet set; and
   a circuit assembly including, a circuit interconnection having only one sense coil, a sensor affixed to said circuit assembly, said circuit assembly adapted to be in proximity to said magnet assembly;
   wherein said magnet assembly combines with said circuit assembly to form an air core electric machine such that a voltage generated from said sense coil exhibits an amplitude proportional to said velocity.

2. The apparatus of claim 1 wherein said magnet assembly is arranged in an annular ring, concentric with said rotation axis of said rotational part.

3. The apparatus of claim 2 wherein said magnet assembly comprises alternating poles equivalently sized and distributed about said annular ring at a circumference thereof.

4. The apparatus of claim 2 wherein said magnet assembly is oriented such that a magnetic field therefrom radiates in an axial direction, parallel to said rotation axis.

5. The apparatus of claim 2 wherein said annular ring is arranged such that a surface radiating said magnetic field is placed proximal to said circuit assembly orthogonal to said rotation axis of said rotational part.

6. The apparatus of claim 1 wherein said low-resolution magnet set includes six poles.

7. The apparatus of claim 1 wherein said high-resolution magnet set includes seventy two poles.

8. The apparatus of claim 1 wherein said sensor is a Hall effect sensor.

9. The apparatus of claim 1 wherein said circuit interconnection is a printed circuit card.

10. The apparatus of claim 1 wherein said circuit interconnection is a flexible circuit.

11. The apparatus of claim 1 wherein said circuit interconnection is on a ceramic substrate.

12. The apparatus of claim 1 wherein said circuit interconnection is a lead frame assembly.

13. The apparatus of claim 1 wherein said only one sense coil is formed in sets of spirals not concentric with said rotation axis of said rotational part.

14. The apparatus of claim 1 wherein said magnet assembly is oriented such that a magnetic field therefrom radiates in the radial direction, orthogonal to said rotation axis.

15. The apparatus of claim 14 wherein said sense coil includes active segments arranged such that said active segments are oriented in an axial direction, parallel to said rotation axis.

16. The apparatus of claim 14 wherein a velocity vector of lines of magnetic flux from said low-resolution magnet set of said magnet assembly intersect said active segments at approximately ninety degrees.

17. The apparatus of claim 15 wherein a velocity vector of lines of magnetic flux from said low-resolution magnet set of said magnet assembly intersect said inactive segments at approximately zero degrees.

18. The apparatus of claim 1 wherein said only one sense coil is configured to cause a voltage induced thereon to be substantially sinusoidal.

19. An apparatus for determining the velocity of a rotating device comprising:
a rotational part having a magnet assembly affixed to a rotating shaft of said rotating device configured to rotate about a rotation axis; and
a circuit assembly including, a circuit interconnection having a plurality of sense coils, a sensor affixed to said circuit assembly, said circuit assembly adapted to be in proximity to said magnet assembly;
wherein said magnet assembly combines with said circuit assembly to form an air core electric machine such that voltages generated from each sense coil of said plurality of sense coils exhibits an amplitude proportional to said velocity;
wherein each of said sense coils of said plurality of sense coils are configured to cause voltages induced on said each sense coil of said plurality of sense coils to be substantially sinusoidal: and
wherein said each sense coil of said plurality of sense coils comprises a conductive winding arranged in a spiraling serpentine fashion on one or more layers of said circuit interconnection.

20. The apparatus of claim 19 wherein said circuit interconnection includes circuit elements including each sense coil of said plurality of sense coils formed therein.

21. The apparatus of claim 19 wherein each of said sense coils of said plurality of sense coils are rotated relative to one another about a center of said rotation axis of said rotational part to cause voltages induced on each said sense coil of said plurality of sense coils to be in quadrature.

22. The apparatus of claim 19 wherein said each said sense coil of said plurality of sense coils spiral concentrically, about said rotation axis of said rotational part, inward toward said center on a first layer and outward from said center on a second layer.

23. An apparatus for determining the velocity of a rotating device comprising:
a rotational part having a magnet assembly affixed to a rotating shaft of said rotating device configured to rotate about a rotation axis; and
a circuit assembly including, a circuit interconnection having a plurality of sense coils, a sensor affixed to said circuit assembly, said circuit assembly adapted to be in proximity to said magnet assembly;
wherein said magnet assembly combines with said circuit assembly to form an air core electric machine such that voltages generated from each sense coil of said plurality of sense coils exhibits an amplitude proportional to said velocity;
wherein each of said sense coils of said plurality of sense coils are configured to cause voltages induced on said each sense coil of said plurality of sense coils to be substantially sinusoidal; and
wherein each of said sense coils of said plurality of sense coils includes a winding including active segments characterized by radial portions of said winding and inactive segments, characterized by circumferential portions of said winding.

24. The apparatus of claim 23 wherein said active segments intersect lines of magnetic flux from said low-resolution magnet set of said magnet assembly to induce a voltage on each said sense coil of said plurality of sense coils.

25. The apparatus of claim 23 wherein a velocity vector of said lines of magnetic flux from said low-resolution magnet set of said magnet assembly intersect said active segments at approximately ninety degrees.

26. The apparatus of claim 23 wherein said inactive segments intersect said lines of magnetic flux from a low-resolution magnet set of said magnet assembly while limiting inducement of a voltage on each said sense coil of said plurality of sense coils.

27. The apparatus of claim 26 wherein a velocity vector of said lines of magnetic flux from said low-resolution magnet set of said magnet assembly intersect said inactive segments at approximately zero degrees.

28. The apparatus of claim 26 wherein said inactive segments do not intersect said lines of magnetic flux from said low-resolution magnet set of said magnet assembly.

29. The apparatus of claim 23 wherein said winding is arranged with an about constant average distance from said magnet assembly.

30. The apparatus of claim 23 wherein said winding is arranged with another winding on each of two layers, concentric with said rotation axis, with 144 total active segments.

31. The apparatus of claim 23 wherein each of said sense coils of said plurality of sense coils are configured to substantially cancel selected harmonics of voltages induced on said each sense coil of said plurality of sense coils.

32. The apparatus of claim 31 wherein each of said sense coils of said plurality of sense coils are configured to substantially cancel a third harmonic and fifth harmonic of voltages induced on said each sense coil of said plurality of sense coils.

33. The apparatus of claim 31 wherein said winding is rotated relative to another winding about a center of said rotation axis of said rotational part to substantially cancel a selected harmonic of voltages induced on said each sense coil of said plurality of sense coils.

34. The apparatus of claim 33 wherein said winding is rotated relative to said another winding about a center of said rotation axis of said rotational part to substantially cancel and a seventh harmonic of voltages induced on said each sense coil of said plurality of sense coils.

35. The apparatus of claim 33 wherein said winding includes 48 active segments and said another winding includes 48 active segments.

36. The apparatus of claim 33 wherein a first active segment of pairs of active segments for successive turns of said winding is rotated from a first selected reference by −18, −14, −6, −2, +2, +6, +14, and +18 degrees respectively, while a second active segment of said pair of active segments selected reference by +18, +14, +6, +2, −2, −6, −14, and −18 degrees respectively, wherein each turn includes three pairs of active segments.

37. The apparatus of claim 36 wherein said selected reference is a pole center.

38. The apparatus of claim 23 wherein said winding is rotated relative to another winding about a center of said rotation axis of said rotational part to substantially cancel a selected harmonic of voltages induced on said each sense coil of said plurality of sense coils.

39. The apparatus of claim 38 wherein said winding is rotated relative to said another winding about a center of said rotation axis of said rotational part to substantially cancel a seventh harmonic of voltages induced on said each sense coil of said plurality of sense coils.

40. The apparatus of claim 23 wherein each of said sense coils of said plurality of sense coils are configured to cause voltages induced thereon from external fields to substantially cancel.

41. The apparatus of claim 40 further including a cancellation coil wherein said cancellation coil is configured to cause voltages induced on said plurality of sense coils from external fields to substantially cancel.

42. The apparatus of claim 41 wherein said cancellation coil comprises substantially an equal number turns at a substantially equivalent average diameter as said sense coil wound in an opposite direction of a sense coil.

43. The apparatus of claim 42 wherein said cancellation coil is configured similar to said sense coil of said plurality of sense coils including portions similar to said inactive segments, whereby said cancellation coil is insensitive to magnetic fields from said magnet assembly and yet responsive to external magnetic fields.

44. The apparatus of claim 23 wherein said winding is rotated relative to another winding about a center of said rotation axis of said rotational part to substantially cancel voltages induced on said winding and said another winding from fields other than those produced by said magnet assembly.

45. The apparatus of claim 44 wherein said winding rotated relative to said another winding about a center of said rotation axis of said rotational part by 60 degrees.

46. The apparatus of claim 23 wherein said winding and another winding combine to form one of said sense coils of said plurality of sense coils, and said winding is wound spiraling in an opposite direction of rotation of said another winding relative to one another about a center of said rotation axis of said rotational part.

47. The apparatus of claim 46 wherein said winding is wound spiraling clockwise on a first layer and said another winding is wound counter clockwise on a second layer.

48. The apparatus of claim 46 wherein said winding is wound spiraling radially in a same direction as said another winding relative to said rotation axis of said rotational part.

49. The apparatus of claim 46 wherein said winding is wound spiraling in an opposite direction radially of another winding relative to said rotation axis of said rotational part.

50. The apparatus of claim 23 wherein said winding and another winding are rotated so that contributions from said active segments thereon to voltages induced on said winding and said another winding are cumulative, and wherein contributions from said inactive segments thereon to voltages induced on said winding and said another winding are substantially cancelled.

51. The apparatus of claim 50 wherein said inactive segments on said winding and said another winding are oriented to substantially cancel voltages induced on said winding and said another winding from fields other than those produced by said magnet assembly.

52. An apparatus for determining the velocity of a rotating device comprising:
a rotational part having a magnet assembly affixed to a rotating shaft of said rotating device configured to rotate about a rotation axis; and
a circuit assembly including, a circuit interconnection having a plurality of sense coils, a sensor affixed to said circuit assembly, said circuit assembly adapted to be in proximity to said magnet assembly;
wherein said magnet assembly combines with said circuit assembly to form an air core electric machine such that voltages generated from each sense coil of said plurality of sense coils exhibits an amplitude proportional to said velocity;
wherein each of said sense coils of said plurality of sense coils are configured to cause voltages induced on said each sense coil of said plurality of sense coils to be substantially sinusoidal; and
wherein said plurality of sense coils are formed in sets of spirals not concentric with said rotation axis of said rotational part.

53. An apparatus for determining the velocity of a rotating device comprising:
a rotational part having a magnet assembly affixed to a rotating shaft of said rotating device configured to rotate about a rotation axis; and
a circuit assembly including, a circuit interconnection having a plurality of sense coils, a sensor affixed to said circuit assembly, said circuit assembly adapted to be in proximity to said magnet assembly;
wherein said magnet assembly combines with said circuit assembly to form an air core electric machine such that voltages generated from each sense coil of said plurality of sense coils exhibits an amplitude proportional to said velocity;
wherein each of said sense coils of said plurality of sense coils are configured to cause voltages induced on said each sense coil of said plurality of sense coils to be substantially sinusoidal; and
wherein said magnet assembly is oriented such that a magnetic field therefrom radiates in the radial direction, orthogonal to said rotation axis.

54. The apparatus of claim 53 wherein said plurality of sense coils are arranged such that said active segments are oriented in an axial direction, parallel to said rotation axis.

55. The apparatus of claim 54 wherein a velocity vector of said lines of magnetic flux from a low-resolution magnet set of said magnet assembly intersect said active segments at approximately ninety degrees.

56. The apparatus of claim 54 wherein a velocity vector of said lines of magnetic flux from a low-resolution magnet set of said magnet assembly intersect said inactive segments at approximately zero degrees.

57. A system for determining a velocity of a rotating device comprising:
an apparatus having a rotational part including a magnet assembly affixed to a rotating shaft of said rotating device configured to rotate about a rotation axis;
a circuit assembly, including a circuit interconnection having only one sense coil as an integral member, a sensor affixed to said circuit assembly, mounted in close proximity to said magnet assembly;
wherein said magnet assembly combines with said circuit assembly to form an air core electric machine such that a voltage generated from said sense coil exhibits an amplitude proportional to said velocity;

a controller operatively coupled to said circuit assembly, said controller configured to execute an adaptive algorithm including:
receiving a position signal related to rotational position transmitted to said controller;
determining a derived velocity signal utilizing said position signal;
receiving a tachometer velocity signal;
determining a compensated velocity signal in response to said tachometer velocity signal;
blending said compensated velocity signal with said derived velocity signal under selective conditions to generate a blended velocity output indicative of the velocity of said rotating device.

58. The system of claim 57 wherein said magnet assembly is arranged in an annular ring, concentric with said rotation axis of said rotational part.

59. The system of claim 58 wherein said magnet assembly comprises alternating poles equivalently sized and distributed about said annular ring at a circumference thereof.

60. The system of claim 58 wherein said magnet assembly is oriented such that a magnetic field therefrom radiates in an axial direction, parallel to said rotation axis.

61. The system of claim 58 wherein said annular ring is arranged such that a surface radiating said magnetic field is placed proximal to said circuit assembly orthogonal to said rotation axis of said rotational part.

62. The system of claim 58 wherein said magnet assembly includes a low-resolution magnet set.

63. The system of claim 62 wherein said low-resolution magnet set includes six poles.

64. The system of claim 63 wherein said magnet assembly includes a high-resolution magnet set.

65. The system of claim 63 wherein said high-resolution magnet set includes seventy two poles.

66. The system of claim 64 wherein said low-resolution magnet set forms an annulus of smaller radius than a second annulus formed from said high-resolution magnet set.

67. The system of claim 57 wherein said sensor is a Hall effect sensor.

68. The system of claim 57 wherein said circuit interconnection is a printed circuit card.

69. The system of claim 57 wherein said circuit interconnection is a flexible circuit.

70. The system of claim 57 wherein said circuit interconnection is on a ceramic substrate.

71. The system of claim 57 wherein said circuit interconnection is a lead frame assembly.

72. The system of claim 57 wherein said only one sense coil is formed in sets of spirals not concentric with said rotation axis of said rotational part.

73. The system of claim 57 wherein said magnet assembly is oriented such that a magnetic field therefrom radiates in the radial direction, orthogonal to said rotation axis.

74. The system of claim 57 wherein said sense coil is arranged such that active segments thereon are oriented in an axial direction, parallel to said rotation axis.

75. The system of claim 74 wherein a velocity vector of lines of magnetic flux from a low-resolution magnet set of said magnet assembly intersect said active segments at approximately ninety degrees.

76. The system of claim 74 wherein a velocity vector of lines of magnetic flux from a low-resolution magnet set of said magnet assembly intersect said inactive segments at approximately zero degrees.

77. A system for determining a velocity of a rotating device comprising:
an apparatus having a rotational part including a magnet assembly affixed to a rotating shaft of said rotating device configured to rotate about a rotation axis;
a circuit assembly, including a circuit interconnection having a plurality of sense coils as an integral member, a sensor affixed to said circuit assembly, mounted in close proximity to said magnet assembly;
wherein said magnet assembly combines with said circuit assembly to form an air core electric machine such that voltages generated from each sense coil of said plurality of sense coils exhibits an amplitude proportional to said velocity;
wherein each of said sense coils of said plurality of sense coils are configured to cause voltages induced on said each sense coil of said plurality of sense coils to be substantially sinusoidal;
a controller operatively coupled to said circuit assembly, said controller configured to execute an adaptive algorithm including:
receiving a position signal related to rotational position transmitted to said controller;
determining a derived velocity signal utilizing said position signal;
receiving a plurality of tachometer velocity signals;
determining a compensated velocity signal in response to said plurality of tachometer velocity signal;
blending said compensated velocity signal with said derived velocity signal under selective conditions to generate a blended velocity output indicative of the velocity of said rotating device.

78. The system of claim 77 wherein said circuit interconnection includes circuit elements including each sense coil of said plurality of sense coils formed therein.

79. The system of claim 77 wherein said each sense coil of said plurality of sense coils comprises a conductive winding arranged in a spiraling serpentine fashion on one or more layers of said circuit assembly.

80. The system of claim 79 wherein each of said sense coils of said plurality of sense coils are rotated relative to one another about a center of said rotation axis of said rotational part to cause voltages induced on each said sense coil of said plurality of sense coils to be in quadrature.

81. The system of claim 79 wherein said each said sense coil of said plurality of sense coils spiral concentrically, about said rotation axis of said rotational part, inward toward said center on a first layer and outward from said center on a second layer.

82. The system of claim 77 wherein each of said sense coils of said plurality of sense coils includes a winding including active segments characterized by radial portions of said winding and inactive segments, characterized by circumferential portions of said winding.

83. The system of claim 82 wherein said active segments intersect lines of magnetic flux from said low-resolution magnet set of said magnet assembly to induce a voltage on each said sense coil of said plurality of sense coils.

84. The system of claim 82 wherein a velocity of said lines of magnetic flux from said low-resolution magnet set of said magnet assembly intersect said active segments at approximately ninety degrees.

85. The system of claim 82 wherein said inactive segments intersect said lines of magnetic flux from a low-resolution magnet set of said magnet assembly while limiting inducement of a voltage on each said sense coil of said plurality of sense coils.

86. The system of claim 85 wherein a velocity of said lines of magnetic flux from said low-resolution magnet set of said magnet assembly intersect said inactive segments at approximately zero degrees.

87. The system of claim 85 wherein said inactive segments do not intersect said lines of magnetic flux from said low-resolution magnet set of said magnet assembly.

88. The system of claim 82 wherein said winding is arranged with an about constant average distance from said magnet assembly.

89. The system of claim 82 wherein said winding is arranged with another winding on each of two layers, concentric with said rotation axis, with 144 total active segments.

90. The system of claim 82 wherein each of said sense coils of said plurality of sense coils are configured to substantially cancel selected harmonics of voltages induced on said each sense coil of said plurality of sense coils.

91. The system of claim 90 wherein each of said sense coils of said plurality of sense coils are configured to substantially cancel a third harmonic and fifth harmonic of voltages induced on said each sense coil of said plurality of sense coils.

92. The system of claim 90 wherein said winding is rotated relative to another winding about a center of said rotation axis of said rotational part to substantially cancel a selected harmonic of voltages induced on said each sense coil of said plurality of sense coils.

93. The system of claim 92 wherein said winding is rotated relative to said another winding about a center of said rotation axis of said rotational part to substantially cancel a seventh harmonic of voltages induced on said each sense coil of said plurality of sense coils.

94. The system of claim 92 wherein a first active segment of pairs of active segments for successive turns of said winding is rotated from a first selected reference by −18, −14, −6, −2, +2, +6, +14, and +18 degrees respectively, while a second active segment of said pair of active segments selected reference by +18, +14, +6, +2, −2, −6, −14, and −18 degrees respectively, wherein each turn includes three pairs of active segments.

95. The system of claim 94 wherein said selected reference is a pole center.

96. The system of claim 92 wherein said winding includes 48 active segments and said another winding includes 48 active segments.

97. The system of claim 82 wherein said winding is rotated relative to another winding about a center of said rotation axis of said rotational part to substantially cancel a selected harmonic of voltages induced on said each sense coil of said plurality of sense coils.

98. The system of claim 97 wherein said winding is rotated relative to said another winding about a center of said rotation axis of said rotational part to substantially cancel a seventh harmonic of voltages induced on said each sense coil of said plurality of sense coils.

99. The system of claim 82 wherein each of said sense coils of said plurality of sense coils are configured to cause voltages induced thereon from external fields to substantially cancel.

100. The system of claim 99 further including a cancellation coil wherein said cancellation coil is configured to cause voltages induced on said plurality of sense coils from external fields to substantially cancel.

101. The system of claim 100 wherein said cancellation coil comprises substantially an equal number turns at a substantially equivalent average diameter as said sense coil wound in an opposite direction of a sense coil.

102. The system of claim 101 wherein said cancellation coil is configured similar to said sense coil of said plurality of sense coils including portions similar to said inactive segments, whereby said cancellation coil is insensitive to magnetic fields from said magnet assembly and yet responsive to external magnetic fields.

103. The system of claim 82 wherein said winding is rotated relative to another winding about a center of said rotation axis of said rotational part to substantially cancel voltages induced on said winding and said another winding from fields other than those produced by said magnet assembly.

104. The system of claim 103 wherein said winding is rotated relative to said another winding about a center of said rotation axis of said rotational part by 60 degrees.

105. The system of claim 82 wherein said winding and said another winding combine to form one of said sense coils of said plurality of sense coils, and said winding is wound spiraling in an opposite direction of rotation of said another winding relative to one another about a center of said rotation axis of said rotational part.

106. The system of claim 105 wherein said winding is wound spiraling clockwise on a first layer and said another winding is wound counter clockwise on a second layer.

107. The system of claim 105 wherein said winding is wound spiraling radially in a same direction as said another winding relative to said rotation axis of said rotational part.

108. The system of claim 105 wherein said winding is wound spiraling in an opposite direction radially of another winding relative to said rotation axis of said rotational part.

109. The system of claim 82 wherein said winding and another winding are rotated so that contributions from said active segments thereon to voltages induced on said winding and said another winding are cumulative, and wherein contributions from said inactive segments thereon to voltages induced on said winding and said another winding are substantially cancelled.

110. The system of claim 109 wherein said inactive segments on said winding and said another winding are oriented to substantially cancel voltages induced on said winding and said another winding from fields other than those produced by said magnet assembly.

111. The system of claim 77 wherein said plurality of sense coils are formed in sets of spirals not concentric with said rotation axis of said rotational part.

112. The system of claim 77 wherein said magnet assembly is oriented such that a magnetic field therefrom radiates in the radial direction, orthogonal to said rotation axis.

113. The system of claim 112 wherein said plurality of sense coils are arranged such that said active segments are oriented in an axial direction, parallel to said rotation axis.

114. The system of claim 113 wherein a velocity vector of said lines of magnetic flux from a low-resolution magnet set of said magnet assembly intersect said active segments at approximately ninety degrees.

115. The system of claim 113 wherein a velocity vector of said lines of magnetic flux from a low-resolution magnet set of said magnet assembly intersect said inactive segments at approximately zero degrees.

116. The system of claim 77 wherein said compensated velocity signal is the resultant of an adaptive gain control loop configured to control magnitude of said compensated velocity signal under selected conditions.

117. The system of claim 77 wherein said derived velocity signal is determined as a difference between two measured positions of said rotating shaft divided by a time difference between said two measured positions; and filtering a resultant thereof.

118. The system of claim 77 wherein said plurality of tachometer velocity signals are resultants generated by said plurality of sense coils configured such that the voltages generated thereby are in quadrature.

119. The system of claim 77 wherein said blended velocity output is generated by combining said derived velocity signal and said compensated velocity signal under selective conditions based upon characteristics of at least one of said derived velocity signal said plurality of tachometer velocity signals.

120. The system of claim 119 wherein said selective conditions include a magnitude of said derived velocity signal.

121. The system of claim 77 wherein determining said compensated velocity signal includes:
  extracting respective offsets and biases from said plurality of tachometer velocity signals;
  correcting said plurality of tachometer velocity signals to produce a plurality of corrected velocity signals;
  determining a magnitude signal and phase signal responsive to said plurality of corrected velocity signals;
  combining said magnitude signal with said phase signal to formulate said compensated velocity signal;
  determining an error signal; and
  wherein said correcting is responsive to a gain adjustment signal.

122. The system of claim 121 wherein said extracting is accomplished by a selectable filter.

123. The system of claim 122 wherein said selectable filter conditionally subtracts low frequency spectral components from said plurality of tachometer velocity signals.

124. The system of claim 121 wherein said correcting is applied by a gain adjustment, wherein said gain adjustment is responsive to a selected corrected velocity signal of said plurality of corrected velocity signals, which contributes most to said magnitude signal, and wherein said selected corrected velocity signal exceeds an established threshold.

125. The system of claim 124 wherein said established threshold is indicative of a minimum magnitude signal for which said correcting is desired.

126. The system of claim 121 wherein said determining a magnitude signal comprises executing a square root of a sum of squares function.

127. The system of claim 121 wherein said determining a phase signal comprises selecting a sign of one of said tachometer velocity signals from said plurality of tachometer velocity signals under selected conditions.

128. The system of claim 121 wherein said error signal is responsive to a magnitude differential between said derived velocity signal and a time coherent version of said compensated velocity signal.

129. The system of claim 121 wherein said gain adjustment is responsive to an adaptive feedback loop including an error integrator which is responsive to said error signal to control magnitude of said velocity under selected conditions.

130. The system of claim 129 wherein said error integrator is initialized to a zero condition.

131. The system of claim 129 wherein said error integrator is initialized to a nominal value.

132. The system of claim 129 wherein said error integrator is initialized to a saved value of said error integrator, said saved value updated with a current output of said error integrator only if said current output of said error integrator exhibits a change in excess of a selected threshold.

133. A method for determining a velocity of a rotating device, comprising:
  employing an apparatus having a rotational part including a magnet assembly affixed to a rotating shaft of said rotating device configured to rotate about a rotation axis;
  employing a circuit assembly, including a circuit interconnection having only one sense coil as an integral member, a sensor affixed to said circuit assembly, adapted to be in close proximity to said magnet assembly;
  executing an algorithm in a controller operatively coupled to said circuit assembly, said algorithm including:
  receiving a position signal related to rotational position;
  determining a derived velocity signal utilizing said position signal;
  receiving a tachometer velocity signal;
  determining a compensated velocity signal in response to said tachometer velocity signal;
  blending said compensated velocity signal with said derived velocity signal under selective conditions to generate a blended velocity indicative of said velocity of said rotating device.

134. The method of claim 133 wherein said compensated velocity signal is the resultant of an adaptive gain control loop configured to control magnitude of said compensated velocity signal under selected conditions.

135. The method of claim 133 wherein said derived velocity signal is determined as a difference in measured positions of said rotating device divided by a time difference between said two measured positions; and filtering a resultant thereof.

136. A method for determining a velocity of a rotating device, comprising:
  employing an apparatus having a rotational part including a magnet assembly affixed to a rotating shaft of said rotating device configured to rotate about a rotation axis;
  employing a circuit assembly, including a circuit interconnection having a plurality of sense coils as an integral member, a sensor affixed to said circuit assembly, adapted to be in close proximity to said magnet assembly;
  executing an algorithm in a controller operatively coupled to said circuit assembly, said algorithm including:
  receiving a position signal related to rotational position;
  determining a derived velocity signal utilizing said position signal;
  receiving a plurality of tachometer velocity signals, wherein said plurality of tachometer velocity signals are substantially sinusoidal;
  determining a compensated velocity signal in response to said tachometer velocity signal;
  blending said compensated velocity signal with said derived velocity signal under selective conditions to generate a blended velocity indicative of said velocity of said rotating device.

137. The method of claim 136 wherein said plurality of tachometer velocity signals are resultants generated by said plurality of sense coils configured such that voltages generated thereby are in quadrature.

138. The method of claim 136 wherein said blended velocity output is generated by combining said derived velocity signal and said compensated velocity signal under selective conditions based upon a characteristic of at least one of said derived velocity signal and said plurality of tachometer velocity signals.

139. The method of claim 138 wherein said selective conditions include a magnitude of said derived velocity signal.

140. The method of claim 136 wherein generating said compensated velocity signal includes:
    extracting respective offsets and biases from said plurality of tachometer velocity signals;
    correcting said plurality of tachometer velocity signals to produce a plurality of corrected velocity signals;
    determining a magnitude signal and phase signal responsive to said plurality of corrected velocity signals;
    combining said magnitude signal with said phase signal to formulate said compensated velocity signal;
    determining an error signal; and
    wherein said correcting is responsive to a gain adjustment signal.

141. The method of claim 140 wherein said extracting is accomplished by a selectable filter.

142. The method of claim 141 wherein said selectable filter conditionally subtracts low frequency spectral components from said plurality of tachometer velocity signals.

143. The method of claim 140 wherein said correcting is applied by a gain adjustment, wherein said gain adjustment is responsive to a selected corrected velocity signal of said plurality of corrected velocity signals, which contributes most to said magnitude signal, and wherein said selected corrected velocity signal exceeds an established threshold.

144. The method of claim 143 wherein said established threshold is indicative of a minimum magnitude signal for which said correcting is desired.

145. The method of claim 140 wherein said determining a magnitude signal comprises executing a square root of a sum of squares function.

146. The method of claim 140 wherein said determining a phase signal comprises selecting a sign of one of said tachometer velocity signals from said plurality of tachometer velocity signals under selected conditions.

147. The method of claim 140 wherein said error signal is responsive to a magnitude differential between said derived velocity signal and a time coherent version of said compensated velocity signal.

148. The method of claim 140 wherein said gain adjustment is responsive to an adaptive feedback loop including an error integrator which is responsive to said error signal to control magnitude of said velocity under selected conditions.

149. A storage medium, said storage medium including instructions for causing a controller to implement a method for determining a velocity of a rotating device comprising:
    employing an apparatus having a rotational part including a magnet assembly affixed to a rotating shaft of said rotating device configured to rotate about a rotation axis;
    employing a circuit assembly, including a circuit interconnection having only one sense coil as an integral member, a sensor affixed to said circuit assembly, adapted to be in close proximity to said magnet assembly;
    executing an algorithm in a controller operatively coupled to said circuit assembly, said algorithm including:
    receiving a position signal related to rotational position determining a derived velocity signal utilizing said position signal;
    receiving a tachometer velocity signal;
    generating a compensated velocity signal in response to said plurality of tachometer velocity signals; and
    blending said compensated velocity signal with said derived velocity signal under selective conditions to generate a blended velocity output indicative of said velocity of said rotating device.

150. The storage medium of claim 149 wherein said derived velocity signal is determined as a difference between measured positions of said rotating device divided by a time difference between said measured position; and filtering a resultant thereof.

151. A storage medium, said storage medium including instructions for causing a controller to implement a method for determining a velocity of a rotating device comprising:
    employing an apparatus having a rotational part including a magnet assembly affixed to a rotating shaft of said rotating device configured to rotate about a rotation axis;
    employing a circuit assembly, including a circuit interconnection having a plurality of sense coils as an integral member, a sensor affixed to said circuit assembly, adapted to be in close proximity to said magnet assembly;
    executing an algorithm in a controller operatively coupled to said circuit assembly, said algorithm including:
    receiving a position signal related to rotational position determining a derived velocity signal utilizing said position signal;
    receiving a plurality of tachometer velocity signals, wherein said plurality of tachometer velocity signals are substantially sinusoidal;
    generating a compensated velocity signal in response to said plurality of tachometer velocity signals; and
    blending said compensated velocity signal with said derived velocity signal under selective conditions to generate a blended velocity output indicative of said velocity of said rotating device.

152. The storage medium of claim 151 wherein said plurality of tachometer velocity signals are resultants generated by said plurality of sense coils configured such that voltages generated thereby are in quadrature.

153. The storage medium of claim 151 wherein said blended velocity output is generated by combining said derived velocity signal and said compensated velocity signal under selective conditions based upon a characteristic of at least one of said derived velocity signal and said plurality of tachometer velocity signals.

154. The storage medium of claim 151 wherein generating said compensated velocity signal includes:
    extracting respective offsets and biases from said plurality of tachometer velocity signals;
    correcting said plurality of tachometer velocity signals to produce a plurality of corrected velocity signals;
    determining a magnitude signal and phase signal responsive to said plurality of corrected velocity signals;
    combining said magnitude signal with said phase signal to formulate said compensated velocity signal;
    determining an error signal; and
    wherein said correcting is responsive to a gain adjustment signal.

155. A computer data signal, said data signal comprising code configured to cause a controller to implement a method for determining a velocity of a rotating device comprising:
    employing an apparatus having a rotational part including a magnet assembly affixed to a rotating shaft of said rotating device configured to rotate about a rotation axis;

employing a circuit assembly, including a circuit interconnection having only one sense coil as an integral member, a sensor affixed to said circuit assembly, adapted to be in close proximity to said magnet assembly;

executing an algorithm in a controller operatively coupled to said circuit assembly, said algorithm including:

receiving a position signal related to rotational position, and determining a derived velocity signal utilizing said position signal;

receiving a tachometer velocity signal;

generating a compensated velocity signal in response to said tachometer velocity signal; and blending said compensated velocity signals with said derived velocity signal under selective conditions to generate a blended velocity output indicative of said velocity of said rotating device.

156. The computer data signal of claim 155 wherein said derived velocity signal is determined as a difference between measured positions of said rotating device divided by a time difference between said measured positions; and filtering a resultant thereof.

157. A computer data signal, said data signal comprising code configured to cause a controller to implement a method for determining a velocity of a rotating device comprising:

employing an apparatus having a rotational part including a magnet assembly affixed to a rotating shaft of said rotating device configured to rotate about a rotation axis;

employing a circuit assembly, including a circuit interconnection having a plurality of sense coils as an integral member, a sensor affixed to said circuit assembly, adapted to be in close proximity to said magnet assembly;

executing an algorithm in a controller operatively coupled to said circuit assembly, said algorithm including:

receiving a position signal related to rotational position, and determining a derived velocity signal utilizing said position signal;

receiving a tachometer velocity signals, wherein said plurality of tachometer velocity signals are substantially sinusoidal;

generating a compensated velocity signal in response to said tachometer velocity signal; and blending said compensated velocity signals with said derived velocity signal under selective conditions to generate a blended velocity output indicative of said velocity of said rotating device.

158. The computer data signal of claim 157 wherein said plurality of tachometer velocity signals are resultants generated by said plurality of sense coils configured such that voltages generated thereby are in quadrature.

159. The computer data signal of claim 157 wherein said blended velocity output is generated by combining said derived velocity signal and said compensated velocity signal under selective conditions based upon a characteristic of at least one of said derived velocity signal and said plurality of tachometer velocity signals.

160. The computer data signal of claim 157 wherein generating said compensated velocity signal includes:

extracting respective offsets and biases from said plurality of tachometer velocity signals;

correcting said plurality of tachometer velocity signals to produce a plurality of corrected velocity signals;

determining a magnitude signal and phase signal responsive to said plurality of corrected velocity signals;

combining said magnitude signal with said phase signal to formulate said compensated velocity signal;

determining an error signal; and wherein said correcting is responsive to a gain adjustment signal.

* * * * *

UNITED STATES PATENT AND TRADEMARK OFFICE
CERTIFICATE OF CORRECTION

PATENT NO. : 7,075,290 B2
APPLICATION NO. : 10/205848
DATED : July 11, 2006
INVENTOR(S) : Steven James Collier-Hallman et al.

It is certified that error appears in the above-identified patent and that said Letters Patent is hereby corrected as shown below:

Title Page, ITEM;
(75) Inventors, delete "Hentianarisoa Ratouth" and insert therefor --Heritianarisoa Rakouth--

Signed and Sealed this

Twelfth Day of September, 2006

JON W. DUDAS
*Director of the United States Patent and Trademark Office*